United States Patent
Geremia et al.

(10) Patent No.: US 11,697,692 B2
(45) Date of Patent: Jul. 11, 2023

(54) METHODS OF PRODUCING GLYCAN POLYMERS

(71) Applicant: DSM Nutritional Products, LLC, Parsippany, NJ (US)

(72) Inventors: John M. Geremia, Watertown, MA (US); Christopher Matthew Liu, Somerville, MA (US); Anastasia V. Lioubomirov, North Attleboro, MA (US)

(73) Assignee: DSM Nutritional Products, LLC, Parsippany, NJ (US)

( * ) Notice: Subject to any disclaimer, the term of this patent is extended or adjusted under 35 U.S.C. 154(b) by 0 days.

(21) Appl. No.: 16/761,115

(22) PCT Filed: Nov. 3, 2018

(86) PCT No.: PCT/US2018/059101
§ 371 (c)(1),
(2) Date: May 1, 2020

(87) PCT Pub. No.: WO2019/090181
PCT Pub. Date: May 9, 2019

(65) Prior Publication Data
US 2020/0354481 A1 Nov. 12, 2020

Related U.S. Application Data

(60) Provisional application No. 62/581,571, filed on Nov. 3, 2017, provisional application No. 62/720,924, filed on Aug. 21, 2018.

(51) Int. Cl.
C08B 37/00 (2006.01)
(52) U.S. Cl.
CPC ................. C08B 37/006 (2013.01)
(58) Field of Classification Search
None
See application file for complete search history.

(56) References Cited

U.S. PATENT DOCUMENTS

| | | | |
|---|---|---|---|
| 5,085,883 | A | 2/1992 | Garleb et al. |
| 5,580,762 | A | 12/1996 | Karube et al. |
| 6,677,142 | B1 | 1/2004 | Weissmuller et al. |
| 7,615,365 | B2 | 11/2009 | Caimi et al. |
| 9,079,171 | B2 | 7/2015 | Geremia et al. |
| 2006/0008574 | A1 | 1/2006 | Begli et al. |
| 2006/0127448 | A1 | 6/2006 | Carlson et al. |
| 2007/0148728 | A1 | 6/2007 | Johnson et al. |
| 2008/0051573 | A1 | 2/2008 | Hirth et al. |
| 2012/0220740 | A1 | 8/2012 | Geremia et al. |
| 2013/0216693 | A1 | 8/2013 | Harrison et al. |
| 2014/0060522 | A1 | 3/2014 | Midori |
| 2016/0366909 | A1 | 12/2016 | Geremia et al. |

FOREIGN PATENT DOCUMENTS

| | | | | |
|---|---|---|---|---|
| EP | 2401925 A1 | 1/2012 | | |
| WO | WO 2012/118767 A1 | 9/2012 | | |
| WO | WO 2014/031956 A1 | 2/2014 | | |
| WO | WO-2014084921 A1 | * 6/2014 | ............... | A61J 3/00 |
| WO | WO 2014/145276 A1 | 9/2014 | | |
| WO | WO 2016/007778 A1 | 1/2016 | | |
| WO | WO 2016/122884 A1 | 8/2016 | | |
| WO | WO 2016/122885 A1 | 8/2016 | | |
| WO | WO 2016/122889 A1 | 8/2016 | | |
| WO | WO 2016/172657 A2 | 10/2016 | | |
| WO | WO 2016/172658 A2 | 10/2016 | | |
| WO | WO 2017/035412 | 3/2017 | | |

OTHER PUBLICATIONS

Frank, The Basics of Anti-Caking Agents, internet article, https://knowledge.ulprospector.com/3306/fbn-the-basics-of-anti-caking-agents/, Oct. 30, 2015. (Year: 2015).*
International Search Report and Written Opinion for Application No. PCT/US2018/059101, dated Apr. 18, 2019.
International Preliminary Report on Patentability for Application No. PCT/US2018/059101, dated May 14, 2020.
Barron et al., Recent Developments in Raman Optical Activity of Biopolymers. App Spectroscopy. May 1, 1996;50(5):619-629. doi: 10.1366/0003702963905808.
Barron et al., Solution structure and dynamics of biomolecules from Raman optical activity. Prog Biophys Mol Biol. 2000;73(1):1-49. doi: 10.1016/s0079-6107(99)00017-6.
Ergun et al., Moisture and shelflife in sugar confections. Crit Rev Food Sci Nutr. Feb. 2010;50(2):162-92. doi: 10.1080/10408390802248833.
Gibson et al., Dietary modulation of the human colonic microbiota: introducing the concept of prebiotics. J Nutr. Jun. 1995;125(6):1401-12. doi: 10.1093/jn/125.6.1401.
Gómez et al., Purification, characterization, and prebiotic properties of pectic oligosaccharides from orange peel wastes. J Agric Food Chem. Oct. 8, 2014;62(40):9769-82. doi: 10.1021/jf503475b. Epub Sep. 23, 2014.
Hakomori, A rapid permethylation of glycolipid, and polysaccharide catalyzed by methylsulfinyl carbanion in dimethyl sulfoxide. J Biochem. Feb. 1964;55:205-8.
Harding et al., Structural characterisation of a highly branched exopolysaccharide produced by *Lactobacillus delbrueckii* subsp. bulgaricus NCFB2074. Carbohydr Res. May 2, 2005;340(6):1107-11. doi: 10.1016/j.carres.2005.01.038.
Heiss et al., The structure of Cryptococcus neoformans galactoxylomannan contains beta-D-glucuronic acid. Carbohydr Res. May 12, 2009;344(7):915-20. doi: 10.1016/j.carres.2009.03.003. Epub Mar. 10, 2009.

(Continued)

*Primary Examiner* — Layla D Berry
(74) *Attorney, Agent, or Firm* — Clark & Elbing LLP

(57) ABSTRACT

Preparations of glycan polymers and variations thereof, pharmaceutical compositions, medical foods, supplements, foods, food ingredients, feed ingredients, and feed additives thereof, optionally comprising micronutrients, polyphenols, prebiotics, probiotics, or other agents are provided and methods of making same.

16 Claims, 11 Drawing Sheets

(56) References Cited

OTHER PUBLICATIONS

Holck et al., Feruloylated and nonferuloylated arabino-oligosaccharides from sugar beet pectin selectively stimulate the growth of *Bifidobacterium* spp. in human fecal in vitro fermentations. J Agric Food Chem. Jun. 22, 2011;59(12):6511-9. doi: 10.1021/jf200996h. Epub May 25, 2011.

McCleary et al., Determination of insoluble, soluble, and total dietary fiber (CODEX definition) by enzymatic-gravimetric method and liquid chromatography: collaborative study. J AOAC Int. May-Jun. 2012;9(3):824-44. doi: 10.5740/jaoacint.cs2011_25.

McCleary et al., Determination of total dietary fiber (CODEX definition) by enzymatic-gravimetric method and liquid chromatography: collaborative study. J AOAC Int. Jan.-Feb. 2010;93(1):221-33.

Niroomand et al., Fate of bacterial pathogens and indicator organisms in liquid sweeteners. J Food Prot. Mar. 1998;61(3):295-9. doi: 10.4315/0362-028x-61.3.295.

Roslund et al., Complete assignments of the (1)H and (13)C chemical shifts and J(H,H) coupling constants in NMR spectra of D-glucopyranose and all D-glucopyranosyl-D-glucopyranosides. Carbohydr Res. Jan. 14, 2008;343(1):101-12. doi: 10.1016/j.carres.2007.10.008. Epub Oct. 22, 2007.

Titgemeyer et al., Fermentability of various fiber sources by human fecal bacteria in vitro. Am J Clin Nutr. Jun. 1991;53(6):1418-24. doi: 10.1093/ajcn/53.6.1418.

Zähringer et al., Isolation and structural characterization of a (Kdo-isosteric) D-glycero-a-D-talo-oct-2-ulopyranosidonic acid (Ko) interlinking lipid A and core oligosaccharide in the lipopolysaccharide of Acinetobacter calcoaceticus NCTC 10305. Carbohydr Res. Aug. 30, 2013;378:63-70. doi: 10.1016/j.carres.2013.05.003. Epub May 15, 2013.

\* cited by examiner

METHODS OF PRODUCING GLYCAN POLYMERS

RELATED APPLICATIONS

This application is a U.S. national phase application and claims the benefit of priority under 35 U.S.C. § 371 of International Application No. PCT/US2018/059101, filed Nov. 3, 2018, which claims the benefit under 35 U.S.C. § 119(e) of U.S. Provisional Application No. 62/581,571, entitled "METHODS OF PRODUCING GLYCAN POLYMERS", filed Nov. 3, 2017, and U.S. Provisional Application No. 62/720,924 entitled "OLIGOSACCHARIDE COMPOSITIONS AND METHODS OF USE THEREOF FOR REDUCING AMMONIA LEVELS", filed Aug. 21, 2018, the entire contents of each of which are incorporated herein by reference.

BACKGROUND OF THE INVENTION

The microbiota of humans and animals is complex, and varies by individual depending on genetics, age, sex, stress, nutrition and diet. The microbiota perform many activities and may influence the physiology of the host. Changing the numbers and species of gut microbiota can alter community function and interaction with the host. There is a need for novel inputs that can stimulate beneficial microbiota shifts and improve human and animal health and nutrition, and methods of making the same on a commercial scale.

SUMMARY OF THE INVENTION

Provided herein are methods of making glycan polymer preparations and compositions thereof, including pharmaceutical compositions, medical foods, dietary supplements, food ingredients, feed ingredients, and feed additives thereof. The glycan polymer preparations described herein are useful in promoting human and animal health and nutrition. In one aspect, the present invention features a method of making a glycan polymer preparation, e.g., a large-scale glycan polymer preparation. In some embodiments, the method comprises forming a reaction mixture comprising a glycan unit and a catalyst and, optionally, water; and maintaining the reaction mixture under conditions which result in a glycan polymer preparation, e.g., a large-scale glycan polymer preparation. In some embodiments, the method comprises measuring or controlling the amount of water in the reaction mixture, e.g., the amount of water removed during catalysis.

In another aspect, the present invention features a method of making a glycan polymer preparation having a mean degree of polymerization (DP) of at least 3 comprising: A) providing a reaction mixture comprising: i) one or more glycan units (e.g., sugar monomer, dimers, or oligomers) at an aqueous (mass) concentration of at least 0.10 kg/kg, 0.15 kg/kg, 0.20 kg/kg, 0.25 kg/kg, 0.30 kg/kg, 0.35 kg/kg, 0.40 kg/kg, 0.45 kg/kg, or 0.50 kg/kg; and ii) an effective amount of an acid catalyst to form a glycosidic bond between two glycan units, and, optionally, iii) water; and B) subjecting the reaction mixture to conditions that result in the evolution of $H_2O$ at a rate of at least 5 g, 6 g, 10 g, 12 g, 15 g, 18 g, 20 g, 24 g, 30 g, 36 g, or at least 40 g of evolved $H_2O$/kg input glycan/hour; and optionally, i) separating the glycan polymer preparation from the acid catalyst, and/or ii) acquiring a value for a property of the glycan polymer preparation (a glycan polymer property) and optionally further processing the glycan polymer preparation if a predetermined value of the property is met, thereby making a glycan polymer preparation with a mean DP of at least 3, wherein the mass of the glycan polymer preparation is at least 2 kg, 3 kg, 4 kg, 5 kg, 6 kg, 7 kg, 8 kg, 9 kg, 10 kg, 11 kg, 12 kg, 15 kg, or 20 kg.

In some embodiments, the reaction mixture comprises: a) a glycan unit comprising or consisting of glucose, a catalyst and, optionally water; b) a glycan unit comprising or consisting of galactose, a catalyst and, optionally water; c) a glycan unit comprising or consisting of mannose, a catalyst and, optionally water; d) a glycan unit comprising or consisting of arabinose, a catalyst and, optionally water; e) a glycan unit comprising or consisting of rhamnose, a catalyst and, optionally water; f) a glycan unit comprising or consisting of xylose, a catalyst and, optionally water; g) a glycan unit comprising or consisting of fucose, a catalyst and, optionally water; h) a glycan unit comprising or consisting of fructose, a catalyst and, optionally water; or h) any combination of glycan units (e.g., two, three, four, or five glycan units) comprising or consisting of glucose, galactose, mannose, arabinose, rhamnose, xylose, fucose, or fructose, and a catalyst and, optionally water.

In some embodiments, the glycan polymer preparation property comprises one or more (e.g., two, three, four, five, or more) of: a) the average degree of branching (DB) of glycans in the glycan polymer preparation; b) the average degree of polymerization (DP) of the glycan polymer preparation; c) the ratio of alpha- to beta-glycosidic bonds present in the glycan polymer preparation; d) the final solubility limit in water of the glycan polymer preparation; or e) the level of impurities, e.g., impurities that alter the color or taste of the glycan polymer preparation. In some embodiments, the method further comprises one, two or three steps of: i) a demonomerization step; ii) a de-ashing step; and/or iii) de-colorization step. In some embodiments, the method further comprises a demonomerization step (e.g., by microfiltration or SMB chromatography). In some embodiments, the method further comprises a de-ashing step, e.g., comprising one or both anionic and cationic exchange chromatography. In some embodiments, the method further comprises a decolorization step, e.g., comprising using granular activated carbon or powdered activated carbon.

In some embodiments, the method further comprises derivatizing a component of the reaction mixture or glycan polymer preparation with an entity or a functional group. In some embodiments, the entity or function group comprises one or more pendant functional groups independently selected from the group consisting of carboxylic acids, sugar alcohols, amino acids, amino sugars, alcohols, sulfate and phosphate.

In some embodiments, the method comprises controlling 1, 2, 3, 4, 5, 6 or 7 predetermined properties, e.g., independently monitoring or controlling said properties, wherein the predetermined properties comprise: a) the average degree of branching (DB) of glycans in the glycan polymer preparation; b) the average degree of polymerization (DP) of the glycan polymer preparation; c) the ratio of alpha- to beta-glycosidic bonds present in the glycan polymer preparation; d) the final solubility limit in water of the glycan polymer preparation; e) the ratio of higher energy bonds (e.g., 1,2- or 1,3-bonds) to lower energy bonds (e.g., 1,4- or 1,6-bonds) of the glycan polymer preparation; f) the level of impurities, e.g., impurities that alter the color or taste of the glycan polymer preparation; g) the level of fermentability of the glycan polymer preparation; or h) the degree of isomerization of glycan units (e.g., L:D isomers) of the glycan polymer preparation.

In some embodiments, the method comprises monitoring 1, 2, 3, 4, 5, 6 or 7 predetermined properties, e.g., independently monitoring or controlling said properties, wherein the predetermined properties comprise: a) the average degree of branching (DB) of glycans in the glycan polymer preparation; b) the average degree of polymerization (DP) of the glycan polymer preparation; c) the ratio of alpha- to beta-glycosidic bonds present in the glycan polymer preparation; d) the final solubility limit in water of the glycan polymer preparation; e) the ratio of higher energy bonds (e.g., 1,2- or 1,3-bonds) to lower energy bonds (e.g., 1,4- or 1,6-bonds) of the glycan polymer preparation; f) the level of impurities, e.g., impurities that alter the color or taste of the glycan polymer preparation; g) the level of fermentability of the glycan polymer preparation; or h) the degree of isomerization of glycan units (e.g., L:D isomers) of the glycan polymer preparation.

In some embodiments, one or more reaction parameter of the method is measured. In some embodiments, responsive to the measurement of a reaction parameter, that reaction parameter is adjusted, e.g., in response to a measurement of temperature, temperature is adjusted. In some embodiments, responsive to the measurement of a first reaction parameter, a second reaction parameter is adjusted, e.g., in response to a measurement of temperature (e.g., of the boiling point, e.g., as a measure of the concentration), temperature or pressure is adjusted (e.g., an adjustment of the evaporation rate by affecting one or both of temperature and pressure).

In some embodiments, one or both of catalyst loading and temperature is measured. In some embodiments, responsive to the measurement of one or both of catalyst loading and temperature, that reaction parameter(s) is/are adjusted. In some embodiments, responsive to the measurement one or both of catalyst loading and temperature, another reaction parameter is adjusted, e.g., in response to a measurement of temperature or catalyst loading, pressure or water level is adjusted.

In some embodiments, the method comprises adjusting the amount of water in the reaction mixture. In some embodiments, the method comprises removing water from the reaction mixture. In some embodiments, the method comprises adding water to the reaction mixture. In some embodiments, the amount of water is adjusted responsive to a property of the reaction mixture, e.g., a preparation property e.g., viscosity, or average DP. In some embodiments, the amount of water is adjusted responsive to a stage of the reaction mixture, e.g., elapsed time after an event, e.g., from initiation of catalysis, addition or removal of a component, e.g., water. In some embodiments, the amount of water is adjusted responsive to a reaction parameter, e.g., reaction time, temperature, viscosity, amount of water, and catalyst loading.

In some embodiments, the glycan polymer preparation is suitable for pharmaceutical use and optionally comprises a pharmaceutically acceptable excipient or solvent. In some embodiments, the glycan polymer preparation is suitable for use in a medical treatment. In some embodiments, the glycan polymer preparation is suitable for use as a food. In some embodiments, the glycan polymer preparation is suitable for use as a feed.

In another aspect, the present invention features a method of making a product comprising a) providing a glycan polymer preparation made by a method described herein (e.g., providing by practicing a method described herein); and b) performing a further physical manipulation of the glycan polymer preparation, thereby providing a product. In some embodiments, b) comprises one or more of: i) dividing the glycan polymer preparation into a plurality of aliquots, e.g., aliquots of different weight; ii) evaluating the glycan polymer preparation to determine if it meets a value, e.g., a predetermined value, for a preparation property; iii) packaging the glycan polymer preparation; iv) adding another component, e.g., a sugar component, excipient, anti-caking agent, flowability agent, or absorbent, to the glycan polymer preparation; v) formulating the glycan polymer preparation into a syrup, a crystalline solid (e.g., a powder), a non-crystalline solid (e.g., a glass); vi) lyophilizing the glycan polymer preparation; vii) freezing the glycan polymer preparation; viii) shipping the glycan polymer preparation to a different location; ix) forming the glycan polymer preparation into a food product; x) responsive a determination that the glycan reparation meets a value, e.g., a predetermined value for a preparation property, forming the glycan polymer preparation into a food product; xi) forming the glycan polymer preparation into a pharmaceutical product; xii) responsive a determination that the glycan polymer preparation meets a value, e.g., a predetermined value for a preparation property, forming the glycan polymer preparation into a pharmaceutical product; xiii) forming the glycan polymer preparation into a feed product; xiv) responsive a determination that the glycan reparation meets a value, e.g., a predetermined value for a preparation property, forming the glycan polymer preparation into a feed product; xv) determining if the glycan polymer preparation meets specifications (e.g., pharmaceutical GMP specifications or food GMP specifications); xvi) formulating the glycan polymer preparation as pharmaceutically acceptable dosage form, e.g., as a sachet, pill, tablet, capsule, syrup or gummy; xvii) formulating the glycan polymer preparation as a food product, e.g., a beverage, powdered beverage mix, bar, candy, dairy product, confection, baked good, gummy; xviii) formulating the glycan polymer preparation as a feed product, e.g., a feed ingredient, feed material, feed additive; xix) formulating the glycan as a supplement; xx) formulating the glycan as a medical food; or xxi) formulating the glycan as an animal health product.

In another aspect, the present invention features a reactor charged with i) a reaction mixture described herein; ii) a glycan polymer preparation described herein that is made from the reaction mixture in i); or iii) a mixture of i) and ii). In some embodiments, the reactor comprises a vertical or horizontal reactor. In some embodiments, the reactor is configured for continuous flow operation. In some embodiments, the reactor is configured for batch operation. In some embodiments, the reactor is configured for perfusion operation.

In some embodiments, the reaction mixture, glycan polymer preparation, or combination thereof, comprises 5 kg of glycans or glycan units. In some embodiments, the reaction mixture, glycan polymer preparation, or combination thereof, comprises 50 kg, 100 kg, 250 kg, or 500 kg of glycan polymers or glycan units. In some embodiments, the reaction mixture, glycan polymer preparation, or combination thereof, comprises 50-1000 kg of glycans or glycan units. In some embodiments the reaction mixture, glycan polymer preparation, or combination thereof, comprises 100-1000 kg of glycans or glycan units. In some embodiments, the reaction mixture, glycan polymer preparation, or combination thereof, comprises 200-1000 kg of glycans or glycan units. In some embodiments, the reactor has a volume sufficient to comprise 2 l, 20 l, 100 l, 250 l, 500 l, or 1000 liters of reaction mixture. In some embodiments, the reactor has a volume sufficient to comprise about 20 l (e.g., 22 l), 175 l (e.g., 189 l), 2,500 l (e.g., 2,839 l), 7,500 l (e.g., 7,750 l), or about 10,000 liters (e.g., 11,356 l) of reaction mixture.

In another aspect, the present invention features a glycan polymer preparation obtainable by a method described herein. In some embodiments, the glycan polymer preparation has a mass described herein, e.g., at least about 50 kg, or at least about 100 kg.

In some embodiments, the glycan polymer preparation is obtainable by any of the methods described herein for use as a pharmaceutical composition. In some embodiments, the glycan polymer preparation is obtainable by any of the methods described herein for use in a medical treatment. In some embodiments, the glycan polymer preparation is obtainable by any of the methods described herein for use as a food. In some embodiments, the glycan polymer preparation is obtainable by any of the methods described herein for use as a feed.

In another aspect, the present invention features a glycan polymer preparation comprising at least 10 kg (e.g., at least 20 kg, 30 kg, 40 kg, 50 kg, 60 kg, 70 kg, 80 kg, 90 kg, 100 kg, 250 kg, 500 kg, or more), wherein the glycan polymer preparation comprises one or more (e.g., two, three, four, five, six, seven, eight, or nine) of the following properties (including bulk properties): i) the glycan polymer preparation comprises glycans that comprise glucose, galactose, arabinose, mannose, fructose, xylose, fucose, or rhamnose glycan units; ii) the average degree of branching (DB) of the glycans in the glycan polymer preparation is 0, between 0.01 and 0.6, between 0.05 and 0.5, between 0.1 and 0.4, or between 0.15 and 0.4; iii) at least 50% (at least 60%, 65%, 70%, 75%, 80%, or 85%, or less than 50%) of the glycans in the glycan polymer preparation have a degree of polymerization (DP) of at least 3 and less than 30 glycan units, at least 2 and less than 10 glycan units, at least 5 and less than 25 glycan units, or at least 10 and less than 35 glycan units (optionally, wherein the glycan unit is a monomer, e.g., a monosugar); iv) the average DP (mean DP) of the glycan polymer preparation is between about 2 and 5, between about 5 and 8, between about 8 and 13, between about 13 and 25, between about 5 and 15, between about 5 and 20, or between about 5-15; v) the ratio of alpha- to beta-glycosidic bonds present in the glycans of the glycan polymer preparation is 0, or between about 0.8:1 to about 5:1, between about 1:1 to about 5:1, between about 1:1 to about 3:1, between about 3:2 to about 2:1, or between about 3:2 to about 3:1, vi) the glycan polymer preparation comprises between 15 mol % and 75 mol % (between 20 mol % and 60 mol %, between 25 mol % and 50 mol %, or between 30 mol % and 45 mol %) 1,6 glycosidic bonds; vii) the glycan polymer preparation comprises between 1 mol % and 40 mol % (between 1 mol % and 30 mol %, between 5 mol % and 25 mol %, between 10 mol % and 20 mol %) of at least one, two, or three of 1,2; 1,3; and 1,4 glycosidic bonds; viii) the glycan polymer preparation has a final solubility limit in water of at least about 50 (at least about 60, 70, at least about 75, or less than 50) Brix at 23° C.; or ix) the glycan polymer preparation has a dietary fiber content (e.g., as measured by AOAC 2009.01) of at least 50% (at least 60%, 70%, 80%, or at least 90%, or less than 50%), x) any combination of: —two of: i), ii), iii), iv), v), vi), vii), viii), and ix); —three of: i), ii), iii), iv), v), vi), vii), viii), and ix); —four of: i), ii), iii), iv), v), vi), vii), viii), and ix); —five of: i), ii), iii), iv), v), vi), vii), viii), and ix); —six of: i), ii), iii), iv), v), vi), vii), viii), and ix); —seven of: i), ii), iii), iv), v), vi), vii), viii), and ix); —eight of: i), ii), iii), iv), v), vi), vii), viii), and ix); or—all of: i), ii), iii), iv), v), vi), vii), viii), and ix).

In another aspect, the present invention features a large scale reaction mixture comprising: i) one or more glycan units (e.g., sugar monomer, dimers, or oligomers) at an aqueous concentration of at least 0.10 kg, 0.15 kg, 0.20 kg, 0.25 kg, 0.30 kg, 0.35 kg, 0.40 kg, 0.45 kg, or 0.50 kg, and ii) an effective amount of an acid catalyst to form a glycosidic bond between two glycan units, and, optionally, iii) water; wherein the large scale reaction mixture comprises at least 5 kg (e.g., at least 10 kg, 20 kg, 30 kg, 40 kg, 50 kg, 60 kg, 70 kg, 80 kg, 90 kg, 100 kg, 250 kg, 500 kg, or more) of a glycan unit. In some embodiments, the large scale reaction mixture is used to make a glycan polymer preparation described herein.

In another aspect, the present invention features a large scale reaction intermediate comprising at least 10 kg (e.g., at least 20 kg, 30 kg, 40 kg, 50 kg, 60 kg, 70 kg, 80 kg, 90 kg, 100 kg, 250 kg, 500 kg, or more) of a glycan polymer preparation.

In any and all aspects, in some embodiments, the glycan polymer preparation comprises one or more (e.g., two, three, four, five, six, seven, eight, or nine) of the following properties (including bulk properties): i) the glycan polymer preparation comprises glycans that comprise glucose, galactose, arabinose, mannose, fructose, xylose, fucose, or rhamnose glycan units; ii) the average degree of branching (DB) of the glycans in the glycan polymer preparation is 0, between 0.01 and 0.6, between 0.05 and 0.5, between 0.1 and 0.4, or between 0.15 and 0.4; iii) at least 50% (at least 60%, 65%, 70%, 75%, 80%, or 85%, or less than 50%) of the glycans in the glycan polymer preparation have a degree of polymerization (DP) of at least 3 and less than 30 glycan units, at least 2 and less than 10 glycan units, at least 5 and less than 25 glycan units, or at least 10 and less than 35 glycan units (optionally, wherein the glycan unit is a monomer, e.g., a monosugar); iv) the average DP (mean DP) of the glycan polymer preparation is between about 2 and 5, between about 5 and 8, between about 8 and 13, between about 13 and 25, between about 5 and 15, between about 5 and 20, or between about 5-15; v) the ratio of alpha- to beta-glycosidic bonds present in the glycans of the glycan polymer preparation is 0, or between about 0.8:1 to about 5:1, between about 1:1 to about 5:1, between about 1:1 to about 3:1, between about 3:2 to about 2:1, or between about 3:2 to about 3:1, vi) the glycan polymer preparation comprises between 15 mol % and 75 mol % (between 20 mol % and 60 mol %, between 25 mol % and 50 mol %, or between 30 mol % and 45 mol %) 1,6 glycosidic bonds; vii) the glycan polymer preparation comprises between 1 mol % and 40 mol % (between 1 mol % and 30 mol %, between 5 mol % and 25 mol %, between 10 mol % and 20 mol %) of at least one, two, or three of 1,2; 1,3; and 1,4 glycosidic bonds; viii) the glycan polymer preparation has a final solubility limit in water of at least about 50 (at least about 60, 70, at least about 75, or less than 50) Brix at 23° C.; or ix) the glycan polymer preparation has a dietary fiber content (e.g., as measured by AOAC 2009.01) of at least 50% (at least 60%, 70%, 80%, or at least 90%, or less than 50%), x) any combination of: —two of: i), ii), iii), iv), v), vi), vii), viii), and ix); —three of: i), ii), iii), iv), v), vi), vii), viii), and ix); —four of: i), ii), iii), iv), v), vi), vii), viii), and ix); —five of: i), ii), iii), iv), v), vi), vii), viii), and ix); —six of: i), ii), iii), iv), v), vi), vii), viii), and ix); —seven of: i), ii), iii), iv), v), vi), vii), viii), and ix); —eight of: i), ii), iii), iv), v), vi), vii), viii), and ix); or—all of: i), ii), iii), iv), v), vi), vii), viii), and ix).

Provided herein are methods of making a glycan polymer preparation having a mean degree of polymerization (DP) of at least 3. In some embodiments, the methods comprise:

A) providing a reaction mixture comprising:
- i) one or more (e.g. one, two or three distinct) glycan units (e.g., sugar monomer, dimers, or oligomers), e.g., the glycan units comprising or consisting of glucose, galactose, mannose, rhamnose, fucose, xylose or arabinose or a mixture of glycan units comprising or consisting of any two, three, four or five of glucose, galactose, mannose, rhamnose, fucose, xylose or arabinose, wherein optionally the glycan units are at an aqueous concentration of at least 0.30 kg/kg (e.g., between 0.3 kg/kg to 0.5 kg/kg), and
- ii) an effective amount of an acid catalyst to form a glycosidic bond between two glycan units (e.g., a non-enzymatic, or non-protein catalyst, e.g., between 1% and 10% (catalyst dry mass/glycan unit dry mass), e.g., of a solid and/or polymeric catalyst or, e.g., 0.1%-10% of a soluble catalyst), and, optionally,
- iii) water (e.g., no water (0%), or less than, e.g., 30% water); and B) subjecting the reaction mixture to conditions that result in the evolution of $H_2O$ at a rate of at least 6 g of evolved $H_2O$/kg input glycan/hour (e.g., between about 6 g of evolved $H_2O$/kg input glycan/hour and about 42 g of evolved $H_2O$/kg input glycan/hour); and optionally,
- i) separating the glycan polymer preparation from the acid catalyst, and/or
- ii) acquiring a value for a property of the glycan polymer preparation (a glycan polymer property) and optionally onward processing the glycan polymer preparation if a mean DP of at least about 3 to about 15 (e.g., mean DP of 5-10, 5-15, 4-12 or 6-12) is met, thereby making a glycan polymer preparation with a mean DP of at least 3, wherein the mass of the glycan polymer preparation is at least 10 kg (e.g. about 10 kg to about 1,000 kg or 100 kg to about 5,000 kg), optionally, wherein the (unreacted) glycan unit content (e.g., monomeric glycan units) is between 1% and 20% (e.g., between 5% and 15% or 1% and 10%);

optionally, wherein the aqueous concentration is achieved by controlling the temperature and pressure of the reaction mixture; further optionally, wherein the conditions comprise achieving a temperature of between 100° C. and 160° C. at atmospheric pressure or equivalent temperature ranges at other pressures, e.g., to achieve an evolution of $H_2O$ at a rate of at least 6 g of evolved $H_2O$/kg input glycan/hour (e.g., between about 6 g of evolved $H_2O$/kg input glycan/hour and about 42 g of evolved $H_2O$/kg input glycan/hour); optionally, wherein the conditions comprise achieving a viscosity of the reaction mixture between about 5,000 and 75,000 cP; optionally, wherein the reaction mixture comprises less than 10% sorbitol (by mass) and/or less than 10% citric acid (by mass); optionally, wherein the reaction mixture does not comprise an active form of a glycosidic linkage modifying enzyme; optionally, wherein the glycan unit is a monomer; optionally, wherein the glycan unit is a dimer; optionally, wherein glycan polymer preparation comprises more than 90% glucose glycan units (e.g., 100% glucose glycan units); optionally, wherein the glycan units consist of any two of glucose, galactose, mannose and arabinose; optionally, wherein the glycan units consist of any three of glucose, galactose, mannose and arabinose. Optionally, the method further comprises one or more of the following steps:

- a demonomerization step (e.g., by microfiltration or SMB chromatography),
- a de-ashing step, e.g., comprising one or both anionic and cationic exchange chromatography,
- a de-colorization step, e.g., comprising using an adsorbent material, e.g., an adsorbent resin,
- a step of formulating the glycan polymer preparation into a powder (e.g., a dry powder), or a step of formulating the glycan polymer preparation into a syrup.

Optionally, the aforementioned method thereby produces a glycan polymer preparation comprising at least two (e.g., two, three, four, five, or six) of (the following properties (glycan polymer properties)):

i) a glycosidic linkage distribution, (e.g., with a reference value), of (e.g., characterized as): 3-30 mol % (e.g., 5-30 mol %) 1,2-glycosidic bonds; 3-30 mol % (e.g., 10-30 mol %) 1,3-glycosidic bonds, 3-30 mol % (e.g., 5-30 mol %) 1,4-glycosidic bonds, and 10-60 mol % (e.g., 30-60 mol %) of 1,6-glycosidic bonds (e.g., for xylose, fucose and arabinose containing glycan polymer preparation: 0-60 mol % of 1,6-glycosidic bonds, e.g. 0 mol %);

ii) an average (or mean) DP, e.g., with a reference value, of: about DP3 to about DP15 (e.g., mean DP of about DP5 to about DP10, about DP5 to about DP15, about DP4 to about DP12 or about DP6 to about DP12))

iii) an alpha:beta glycosidic bond ratio (e.g., with a reference value) of: about 1:1 to about 4:1 (e.g., about 1:1 to about 2:1 or about 1:1 to about 3:1), optionally, the preparation comprising about 50% to about 90% alpha glycosidic bonds (e.g., about 55% to about 75%, or about 50% to about 70% alpha glycosidic bonds), further optionally, the preparation comprising about 10% to about 50% beta glycosidic bonds (e.g., about 25% to about 45%, or about 30% to about 50% beta glycosidic bonds);

iv) degree of branching (DB) (e.g., with a reference value) of: 0.1 to 0.8 (e.g., 0.1-0.5 or 0.1-0.6); and/or v) a polydispersity (PD) of between about 1 and 2.5 (e.g., between about 1.1 and about 2.2), vi) a total furanose content of between about 1% and about 40% (e.g., between about 5% and 30%, or between about 1% and 15%), optionally, wherein the final solubility limit in water of the glycan polymer preparation is at least 50 Brix at 23° C., further optionally, wherein the glycan polymer preparation has a total dietary fiber content of at least 70% (as measured by the method AOAC 2009.01), optionally, wherein the glycan polymer preparation is pharmaceutical grade (e.g., manufactured under pharmaceutical GMP), e.g., to manufacture and/or formulate a pharmaceutical composition; optionally, wherein the glycan polymer preparation is food grade (e.g., manufactured under food GMP), e.g., to manufacture and/or formulate a food ingredient, optionally, wherein the glycan polymer preparation is suitable for consumption by animals, and optionally comprises another feed ingredient or carrier, optionally, wherein the glycan polymer preparation is formulated for enteral administration (e.g. oral, and rectal). In some embodiments, a glycan preparation comprising the aforementioned properties is provided. In some embodiments, a glycan preparation obtainable by (or producible from) the aforementioned method (or process) is provided. In one embodiment, the glycan preparation has the characteristics of a glycan preparation selected from Table 4a and 4b. In another aspect, the invention is directed to a glycan preparation (e.g., produced by the above method) that comprises:

i) glycan polymers that comprise (e.g., glucose or glucose and galactose) glycan units;

ii) the average degree of branching (DB) of the glycan polymers in the glycan preparation is between 0.1 and 0.4;

iii) 45% to 55% of the glycan polymers in the glycan preparation have a degree of polymerization (DP) of at least 3 and less than or equal to 10 glycan units;

iv) the average DP (mean DP) of the glycan preparation is between about 5 and 8;

v) the ratio of alpha- to beta-glycosidic bonds present in the glycan polymers of the glycan preparation is between about 1:1 to about 3:1;

vi) the glycan preparation comprises between 20 mol % and 60 mol % 1,6 glycosidic bonds;

vii) the glycan preparation comprises between 5 mol % and 25 mol % of at least one, two, or three of 1,2; 1,3; and 1,4 glycosidic bonds;

viii) the glycan preparation has a final solubility limit in water of at least about 70 Brix at 23° C.;

ix) the glycan preparation has a dietary fiber content of at least 70%; or x) any combination of two, three, four, five, six, seven, eight, or nine of i), ii), iii), iv), v), vi), vii), viii), and ix).

Further provided herein are methods of making a glycan polymer preparation having a mean degree of polymerization (DP) of at least 4 comprising:

A) providing a reaction mixture comprising:
i) one or more glycan units (e.g., sugar monomer) consisting of glucose, optionally wherein the one or more glycan units are at an aqueous concentration of at least 0.30 kg/kg (e.g., between 0.3 kg/kg to 0.5 kg/kg), and ii) an effective amount of an acid catalyst to form a glycosidic bond between two glycan units (e.g., a non-enzymatic, or non-protein catalyst, e.g., between 1% and 10% (catalyst dry mass/glycan unit dry mass), e.g., of a solid and/or polymeric catalyst or, e.g., 0.1%-10% of a soluble catalyst), and, optionally, iii) water (e.g., no water (0%), or less than, e.g., 30% water); and B) subjecting the reaction mixture to conditions that result in the evolution of $H_2O$ at a rate of at least 6 g of evolved $H_2O$/kg input glycan/hour (e.g., between about 6 g of evolved $H_2O$/kg input glycan/hour and about 42 g of evolved $H_2O$/kg input glycan/hour); and optionally, i) separating the glycan polymer preparation from the acid catalyst, and/or ii) acquiring a value for a property of the glycan polymer preparation (a glycan polymer property) and optionally onward processing the glycan polymer preparation if a mean DP of at least about 4 to about 12 (e.g., mean DP of 5-10) is met, thereby making a glycan polymer preparation with a mean DP of at least 4, wherein the mass of the glycan polymer preparation is at least 10 kg (e.g. about 10 kg to about 1,000 kg or 100 kg to about 5,000 kg), optionally, wherein the (unreacted) glycan unit content (e.g., monomeric glycan units) is between 1% and 20% (e.g., between 5% and 15% or 1% and 10%);

optionally, wherein the aqueous concentration is achieved by controlling the temperature and pressure of the reaction mixture; further optionally, wherein the conditions comprise achieving a temperature of between 100° C. and 160° C. at atmospheric pressure or equivalent temperature ranges at other pressures, e.g., to achieve an evolution of $H_2O$ at a rate of at least 6 g of evolved $H_2O$/kg input glycan/hour (e.g., between about 6 g of evolved $H_2O$/kg input glycan/hour and about 42 g of evolved $H_2O$/kg input glycan/hour); optionally, wherein the conditions comprise achieving a viscosity of the reaction mixture between about 5,000 and 75,000 cP; optionally, wherein the reaction mixture comprises less than 10% sorbitol (by mass) and/or less than 10% citric acid (by mass); optionally, wherein the reaction mixture does not comprise an active form of a glycosidic linkage modifying enzyme; optionally, wherein the glycan unit is a monomer; optionally, wherein glycan polymer preparation comprises more than 90% glucose glycan units (e.g., 100% glucose glycan units). Optionally, the method further comprises one or more of the following steps:

a demonomerization step (e.g., by microfiltration or SMB chromatography), a de-ashing step, e.g., comprising one or both anionic and cationic exchange chromatography, a de-colorization step, e.g., comprising using an adsorbent material, e.g., an adsorbent resin, a step of formulating the glycan polymer preparation into a powder (e.g., a dry powder), or a step of formulating the glycan polymer preparation into a syrup.

Optionally, the aforementioned method thereby produces a glycan polymer preparation comprising at least two (e.g., five or six) of (the following properties (glycan polymer properties)):

i) a glycosidic linkage distribution, (e.g., with a reference value), of (e.g., characterized as): 5-30 mol % 1,2-glycosidic bonds; 5-30 mol % 1,3-glycosidic bonds, 5-30 mol % 1,4-glycosidic bonds, and 30-60 mol % of 1,6-glycosidic bonds;

ii) an average (or mean) DP, e.g., with a reference value, of: about DP4 to about DP12 (e.g., mean DP of about DP5 to about DP10)

iii) an alpha:beta glycosidic bond ratio (e.g., with a reference value) of: about 1:1 to about 2:1, optionally, the preparation comprising about 45% to about 70% alpha glycosidic bonds, further optionally, the preparation comprising about 30% to about 55% beta glycosidic bonds;

iv) degree of branching (DB) (e.g., with a reference value) of: 0.1-0.4; and/or v) a polydispersity (PD) of between about between about 1.1 and about 2.0 (e.g., about 1.1 to 1.8), vi) a total furanose content of between about 1% and about 20%, optionally, wherein the final solubility limit in water of the glycan polymer preparation is at least 50 Brix at 23° C., further optionally, wherein the glycan polymer preparation has a total dietary fiber content of at least 70% (as measured by the method AOAC 2009.01), optionally, wherein the glycan polymer preparation is pharmaceutical (e.g., manufactured under pharmaceutical GMP), e.g., to manufacture and/or formulate a pharmaceutical composition; optionally, wherein the glycan polymer preparation is food grade (e.g., manufactured under food GMP), e.g., to manufacture and/or formulate a food ingredient, optionally, wherein the glycan polymer preparation is formulated for enteral administration (e.g. oral, and rectal).

In some embodiments, a glycan preparation comprising the aforementioned properties is provided. In some embodiments, a glycan preparation obtainable by (or producible from) the aforementioned method (or process) is provided. In some embodiments, the glycan polymer preparation is glu100. In one embodiment, the glycan preparation has the characteristics of a Glu100 glycan preparation from Table 4a and 4b. In one embodiment, the glycan preparation has the characteristics of Glu100-94 or Glu100-5 from Table 4a and 4b. In another aspect, the invention is directed to a glycan preparation (e.g., produced by the above method) that comprises:

i) glycan polymers that comprise glucose glycan units;

ii) the average degree of branching (DB) of the glycan polymers in the glycan preparation is between 0.1 and 0.4;

iii) 45% to 55% of the glycan polymers in the glycan preparation have a degree of polymerization (DP) of at least 3 and less than or equal to 10 glycan units;

iv) the average DP (mean DP) of the glycan preparation is between about 5 and 8;

v) the ratio of alpha- to beta-glycosidic bonds present in the glycan polymers of the glycan preparation is between about 1:1 to about 1.5:1;

vi) the glycan preparation comprises between 20 mol % and 60 mol % 1,6 glycosidic bonds;

vii) the glycan preparation comprises between 5 mol % and 25 mol % of at least one, two, or three of 1,2; 1,3; and 1,4 glycosidic bonds;

viii) the glycan preparation has a final solubility limit in water of at least about 70 Brix at 23° C.;

ix) the glycan preparation has a dietary fiber content of at least 70%; or x) any combination of two, three, four, five, six, seven, eight, or nine of i), ii), iii), iv), v), vi), vii), viii), and ix).

Yet further provided herein are methods of making a glycan polymer preparation having a mean degree of polymerization (DP) of at least 5 comprising:

A) providing a reaction mixture comprising:
  i) one or more (e.g. two) glycan units (e.g., sugar monomer or dimer), e.g., a monomeric glycan units consisting of glucose or galactose, or a dimeric glycan unit consisting of glucose and galactose, optionally wherein the glycan units are at an aqueous concentration of at least 0.30 kg/kg (e.g., between 0.3 kg/kg to 0.5 kg/kg), and
  ii) an effective amount of an acid catalyst to form a glycosidic bond between two glycan units (e.g., a non-enzymatic, or non-protein catalyst, e.g., between 1% and 10% (catalyst dry mass/glycan unit dry mass), e.g., of a solid and/or polymeric catalyst or, e.g., 0.1%-10% of a soluble catalyst), and, optionally,
  iii) water (e.g., no water (0%), or less than, e.g., 30% water); and B) subjecting the reaction mixture to conditions that result in the evolution of $H_2O$ at a rate of at least 6 g of evolved $H_2O$/kg input glycan/hour (e.g., between about 6 g of evolved $H_2O$/kg input glycan/hour and about 42 g of evolved $H_2O$/kg input glycan/hour); and optionally,
  i) separating the glycan polymer preparation from the acid catalyst, and/or
  ii) acquiring a value for a property of the glycan polymer preparation (a glycan polymer property) and optionally onward processing the glycan polymer preparation if a mean DP of at least about 5 to about 15 (e.g., mean DP of 6-12) is met, thereby making a glycan polymer preparation with a mean DP of at least 5, wherein the mass of the glycan polymer preparation is at least 10 kg (e.g. about 10 kg to about 1,000 kg or 100 kg to about 5,000 kg), optionally, wherein the (unreacted) glycan unit content (e.g., monomeric glycan units or dimeric glycan units) is between 1% and 20% (e.g., between 5% and 15% or 1% and 10%);

optionally, wherein the aqueous concentration is achieved by controlling the temperature and pressure of the reaction mixture; further optionally, wherein the conditions comprise achieving a temperature of between 100° C. and 160° C. at atmospheric pressure or equivalent temperature ranges at other pressures, e.g., to achieve an evolution of $H_2O$ at a rate of at least 6 g of evolved $H_2O$/kg input glycan/hour (e.g., between about 6 g of evolved $H_2O$/kg input glycan/hour and about 42 g of evolved $H_2O$/kg input glycan/hour); optionally, wherein the conditions comprise achieving a viscosity of the reaction mixture between about 5,000 and 75,000 cP; optionally, wherein the reaction mixture does not comprise an active form of a glycosidic linkage modifying enzyme; optionally, wherein the glycan unit is a monomer; optionally, wherein the glycan unit is a dimer; optionally, wherein glycan polymer preparation comprises about 50% glucose and about 50% galactose; optionally, wherein the glycan units consist of glucose and galactose. Optionally, the method further comprises one or more of the following steps:

a demonomerization step (e.g., by microfiltration or SMB chromatography), a de-ashing step, e.g., comprising one or both anionic and cationic exchange chromatography, a de-colorization step, e.g., comprising using an adsorbent material, e.g., an adsorbent resin, a step of formulating the glycan polymer preparation into a powder (e.g., a dry powder), or a step of formulating the glycan polymer preparation into a syrup.

Optionally, the aforementioned method thereby produces a glycan polymer preparation comprising at least two (e.g., five or six) of (the following properties (glycan polymer properties)):

i) a glycosidic linkage distribution, (e.g., with a reference value), of (e.g., characterized as): 5-30 mol % 1,2-glycosidic bonds; 5-30 mol % 1,3-glycosidic bonds, 5-30 mol % 1,4-glycosidic bonds, and 30-60 mol % of 1,6-glycosidic bonds;

ii) an average (or mean) DP, e.g., with a reference value, of: about DP5 to about DP15 (e.g., mean DP of about DP6 to about DP12);

iii) an alpha:beta glycosidic bond ratio (e.g., with a reference value) of: about 1:1 to about 3:1, optionally, the preparation comprising about 55% to about 75% alpha glycosidic bonds, further optionally, the preparation comprising about 25% to about 45% beta glycosidic bonds;

iv) degree of branching (DB) (e.g., with a reference value) of: 0.1 to 0.4; and/or v) a polydispersity (PD) of between about 1.1 and 2.5, vi) a total furanose content of between about 5% and 30%, optionally, wherein the final solubility limit in water of the glycan polymer preparation is at least 50 Brix at 23° C., further optionally, wherein the glycan polymer preparation has a total dietary fiber content of at least 70% (as measured by the method AOAC 2009.01), optionally, wherein the glycan polymer preparation is pharmaceutical grade (e.g., manufactured under pharmaceutical GMP), e.g., to manufacture and/or formulate a pharmaceutical composition; optionally, wherein the glycan polymer preparation is food grade (e.g., manufactured under food GMP), e.g., to manufacture and/or formulate a food ingredient, optionally, wherein the glycan polymer preparation is formulated for enteral administration (e.g. oral, and rectal).

In some embodiments, a glycan preparation comprising the aforementioned properties is provided. In some embodiments, a glycan preparation obtainable by (or producible from) the aforementioned method (or process) is provided. In some embodiments, the glycan polymer preparation is glu50gal50. In one embodiment, the glycan preparation has the characteristics of a Glu50Gal50 glycan preparation from Table 4a and 4b. In one embodiment, the glycan preparation has the characteristics of Glu50Gal50-23 from Table 4a and 4b.

In another aspect, the invention is directed to a glycan preparation (e.g., produced by the above method) that comprises:

i) glycan polymers that comprise glucose and galactose glycan units;

ii) the average degree of branching (DB) of the glycan polymers in the glycan preparation is between 0.1 and 0.4;

iii) 45% to 55% of the glycan polymers in the glycan preparation have a degree of polymerization (DP) of at least 3 and less than or equal to 10 glycan units;

iv) the average DP (mean DP) of the glycan preparation is between about 5 and 8;

v) the ratio of alpha- to beta-glycosidic bonds present in the glycan polymers of the glycan preparation is between about 2:1 to about 3:1;

vi) the glycan preparation comprises between 20 mol % and 60 mol % 1,6 glycosidic bonds;

vii) the glycan preparation comprises between 5 mol % and 25 mol % of at least one, two, or three of 1,2; 1,3; and 1,4 glycosidic bonds;

viii) the glycan preparation has a final solubility limit in water of at least about 70 Brix at 23° C.; and/or ix) the glycan preparation has a dietary fiber content of at least 70%;

optionally wherein, the glycan preparation comprises two, three, four, five, six, seven, eight, or nine of the selected properties of i), ii), iii), iv), v), vi), vii), viii), and ix).

In another aspect, the invention is directed to a glycan preparation (e.g., produced by the above method) that comprises:

i) glycan polymers that comprise glucose glycan units;

ii) the average degree of branching (DB) of the glycan polymers in the glycan preparation is between 0.1 and 0.4;

iii) 45% to 55% of the glycan polymers in the glycan preparation have a degree of polymerization (DP) of at least 3 and less than or equal to 10 glycan units;

iv) the average DP (mean DP) of the glycan preparation is between about 5 and 8;

v) the ratio of alpha- to beta-glycosidic bonds present in the glycan polymers of the glycan preparation is between about 2:1 to about 3:1;

vi) the glycan preparation comprises between 20 mol % and 60 mol % 1,6 glycosidic bonds;

vii) the glycan preparation comprises between 5 mol % and 25 mol % of at least one, two, or three of 1,2; 1,3; and 1,4 glycosidic bonds;

viii) the glycan preparation has a final solubility limit in water of at least about 70 Brix at 23° C.; and/or ix) the glycan preparation has a dietary fiber content of at least 70%;

optionally wherein, the glycan preparation comprises two, three, four, five, six, seven, eight, or nine of the selected properties of i), ii), iii), iv), v), vi), vii), viii), and ix).

In another aspect, the invention is directed to a glycan preparation (e.g., produced by the above method) that comprises:

i) glycan polymers that comprise glucose, galactose, or mannose glycan units;

ii) the average degree of branching (DB) of the glycan polymers in the glycan preparation is between 0.05 and 0.5;

iii) at least 50% of the glycan polymers in the glycan preparation have a degree of polymerization (DP) of at least 3 and less than 30 glycan units;

iv) the average DP (mean DP) of the glycan preparation is between about 5 and 20;

v) the ratio of alpha- to beta-glycosidic bonds present in the glycan polymers of the glycan preparation is between about 0.8:1 to about 5:1;

vi) the glycan preparation comprises between 15 mol % and 75 mol % 1,6 glycosidic bonds;

vii) the glycan preparation comprises between 1 mol % and 30 mol % of at least one, two, or three of 1,2; 1,3; and 1,4 glycosidic bonds;

viii) the glycan preparation has a final solubility limit in water of at least about 70 Brix at 23° C.; and/or ix) the glycan preparation has a dietary fiber content of at least 70%;

optionally wherein, the glycan preparation comprises two, three, four, five, six, seven, eight, or nine of the selected properties of i), ii), iii), iv), v), vi), vii), viii), and ix).

Yet further provided herein are methods of making a glycan polymer preparation having a mean degree of polymerization (DP) of at least 3 comprising:

A) providing a reaction mixture comprising:
  i) one or more (e.g. three distinct) glycan units (e.g., sugar monomer or dimer), e.g., the glycan units comprising or consisting of one of each glucose, galactose, and mannose, or a mixture of glycan units comprising or consisting of glucose, galactose, or mannose, at an aqueous concentration of at least 0.30 kg/kg (e.g., between 0.3 kg/kg to 0.5 kg/kg), and
  ii) an effective amount of an acid catalyst to form a glycosidic bond between two glycan units (e.g., a non-enzymatic, or non-protein catalyst, e.g., between 1% and 10% (catalyst dry mass/glycan unit dry mass), e.g., of a solid and/or polymeric catalyst or, e.g., 0.1%-10% of a soluble catalyst), and, optionally,
  iii) water (e.g., no water (0%), or less than, e.g., 30% water); and B) subjecting the reaction mixture to conditions that result in the evolution of $H_2O$ at a rate of at least 6 g of evolved $H_2O$/kg input glycan/hour (e.g., between about 6 g of evolved $H_2O$/kg input glycan/hour and about 42 g of evolved $H_2O$/kg input glycan/hour); and optionally,
  i) separating the glycan polymer preparation from the acid catalyst, and/or
  ii) acquiring a value for a property of the glycan polymer preparation (a glycan polymer property) and optionally onward processing the glycan polymer preparation if a mean DP of at least about 3 to about 15 is met, thereby making a glycan polymer preparation with a mean DP of at least 3, wherein the mass of the glycan polymer preparation is at least 10 kg (e.g. about 10 kg to about 1,000 kg or 100 kg to about 5,000 kg), optionally, wherein the (unreacted) glycan unit content (e.g., monomeric glycan units or dimeric glycan units) is between 1% and 20% (e.g., between 5% and 15% or 1% and 10%);

optionally, wherein the aqueous concentration is achieved by controlling the temperature and pressure of the reaction mixture; further optionally, wherein the conditions comprise achieving a temperature of between 100° C. and 160° C. at atmospheric pressure or equivalent temperature ranges at other pressures, e.g., to achieve an evolution of $H_2O$ at a rate of at least 6 g of evolved $H_2O$/kg input glycan/hour (e.g., between about 6 g of evolved $H_2O$/kg input glycan/hour and about 42 g of evolved $H_2O$/kg input glycan/hour); optionally, wherein the conditions comprise achieving a viscosity of the reaction mixture between about 5,000 and 75,000 cP; optionally; optionally, wherein the reaction mixture does not comprise an active form of a glycosidic linkage modifying enzyme; optionally, wherein the glycan unit is a monomer;

optionally, wherein the glycan unit is a dimer. Optionally, the method further comprises one or more of the following steps:

a demonomerization step (e.g., by microfiltration or SMB chromatography), a de-ashing step, e.g., comprising one or both anionic and cationic exchange chromatography, a de-colorization step, e.g., comprising using an adsorbent material, e.g., an adsorbent resin, a step of formulating the glycan polymer preparation into a powder (e.g., a dry powder), or a step of formulating the glycan polymer preparation into a syrup.

Optionally, the aforementioned method thereby produces a glycan polymer preparation comprising at least two (e.g., five or six) of (the following properties (glycan polymer properties)):

i) a glycosidic linkage distribution, (e.g., with a reference value), of (e.g., characterized as): 3-30 mol % 1,2-glycosidic bonds; 3-30 mol % 1,3-glycosidic bonds, 3-30 mol % 1,4-glycosidic bonds, and 10-60 mol % of 1,6-glycosidic bonds;

ii) an average (or mean) DP, e.g., with a reference value, of: about DP3 to about DP15;

iii) an alpha:beta glycosidic bond ratio (e.g., with a reference value) of: about 1:1 to about 4:1, optionally, the preparation comprising about 50% to about 90% alpha glycosidic bonds, further optionally, the preparation comprising about 10% to about 50% beta glycosidic bonds;

iv) degree of branching (DB) (e.g., with a reference value) of: 0.1-0.6; and/or v) a polydispersity (PD) of between about 1 and 2.5, vi) a total furanose content of between about 1% and about 40%, optionally, wherein the final solubility limit in water of the glycan polymer preparation is at least 50 Brix at 23° C., further optionally, wherein the glycan polymer preparation has a total dietary fiber content of at least 70% (as measured by the method AOAC 2009.01), optionally, wherein the glycan polymer preparation is pharmaceutical grade (e.g., manufactured under pharmaceutical GMP), e.g., to manufacture and/or formulate a pharmaceutical composition; optionally, wherein the glycan polymer preparation is food grade (e.g., manufactured under food GMP), e.g., to manufacture and/or formulate a food ingredient, optionally, wherein the glycan polymer preparation is formulated for enteral administration (e.g. oral, and rectal).

In some embodiments, a glycan preparation comprising the aforementioned properties is provided. In some embodiments, a glycan preparation obtainable by (or producible from) the aforementioned method (or process) is provided.

In another aspect, glycan preparation are provided herein that comprise a plurality of oligosaccharides that comprise Formula (I):

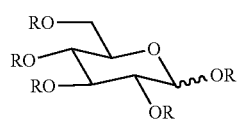
(I)

in which each R independently is selected from hydrogen, and Formulae (Ia), (Ib), (Ic), and (Id):

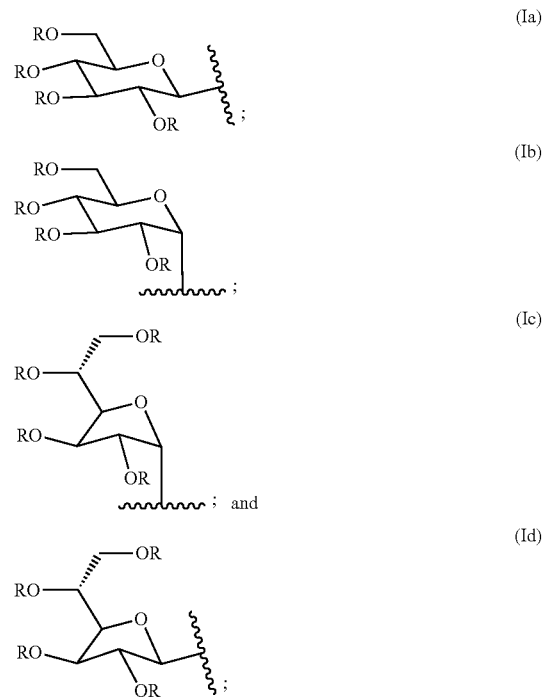

in which each R independently is as defined above.

In some embodiments, the glycan preparation (e.g., Glu100-94 or Glu100-5 from Table 4a and 4b) is produced by a process comprising: (a) heating a dextrose preparation comprising dextrose monomer, e.g., under agitation conditions, to a temperature in a range of 120° C. to 135° C.; (b) loading the dextrose preparation with a solid catalyst comprising acidic protons, e.g., in an amount such that the molar ratio of acidic protons to dextrose monomer is in a range of 0.016-0.022, thereby forming a reaction mixture; and (c) maintaining the reaction mixture at atmospheric pressure, at a temperature in a range of 120° C. to 135° C., under conditions that promote acid catalyzed oligosaccharide formation, until the weight percent of dextrose monomer in the glycan preparation is in a range of 14-17; (d) quenching the reaction mixture using water while bringing the temperature of the reaction mixture to 100° C. or below; and optionally (e) separating oligosaccharides from the acid catalyst, thereby obtaining the glycan preparation.

In some embodiments, the glycan preparation comprises <1% sorbitol. In certain embodiments, the glycan preparation comprises <0.1% sorbitol. In some embodiments, the mean degree of polymerization of all oligosaccharides is in a range of 5-6. In other embodiments, the mean degree of polymerization of all oligosaccharides is in a range of 4-9.

In some embodiments, the dextrose preparation comprises dextrose monohydrate or 70DS corn syrup. In some embodiments, heating comprises melting the dextrose preparation and/or heating the dextrose preparation under suitable conditions to achieve homogeneity and uniform heat transfer.

In some embodiments, the catalyst is a strong acid cation exchange resin having physical and chemical properties according to the following table:

TABLE 1

| Non-Limiting Example of Strong Acid Cation Exchange Resin Properties | | |
|---|---|---|
| Physical Form | | Amber translucent spherical beads |
| Matrix | | Styrene-DVB, gel |
| Function group | | Sulfonic acid |
| Ionic form as shipped | | H$^+$ form |
| Total volume capacity, min. | eq/L | 1.8 |
| | kgr/ft$^3$ as CaCO$_3$ | 39.3 |
| Moisture retention capacity | % | 50-56 |
| Particle size | | |
| Uniformity coefficient, max. | | 1.1 |
| Harmonic mean diameter | μm | 600 ± 50 |
| Whole uncracked beads | % | 95-100 |
| Total swelling (Na$^+$ → H$^+$) | % | 8 |
| Particle density | g/mL | 1.2 |
| Shipping density | g/L | 800 |
| | lbs/ft$^3$ | 50 |

In some embodiments, the catalyst comprises >3.0 mmol/g sulfonic acid moieties and <1.0 mmol/gram cationic moieties. In some embodiments, the catalyst has a nominal moisture content of 45-50 weight percent.

In some embodiments, glycan preparation is prepared by gradually increasing the temperature to about 130° C., under suitable conditions to achieve homogeneity and uniform heat transfer. In some embodiments, water is removed from the reaction mixture by evaporation. In some embodiments, the reaction mixture is maintained at 93-94 weight percent dissolved solids.

In some embodiments, the water is deionized water. In some embodiments, the water has a temperature of about 60-100° C. In some embodiments, the water is added to the reaction mixture under conditions sufficient to avoid solidifying the mixture. In some embodiments, separating comprises removing the catalyst by filtration. In some embodiments, the reaction mixture is cooled to below about 85° C. before filtering.

In some embodiments, the process of preparing a glycan preparation further comprises: (f) diluting the glycan preparation of (e) with, e.g., deionized water to a concentration of about 5-65 weight percent and passing the diluted glycan preparation through a cationic exchange resin; (g) passing the diluted glycan preparation through an anionic exchange resin; and (h) passing the diluted glycan preparation through a decolorizing polymer resin. In some embodiments, each of (f), (g), and (h) can be performed one or more times in any order.

In some embodiments, the glycan preparation further comprises water at a level below that which is necessary for microbial growth upon storage at room temperature. In some embodiments, the glycan preparation comprises water in a range of 24-33 weight percent. Methods for controlling moisture levels to address microbial growth are described in Ergun, R. et al, "Moisture and Shelf Life in Sugar Confections, Critical Reviews in Food Science and Nutrition", 2010, 50:2, 162-192; and NIROOMAND, F. et al. "Fate of Bacterial Pathogens and Indicator Organisms in Liquid Sweeteners" Journal of Food Protection, Vol. 61, No. 3, 1998, Pages 295-299; the contents of each are incorporated in their entirety.

In some embodiments, the glycan preparation has a MWw (g/mol) in a range of 852-1475. In some embodiments, the glycan preparation has a MWn (g/mol) in a range of 612-912. In some embodiments, the glycan preparation has a pH in a range of 3.0-7.5. In some embodiments, the glycan preparation comprises oligomers having two or more repeat units (DP2+) in a range of 83-86 weight percent. In some embodiments, the glycan preparation is substantially non-absorbable in a human. In one embodiments, the glycan preparation is glu100. In one embodiment, the glycan preparation has the characteristics of Glu100-94 or Glu100-5 from Table 4a and 4b.

In another aspect the invention relates to a glycan preparation comprising a plurality of glycans selected from Formula (II) and Formula (III):

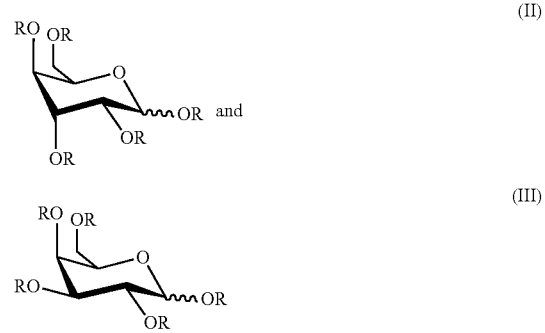

wherein each R independently is selected from hydrogen, and Formulae (IIa), (IIb), (IIc), (IId), (IIIa), (IIIb), (IIIc), (IIId):

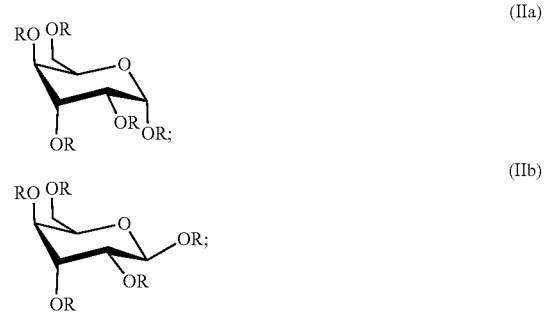

-continued

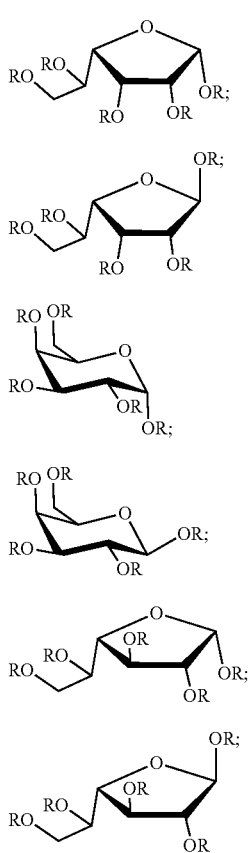

(IIc)

(IId)

(IIIa)

(IIIb)

(IIIc)

(IIId)

wherein each R independently is as defined above. In some embodiments, the glycan preparation (e.g., Glu50Gal50-23 from Table 4a and 4b) is produced by a process comprising:

(a) heating a preparation comprising dextrose monomer and galactose monomer such that the molar ratio of glucose to galactose is about 1:1 under agitation conditions, to a temperature in a range of 130° C. to 148° C.;

(b) loading the preparation with a solid catalyst comprising acidic protons, in an amount such that the molar ratio of acidic protons to total dextrose monomer and galactose monomer content is in a range of 0.050 to 0.052, thereby forming a reaction mixture; and (c) maintaining the reaction mixture at atmospheric pressure, at a temperature in a range of 128° C. to 150° C., under conditions that promote acid catalyzed glycan formation, until the weight percent of dextrose monomer and galactose monomer in the glycan preparation is in a range of 12-16;

(d) quenching the reaction mixture, for example, using water while bringing the temperature of the reaction mixture to a temperature in the range of 55° C. to 95° C. (e.g., 85° C., 90° C.); and (e) separating glycans from the acid catalyst; thereby obtaining the glycan preparation. In some embodiments, step (a) comprises gradually increasing the temperature (e.g., from room temperature) to about 148° C., under suitable conditions to achieve homogeneity and uniform heat transfer. In some embodiments, the mean degree of polymerization of all glycans is in a range of 4-7. In some embodiments, the preparation comprises dextrose monohydrate or 70DS corn syrup. In some embodiments, said heating comprises melting the preparation and/or heating the preparation under suitable conditions to achieve homogeneity and uniform heat transfer. In some embodiments, the catalyst is a strong acid cation exchange resin having one or more physical and chemical properties according to Table 1 and/or wherein the catalyst comprises >3.0 mmol/g sulfonic acid moieties and <1.0 mmol/gram cationic moieties. In some embodiments, the catalyst has a nominal moisture content of 45-50 weight percent. In some embodiments, step (c) further comprises removing water from the reaction mixture by evaporation. In some embodiments, step (c) further comprises maintaining the reaction mixture at 93-94 weight percent dissolved solids. In some embodiments, in step (d) the water is deionized water. In some embodiments, in step (d) the water has a temperature of about 95° C. In some embodiments, in step (d) the water is added to the reaction mixture under conditions sufficient to avoid solidifying the mixture. In some embodiments, in step (e) said separating comprises removing the catalyst by filtration. In some embodiments, step (e) comprises cooling the reaction mixture to below about 85° C. before filtering. In some embodiments, the process further comprises: (f) diluting the glycan preparation of (e) with deionized water to a concentration of about 45-55 weight percent and passing the diluted glycan preparation through a cationic exchange resin; (g) passing the diluted glycan preparation through an anionic exchange resin; and (h) passing the diluted glycan preparation through a decolorizing polymer resin; wherein each of (f), (g), and (h) can be performed one or more times in any order. In some embodiments, the glycan preparation comprises water at a level below that which is necessary for microbial growth upon storage at room temperature. In some embodiments, the glycan preparation comprises water comprises water in a range of 45-55 weight percent. In some embodiments, the glycan preparation has a MWw (g/mol) in a range of 1060-1780. In some embodiments, the glycan preparation has a MWn (g/mol) in a range of 690-1080. In some embodiments, the glycan preparation has a pH in a range of 2.50-3.50. In some embodiments, the glycan preparation comprises oligomers having two or more repeat units (DP2+) in a range of 83-89 weight percent. In some embodiments, the glycan preparation is substantially non-absorbable in a human.

In some embodiments, a glycan preparation comprising any of the aforementioned properties is provided. In some embodiments, a glycan preparation obtainable by (or producible from) any of the aforementioned method (or process) is provided.

The details of one or more aspects and embodiments of the invention are set forth herein. Other features, objects, and advantages of the invention will be apparent from the Detailed Description, the Figures, the Examples, and the Claims.

DETAILED DESCRIPTION OF THE INVENTION

Figure 1:
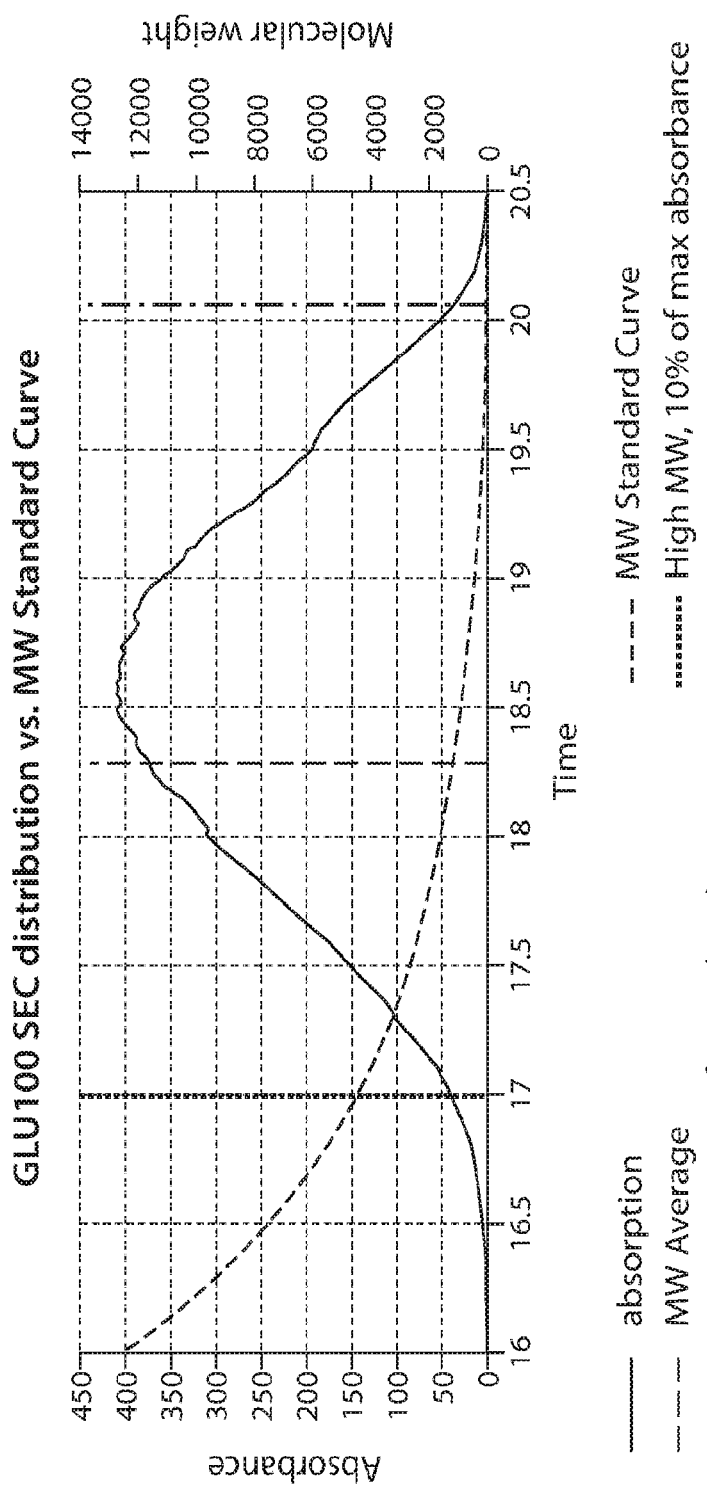
FIG. 1 depicts a representative SEC curve between 16 and 20.5 minutes of a glu100 sample showing the average MW and the MW at 10% of maximum absorption on both the leading and trailing edges of the curve.

Provided herein are methods of making glycan polymer preparations and compositions thereof, including pharmaceutical compositions, medical foods, supplements (e.g., dietary supplements), food ingredients or food additives, and feed ingredients or feed additives thereof. The glycan polymer preparations have been found to be effective to treat a number of diseases, disorders, pathological conditions, or to modulate a structure or function of the body, or to affect the growth and/or performance of an animal. Functions and uses of the glycan polymer preparations are described, e.g., in WO 2016/122889 "GLYCAN THERAPEUTICS AND RELATED METHODS THEREOF", WO 2016/172657 "GLYCAN THERAPEUTICS AND METHODS OF TREATMENT", WO 2017/035412 "GLYCAN COMPOSITIONS AND USES THEREOF", WO 2016/122884 "OLIGOSACCHARIDE COMPOSITIONS FOR USE AS FOOD INGREDIENTS AND METHODS OF PRODUCING THEREOF", WO 2016/122885 "OLIGOSACCHARIDE COMPOSITIONS FOR USE IN NUTRITIONAL COMPOSITIONS, AND METHODS OF PRODUCING THEREOF" and US 2016/0366909 "OLIGOSACCHARIDE COMPOSITIONS FOR USE AS ANIMAL FEED AND METHODS OF PRODUCING THEREOF", which in their entirety are hereby incorporated by reference. Described herein are methods for producing a glycan polymer preparation, for example, from individual glycan units in the presence of an acid catalyst. Further described are methods for processing glycan polymer preparations.

Generation of Glycan Polymer Preparations

Preparations comprising glycan polymers can be generated using a non-enzymatic catalyst, e.g., a polymeric catalyst described in WO 2012/118767, "POLYMERIC ACID CATALYSTS AND USES THEREOF" or by other suitable methods, e.g., as described in WO 2016/007778, "OLIGOSACCHARIDE COMPOSITIONS AND METHODS FOR PRODUCING THEREOF", each of which is incorporated herein by reference in its entirety. Other acid catalysts (e.g. solid catalysts) may be used. Methods to prepare the polymeric and solid-supported catalysts described herein can be found in WO 2014/031956, "POLYMERIC AND SOLID-SUPPORTED CATALYSTS, AND METHODS OF DIGESTING CELLULOSIC MATERIALS USING SUCH CATALYSTS," which is incorporated herein by reference in its entirety.

In some embodiments, provided are methods for generating the preparations of glycan polymers described herein, by: a) providing one or more glycan unit(s), b) contacting the glycan unit(s) with a catalyst described herein and, optionally, a suitable solvent (such as, e.g. water or a non-aqueous solvent), for a period of time sufficient to produce glycan polymers—comprising glycan units—with a desired average degree of polymerization; and, optionally, c) isolating and/or recovering at least a portion of the polymerized glycan polymer preparation.

In certain embodiments, the starting material (comprising the glycan units) is contacted with a catalyst under conditions that promote the formation of one or more glycosidic bond between glycan units, thereby producing a preparation of glycan polymers. In some embodiments, the glycan unit is a monosaccharide. Suitable catalysts comprise acidic monomers, optionally, wherein each acidic monomer has at least one Bronsted-Lowry acid.

In some embodiments, the catalyst used to prepare a glycan polymer preparation is a solid acid catalyst (e.g., clay minerals (e.g., montaiorillonite, bentonite, kaolinite or cation exchanged zeolites and clays, and/or their sulfated or acidified forms), zeolites, alumina, silico-alumino-phosphates, heteropolyoxometallates, metal oxides and sulphides (ALA and ZnS), metals salts (MgSO4), mixed oxides (SiO2-Al2O3), sulphate-promoted metal oxides and mixed oxides (SO4(2−)/ZrO2, SO4(2−)/TiO2 and SO4(2−)/Fe2O3), mounted acids (suitable carriers like porous oxides, graphite, metal salts, treated or combined with liquid acids like H2SO4/SiO2, SbF5/SiO2-Al2O3. AlCl3/CuSO4), cation exchange resins, perfluorinated polymer sulphuric acid (Nafion-H) and hcteropolyacids (12-tungstophosphoric acid), heteropolyoxometallates, sultonated carbon, sulfated carbon, sulfated ash. In certain embodiments, the catalyst is an ion exchange resin (e.g., AMBERLITE FPC11 Na, AMBERLITE FPC14 Na, DOWEX 88, DOWEX 88 H, DOWEX 88 MB, DOWEX 88 MB H, DOWEX FPC16UPS H, DOWEX FPC16UPS Na, DOWEX FPC23UPS H, DOWEX MAC-3, DOWEX MONOSPHERE 88, DOWEX MONOSPHERE 88 H, DOWEX MONOSPHERE 99 Ca/310, DOWEX MONOSPHERE 99 Ca/320, DOWEX MONOSPHERE 99 K/310, DOWEX MONOSPHERE 99 K/320, DOWEX MONOSPHERE 99 K/350, DOWEX™ PSR-2, DOWEX™ G-26 H, AMBERJET 1600 H, AMBERJET 2000 H, AMBERLITE IRN150, AMBERLITE IRN160, AMBERLITE IRN170, AMBERLITE IRN217, AMBERLITE IRN317, AMBERLITE IRN360, AMBERLITE IRN77, AMBERLITE IRN97 H, AMBERLITE IRN99 H, AMBERLITE IRN9652, AMBERLITEIRN9882, AMBERLITE IRN9687, AMBERSEP 252 H, DOWEX MONOSPHERE 1400PC H, DOWEX MONOSPHERE 650C H, AMBERLITE 200C Na, AMBERLITE IR120 H, AMBERLITE IR120 Na, AMBERLITE IRC83, AMBERLITE MB20, DOWEX MARATHON 1200 H, DOWEX MARATHON 1200 Na, DOWEX MARATHON 1300 H, DOWEX MARATHON 8300, DOWEX MARATHON C, DOWEX MARATHON C-10, DOWEX MARATHON MR-3, DOWEX MARATHON MSC, DOWEX MARATHON MSC H, DOWEX™ HCR-S/S, IMAC™ HP333, AMBERJET UP1400, AMBERJET UP6040, AMBERJET UP6150, DOWEX MONOSPHERE MR-3 UPW, DOWEX MONOSPHERE MR-450 UPW, AMBERLITE CG50 Type 1, AMBERLITE COBALAMION, AMBERLITE FPC3500, AMBERLITE IRP476, AMBERLITE IRP64, AMBERLITE IRP69, AMBERLITE IRP88, DOWEX 50WX2 (H+), DOWEX 50WX4 (H+), DOWEX 50WX8 (H+), AMBERLITE BD10, AMBERLITE IRC84SPI H, AMBERLYST 123, AMBERLYST 125, AMBERLYST 131, AMBERLYST 15, AMBERLYST 16, AMBERLYST 19, AMBERLYST 33, AMBERLYST 35, AMBERLYST 36, AMBERLYST 39, AMBERLYST 40, AMBERLYST 45, AMBERLYST BD20, AMBERLYST CH28, AMBERSEP BD19, AMBERSEP 200 H) in its protonated form.

In some embodiments, the catalyst is selected from poly[styrene-co-4-vinylbenzenesulfonic acid-co-3-methyl-1-(4-vinylbenzyl)-3H-imidazol-1-ium chloride-co-divinylbenzene]; poly[styrene-co-4-vinylbenzenesulfonic acid-co-3-methyl-1-(4-vinylbenzyl)-3H-imidazol-1-ium bisulfate-co-divinylbenzene]; poly[styrene-co-4-vinylbenzenesulfonic acid-co-3-methyl-1-(4-vinylbenzyl)-3H-imidazol-1-ium acetate-co-divinylbenzene]; poly[styrene-co-4-vinylbenzenesulfonic acid-co-3-methyl-1-(4-vinylbenzyl)-3H-imidazol-1-ium nitrate-co-divinylbenzene]; poly[styrene-co-4-vinylbenzenesulfonic acid-co-3-ethyl-1-(4-vinylbenzyl)-3H-imidazol-1-ium chloride-co-divinylbenzene]; poly[styrene-co-4-vinylbenzenesulfonic acid-co-3-ethyl-1-(4-vinylbenzyl)-3H-imidazol-1-ium bisulfate-co-divinylbenzene]; poly[styrene-co-4-vinylbenzenesulfonic acid-co-3-ethyl-1-(4-vinylbenzyl)-3H-imidazol-1-ium acetate-co-divinylbenzene]; poly[styrene-co-4-vinylbenzenesulfonic acid-co-3-ethyl-1-(4-vinylbenzyl)-3H-imidazol-1-ium nitrate-co-divinylbenzene]; poly[styrene-co-4-vinylbenzenesulfonic acid-co-1-(4-vinylbenzyl)-3H-imidazol-1-ium chloride-co-divinylbenzene]; poly[styrene-co-4-vinylbenzenesulfonic acid-co-1-(4-vinylbenzyl)-3H-imidazol-1-ium iodide-co-divinylbenzene]; poly[styrene-co-4-vinylbenzenesulfonic acid-co-1-(4-vinylbenzyl)-3H-imidazol-1-ium bromide-co-divinylbenzene]; poly[styrene-co-4-vinylbenzenesulfonic acid-co-1-(4-vinylbenzyl)-3H-imidazol-1-ium bisulfate-co-divinylbenzene]; poly[styrene-co-4-vinylbenzenesulfonic acid-co-1-(4-vinylbenzyl)-3H-imidazol-1-ium acetate-co-divinylbenzene]; poly[styrene-co-4-vinylbenzenesulfonic acid-co-3-methyl-1-(4-vinylbenzyl)-3H-benzoimidazol-1-ium chloride-co-divinylbenzene]; poly[styrene-co-4-vinylbenzenesulfonic acid-co-3-methyl-1-(4-vinylbenzyl)-3H-benzoimidazol-1-ium bisulfate-co-divinylbenzene]; poly[styrene-co-4-vinylbenzenesulfonic acid-co-3-methyl-1-(4-vinylbenzyl)-3H-benzoimidazol-1-ium acetate-co-divinylbenzene]; poly[styrene-co-4-vinylbenzenesulfonic acid-co-3-methyl-1-(4-vinylbenzyl)-3H-benzoimidazol-1-ium formate-co-divinylbenzene]; poly[styrene-co-4-vinylbenzenesulfonic acid-co-1-(4-vinylbenzyl)-pyridinium-chloride-co-divinylbenzene]; poly[styrene-co-4-vinylbenzenesulfonic acid-co-1-(4-vinylbenzyl)-pyridinium-bisulfate-co-divinylbenzene]; poly[styrene-co-4-vinylbenzenesulfonic acid-co-1-(4-vinylbenzyl)-pyridinium-acetate-co-divinylbenzene]; poly[styrene-co-4-vinylbenzenesulfonic acid-co-1-(4-vinylbenzyl)-pyridinium-nitrate-co-divinylbenzene]; poly[styrene-co-4-vinylbenzenesulfonic acid-co-1-(4-vinylbenzyl)-pyridinium-chloride-co-3-methyl-1-(4-vinylbenzyl)-3H-imidazol-1-ium bisulfate-co-divinylbenzene]; poly[styrene-co-4-vinylbenzenesulfonic acid-co-1-(4-vinylbenzyl)-pyridinium-bromide-co-3-methyl-1-(4-vinylbenzyl)-3H-imidazol-1-ium bisulfate-co-divinylbenzene]; poly[styrene-co-4-vinylbenzenesulfonic acid-co-1-(4-vinylbenzyl)-pyridinium-iodide-co-3-methyl-1-(4-vinylbenzyl)-3H-imidazol-1-ium bisulfate-co-divinylbenzene]; poly[styrene-co-4-vinylbenzenesulfonic acid-co-1-(4-vinylbenzyl)-pyridinium-bisulfate-co-3-methyl-1-(4-vinylbenzyl)-3H-imidazol-1-ium bisulfate-co-divinylbenzene]; poly[styrene-co-4-vinylbenzenesulfonic acid-co-1-(4-vinylbenzyl)-pyridinium-acetate-co-3-methyl-1-(4-vinylbenzyl)-3H-imidazol-1-ium bisulfate-co-divinylbenzene]; poly[styrene-co-4-vinylbenzenesulfonic acid-co-4-methyl-4-(4-vinylbenzyl)-morpholin-4-ium chloride-co-divinylbenzene]; poly[styrene-co-4-vinylbenzenesulfonic acid-co-4-methyl-4-(4-vinylbenzyl)-morpholin-4-ium bisulfate-co-divinylbenzene]; poly[styrene-co-4-vinylbenzenesulfonic acid-co-4-methyl-4-(4-vinylbenzyl)-morpholin-4-ium acetate-co-divinylbenzene]; poly[styrene-co-4-vinylbenzenesulfonic acid-co-4-methyl-4-(4-vinylbenzyl)-morpholin-4-ium formate-co-divinylbenzene]; poly[styrene-co-4-vinylbenzenesulfonic acid-co-triphenyl-(4-vinylbenzyl)-phosphonium chloride-co-divinylbenzene]; poly[styrene-co-4-vinylbenzenesulfonic acid-co-triphenyl-(4-vinylbenzyl)-phosphonium bisulfate-co-divinylbenzene]; poly[styrene-co-4-vinylbenzenesulfonic acid-co-triphenyl-(4-vinylbenzyl)-phosphonium acetate-co-divinylbenzene]; poly[styrene-co-4-vinylbenzenesulfonic acid-co-1-methyl-1-(4-vinylbenzyl)-piperidin-1-ium chloride-co-divinylbenzene]; poly[styrene-co-4-vinylbenzenesulfonic acid-co-1-methyl-1-(4-vinylbenzyl)-piperidin-1-ium bisulfate-co-divinylbenzene]; poly[styrene-co-4-vinylbenzenesulfonic acid-co-1-methyl-1-(4-vinylbenzyl)-piperidin-1-ium acetate-co-divinylbenzene]; poly[styrene-co-4-vinylbenzenesulfonic acid-co-4-(4-vinylbenzyl)-morpholine-4-oxide-co-divinyl benzene]; poly[styrene-co-4-vinylbenzenesulfonic acid-co-triethyl-(4-vinylbenzyl)-ammonium chloride-co-divinylbenzene]; poly[styrene-co-4-vinylbenzenesulfonic acid-co-triethyl-(4-vinylbenzyl)-ammonium bisulfate-co-divinylbenzene]; poly[styrene-co-4-vinylbenzenesulfonic acid-co-triethyl-(4-vinylbenzyl)-ammonium acetate-co-divinylbenzene]; poly[styrene-co-3-methyl-1-(4-vinylbenzyl)-3H-imidazol-1-ium chloride-co-4-boronyl-1-(4-vinylbenzyl)-pyridinium chloride-co-divinylbenzene]; poly[styrene-co-3-methyl-1-(4-vinylbenzyl)-3H-imidazol-1-ium chloride-co-1-(4-vinylphenyl)methylphosphonic acid-co-divinylbenzene]; poly[styrene-co-3-methyl-1-(4-vinylbenzyl)-3H-imidazol-1-ium bisulfate-co-1-(4-vinylphenyl)methylphosphonic acid-co-divinylbenzene]; poly[styrene-co-3-methyl-1-(4-vinylbenzyl)-3H-imidazol-1-ium acetate-co-1-(4-vinylphenyl)methylphosphonic acid-co-divinylbenzene]; poly[styrene-co-3-methyl-1-(4-vinylbenzyl)-3H-imidazol-1-ium nitrate-co-1-(4-vinylphenyl)methylphosphonic acid-co-divinylbenzene]; poly[styrene-co-4-vinylbenzenesulfonic acid-co-vinylbenzylchloride-co-1-methyl-2-vinyl-pyridinium chloride-co-divinylbenzene]; poly[styrene-co-4-vinylbenzenesulfonic acid-co-vinylbenzylchloride-co-1-methyl-2-vinyl-pyridinium bisulfate-co-divinylbenzene]; poly[styrene-co-4-vinylbenzenesulfonic acid-co-vinylbenzylchloride-co-1-methyl-2-vinyl-pyridinium acetate-co-divinylbenzene]; poly[styrene-co-4-vinylbenzenesulfonic acid-co-4-(4-vinylbenzyl)-morpholine-4-oxide-co-divinyl benzene]; poly[styrene-co-4-vinylphenylphosphonic acid-co-3-methyl-1-(4-vinylbenzyl)-3H-imidazol-1-ium chloride-co-divinylbenzene]; poly[styrene-co-4-vinylphenylphosphonic acid-co-3-methyl-1-(4-vinylbenzyl)-3H-imidazol-1-ium bisulfate-co-divinylbenzene]; poly[styrene-co-4-vinylphenylphosphonic acid-co-3-methyl-1-(4-vinylbenzyl)-3H-imidazol-1-ium acetate-co-divinylbenzene]; poly[styrene-co-3-carboxymethyl-1-(4-vinylbenzyl)-3H-imidazol-1-ium chloride-co-divinylbenzene]; poly[styrene-co-3-carboxymethyl-1-(4- vinylbenzyl)-3H-imidazol-1-ium bisulfate-co-divinylbenzene]; poly[styrene-co-3-carboxymethyl-1-(4-vinylbenzyl)-3H-imidazol-1-ium acetate-co-divinylbenzene]; poly[styrene-co-5-(4-vinylbenzylamino)-isophthalic acid-co-3-methyl-1-(4-vinylbenzyl)-3H-imidazol-1-ium chloride-co-divinylbenzene]; poly[styrene-co-5-(4-vinylbenzylamino)-isophthalic acid-co-3-methyl-1-(4-vinylbenzyl)-3H-imidazol-1-ium bisulfate-co-divinylbenzene]; poly[styrene-co-5-(4-vinylbenzylamino)-isophthalic acid-co-3-methyl-1-(4-vinylbenzyl)-3H-imidazol-1-ium acetate-co-divinylbenzene]; poly[styrene-co-(4-vinylbenzylamino)-acetic acid-co-3-methyl-1-(4-vinylbenzyl)-3H-imidazol-1-ium chloride-co-divinylbenzene]; poly[styrene-co-(4-vinylbenzylamino)-acetic acid-co-3-methyl-1-(4-vinylbenzyl)-3H-imidazol-1-ium bisulfate-co-divinylbenzene]; poly[styrene-co-(4-vinylbenzylamino)-acetic acid-co-3-methyl-1-(4-vinylbenzyl)-3H-imidazol-1-ium acetate-co-divinylbenzene]; poly(styrene-co-4-vinylbenzenesulfonic acid-co-vinylbenzylmethylimidazolium chloride-co-vinylbenzylmethylmorpholinium chloride-co-vinylbenzyltriphenyl phosphonium chloride-co-divinylbenzene); poly(styrene-co-4-vinylbenzenephosphonic acid-co-vinylbenzylmethylimidazolium chloride-co-vinylbenzylmethylmorpholinium chloride-co-vinylbenzyltriphenyl phosphonium chloride-co-divinylbenzene); poly(styrene-co-4-vinylbenzenesulfonic acid-co-vinylbenzylmethylimidazolium bisulfate-co-vinylbenzylmethylmorpholinium bisulfate-co-vinylbenzyltriphenyl phosphonium bisulfate-co-divinylbenzene); poly(styrene-co-4-vinylbenzenephosphonic acid-co-vinylbenzylmethylimidazolium bisulfate-co-vinylbenzylmethylmorpholinium bisulfate-co-vinylbenzyltriphenyl phosphonium bisulfate-co-divinylbenzene); poly(styrene-co-4-vinylbenzenesulfonic acid-co-vinylbenzylmethylimidazolium acetate-co-vinylbenzylmethylmorpholinium acetate-co-vinylbenzyltriphenyl phosphonium acetate-co-divinylbenzene); poly(styrene-co-4-vinylbenzenephosphonic acid-co-vinylbenzylmethylimidazolium acetate-co-vinylbenzylmethylmorpholinium acetate-co-vinylbenzyltriphenyl phosphonium acetate-co-divinylbenzene); poly(styrene-co-4-vinylbenzenesulfonic acid-co-vinylbenzylmethylmorpholinium chloride-co-vinylbenzyltriphenylphosphonium chloride-co-divinylbenzene); poly(styrene-co-4-vinylbenzenephosphonic acid-co-vinylbenzylmethylmorpholinium chloride-co-vinylbenzyltriphenylphosphonium chloride-co-divinylbenzene); poly(styrene-co-4-vinylbenzenesulfonic acid-co-vinylbenzylmethylmorpholinium bisulfate-co-vinylbenzyltriphenylphosphonium bisulfate-co-divinylbenzene); poly(styrene-co-4-vinylbenzenephosphonic acid-co-vinylbenzylmethylmorpholinium bisulfate-co-vinylbenzyltriphenylphosphonium bisulfate-co-divinylbenzene); poly(styrene-co-4-vinylbenzenesulfonic acid-co-vinylbenzylmethylmorpholinium acetate-co-vinylbenzyltriphenylphosphonium bisulfate-co-divinylbenzene); poly(styrene-co-4-vinylbenzenephosphonic acid-co-vinylbenzylmethylmorpholinium acetate-co-vinylbenzyltriphenylphosphonium bisulfate-co-divinylbenzene); poly(styrene-co-4-vinylbenzenesulfonic acid-co-vinylmethylimidazolium chloride-co-divinylbenzene); poly(styrene-co-4-vinylbenzenesulfonic acid-co-vinylmethylimidazolium bisulfate-co-divinylbenzene); poly(styrene-co-4-vinylbenzenesulfonic acid-co-vinylmethylimidazolium acetate-co-divinylbenzene); poly(styrene-co-4-vinylbenzenesulfonic acid-co-vinylmethylimidazolium nitrate-co-divinylbenzene); poly(styrene-co-4-vinylbenzenephosphonic acid-co-vinylmethylimidazolium chloride-co-divinylbenzene); poly(styrene-co-4-vinylbenzenephosphonic acid-co-vinylmethylimidazolium bisulfate-co-divinylbenzene); poly(styrene-co-4-vinylbenzenephosphonic acid-co-vinylmethylimidazolium acetate-co-divinylbenzene); poly(styrene-co-4-vinylbenzenesulfonic acid-co-vinylbenzyl-triphenylphosphonium chloride-co-divinylbenzene); poly(styrene-co-4-vinylbenzenesulfonic acid-co-vinylbenzyltriphenylphosphonium bisulfate-co-divinylbenzene); poly(styrene-co-4-vinylbenzenesulfonic acid-co-vinylbenzyltriphenylphosphonium acetate-co-divinylbenzene); poly(styrene-co-4-vinylbenzenephosphonic acid-co-vinylbenzyl-triphenylphosphonium chloride-co-divinylbenzene); poly(styrene-co-4-vinylbenzenephosphonic acid-co-vinylbenzyl-triphenylphosphonium bisulfate-co-divinylbenzene); poly(styrene-co-4-vinylbenzenephosphonic acid-co-vinylbenzyltriphenylphosphonium acetate-co-divinylbenzene); poly(styrene-co-4-vinylbenzenesulfonic acid-co-vinylbenzylmethylimidazolium chloride-co-divinylbenzene); poly(styrene-co-4-vinylbenzenesulfonic acid-co-vinylbenzylmethylimidazolium bisulfate-co-divinylbenzene); poly(styrene-co-4-vinylbenzenesulfonic acid-co-vinylbenzylmethylimidazolium acetate-co-divinylbenzene); poly(styrene-co-4-vinylbenzenephosphonic acid-co-vinylbenzylmethylimidazolium chloride-co-divinylbenzene); poly(styrene-co-4-vinylbenzenephosphonic acid-co-vinylbenzylmethylimidazolium bisulfate-co-divinylbenzene); poly(styrene-co-4-vinylbenzenephosphonic acid-co-vinylbenzylmethylimidazolium acetate-co-divinylbenzene); poly(styrene-co-4-vinylbenzenesulfonic acid-co-vinylbenzyl-triphenylphosphonium chloride-co-divinylbenzene); poly(styrene-co-4-vinylbenzenesulfonic acid-co-vinylbenzyltriphenylphosphonium bisulfate-co-divinylbenzene); poly(styrene-co-4-vinylbenzenesulfonic acid-co-vinylbenzyltriphenylphosphonium acetate-co-divinylbenzene); poly(styrene-co-4-vinylbenzenephosphonic acid-co-vinylbenzyltriphenylphosphonium chloride-co-divinylbenzene); poly(styrene-co-4-vinylbenzenephosphonic acid-co-vinylbenzyl-triphenylphosphonium bisulfate-co-divinylbenzene); poly(styrene-co-4-vinylbenzenephosphonic acid-co-vinylbenzyltriphenylphosphonium acetate-co-divinylbenzene); poly(butyl-vinylimidazolium chloride-co-butylimidazolium bisulfate-co-4-vinylbenzenesulfonic acid); poly(butyl-vinylimidazolium bisulfate-co-butylimidazolium bisulfate-co-4-vinylbenzenesulfonic acid); poly(benzyl alcohol-co-4-vinylbenzylalcohol sulfonic acid-co-vinylbenzyl-triphenylphosphonium chloride-co-divinylbenzyl alcohol); poly(benzyl alcohol-co-4-vinylbenzylalcohol sulfonic acid-co-vinylbenzyltriphenylphosphonium bisulfate-co-divinylbenzyl alcohol); poly(styrene-co-vinylbenzenesulfonic acid-co-divinylbenzene); poly(styrene-co-vinylbenzenephosphonic acid-co-divinylbenzene); poly(styrene-co-vinylbenzeneboronic acid-co-divinylbenzene); sulfonated polystyrene-co-divinylbenzene microporous gel resin; sulfonated polystyrene-co-divinylbenzene macroporous resin.

Generally, the catalyst and the glycan units are introduced into an interior chamber of a reactor, either concurrently or sequentially. Glycan synthesis can be performed in a batch process or a continuous process. For example, in one embodiment, glycan polymer synthesis is performed in a batch process, where the contents of the reactor are continuously mixed or blended, and all or a substantial amount of the products of the reaction are removed (e.g. isolated and/or recovered). In one variation, glycan polymer synthesis is performed in a batch process, where the contents of the reactor are initially intermingled or mixed but no further physical mixing is performed. In another variation, glycan polymer synthesis is performed in a batch process, wherein once further mixing of the contents, or periodic mixing of the contents of the reactor, is performed (e.g., at one or more times per hour), all or a substantial amount of the products of the reaction are removed (e.g. isolated and/or recovered) after a certain period of time.

In other embodiments, glycan polymer synthesis is performed in a continuous process, where the contents flow through the reactor with an average continuous flow rate. After introduction of the catalyst and glycan units into the reactor, the contents of the reactor are continuously or periodically mixed or blended, and after a period of time, less than all of the products of the reaction are removed (e.g. isolated and/or recovered). In one variation, glycan polymer synthesis is performed in a continuous process, where the mixture containing the catalyst and glycan units is not actively mixed. Additionally, mixing of catalyst and the glycan units may occur as a result of the redistribution of catalysts settling by gravity, or the non-active mixing that occurs as the material flows through a continuous reactor. In another variation, the reactor is continuously fed by a reactant stream, while a product stream is continuously removed from the reactor. In yet another variation, the reactor is operated in steady state, wherein the reactant stream and product stream are held at fixed flow rates. In other variations, a fraction of the reactor contents are continuously pumped through an external recycle loop, e.g. for the purpose of controlling or measuring properties of the reactor contents such as temperature, density, pH, viscosity, water content, and/or chemical composition. In some variations, mixing of the reactor contents is achieved by the action of pumping a fraction of the reactor contents through such an external recycle loop. In a particular variation, the external recycle loop contains an in-line heat exchanger, flash, or blowdown tank. In another variation, the external recycle loop contains a static mixing element or mixing chamber.

In some embodiments of the method, the starting material for the polymerization reaction is one or more glycan units selected from one or more monosaccharides, one or more disaccharides, or a combination thereof. In some embodiments of the method, the starting material for the polymerization reaction is one or more glycan units selected from a furanose sugar and a pyranose sugar. In some embodiments of the method, the starting material for the polymerization reaction is one or more glycan units selected from a tetrose, a pentose, a hexose, or a heptose. In some embodiments of the method, the starting material for the polymerization reaction is one or more glycan units selected from a glucose, a galactose, an arabinose, a mannose, a fructose, a xylose, a fucose, and a rhamnose, all optionally in either their L- or D-form, in alpha or beta configuration (for dimers), and/or a deoxy-form, where applicable, and any combination thereof. In some embodiments, the glycan units are substituted or derivatized with one or more of an acetate ester, sulfate half-ester, phosphate ester, or a pyruvyl cyclic acetal group, or have been otherwise derivatized at, e.g., at one or more hydroxyl groups.

The glycan units used in the methods described herein may include one or more sugars. In some embodiments, the one or more sugars are selected from monosaccharides, disaccharides, and trisaccharides, or any mixtures thereof. In some embodiments, the one or more sugars are monosaccharides, such as one or more C5 or C6 monosaccharides. In some embodiments, the one or more sugars are C5 monosaccharides. In other embodiments, the one or more sugars are C6 monosaccharides.

In some embodiments of the method, the starting material for the polymerization reaction is one or more glycan units selected from amino sugars, deoxy sugars, imino sugars, sugar acids, short-chained fatty acids, and sugar alcohols to produce hybrid glycans.

In some embodiments, the starting material for the polymerization reaction is one or more glycan units selected from monosaccharides and other carbohydrates including, but not limited to glycolaldehyde, glyceraldehyde, dihydroxyacetone, erythrose, threose, erythulose, arabinose, lyxose, ribose, xylose, ribulose, xylulose, allose, altrose, galactose, glucose, gulose, idose, mannose, talose, fructose, psicose, sorbose, tagatose, fucose, fuculose, rhamnose, mannoheptulose, sedoheptulose, neuraminic acid, N-acetylneuraminic acid, N-acetylgalactosamine, N-acetylglucosamine, fructosamine, galactosamine, glucosamine, sorbitol, glycerol, erythritol, threitol, arabitol, xylitol, mannitol, sorbitol, galactitol, fucitol, and lactic acid.

In some embodiments, the starting material for the polymerization reaction is one or more glycan units selected from disaccharides and other carbohydrates including, but not limited to acarviosin, N-acetyllactosamine, allolactose, cellobiose, chitobiose, glactose-alpha-1,3-galactose, gentiobiose, isomalt, isomaltose, isomaltulose, kojibiose, lactitol, lactobionic acid, lactose, lactulose, laminaribiose, maltitol, maltose, mannobiose, melibiose, melibiulose, neohesperidose, nigerose, robinose, rutinose, sambubiose, sophorose, sucralose, sucrose, sucrose acetate isobutyrate, sucrose octaacetate, trehalose, turanose, vicianose, and xylobiose.

In some embodiments, the starting material for the polymerization reaction is one or more glycan units selected from an amino sugar, a deoxy sugar, an imino sugar, a sugar acid, a short-chained fatty acid, and a sugar alcohol.

In some embodiments, the glycan unit may exist as a salt (e.g., a pharmaceutically acceptable salt), such as, e.g., a hydrochlorate, hydroiodate, hydrobromate, phosphate, sulfate, methanesulfate, acetate, formate, tartrate, malate, citrate, succinate, lactate, gluconate, pyruvate, fumarate, propionate, aspartate, glutamate, benzoate, ascorbate salt.

Suitable glycan units include amino sugars, such as, e.g. acarbose, N-acetylemannosamine, N-acetylmuramic acid, N-acetylneuraminic acid, N-acetyletalosaminuronic acid, arabinopyranosyl-N-methyl-N-nitrosourea, D-fructose-L-histidine, N-glycolyneuraminic acid, ketosamine, kidamycin, mannosamine, 1B-methylseleno-N-acetyl-D-galactosamine, muramic acid, muramyl dipeptide, phosphoribosylamine, PUGNAc, sialyl-Lewis A, sialyl-Lewis X, validamycin, voglibose, N-acetylgalactosamine, N-acetylglucosamine, aspartylglucosamine, bacillithiol, daunosamine, desosamine, fructosamine, galactosamine, glucosamine, meglumine, and perosamine.

Suitable glycan units include deoxy sugars, such as, e.g. 1-5-ahydroglucitol, cladinose, colitose, 2-deoxy-D-glucose, 3-deoxyglucasone, deoxyribose, dideoxynucleotide, digitalose, fludeooxyglucose, sarmentose, and sulfoquinovose.

Suitable glycan units include imino sugars, such as, e.g. castanospermine, 1-deoxynojirimycin, iminosugar, miglitol, miglustat, and swainsonine.

Suitable glycan units include sugar acids, such as, e.g. N-acetylneuraminic acid, N-acetyltalosamnuronic acid, aldaric acid, aldonic acid, 3-deoxy-D-manno-oct-2-ulosonic acid, glucuronic acid, glucosaminuronic acid, glyceric acid, N-glycolylneuraminic acid, iduronic acid, isosaccharinic acid, pangamic acid, sialic acid, threonic acid, ulosonic acid, uronic acid, xylonic acid, gluconic acid, ascorbic acid, ketodeoxyoctulosonic acid, galacturonic acid, galactosaminuronic acid, mannuronic acid, mannosaminuronic acid, tartaric acid, mucic acid, saccharic acid, lactic acid, oxalic acid, succinic acid, hexanoic acid, fumaric acid, maleic acid, butyric acid, citric acid, glucosaminic acid, malic acid, succinamic acid, sebacic acid, and capric acid.

Suitable glycan units include short chained fatty acids, such as, e.g., formic acid, acetic acid, propionic acid, butyric acid, isobutyric acid, valeric acid, and isovaleric acid.

Suitable glycan units include sugar alcohols, such as, e.g., methanol, ethylene glycol, glycerol, erythritol, threitol, arabitol, ribitol, xylitol, mannitol, sorbitol, galactitol, iditol, volemitol, fucitol, inositol, maltotritol, maltotetraitol, and polyglycitol.

The glycan units (e.g. sugars) used in the methods described herein may be obtained from any commercially known sources, or produced according to any methods known in the art.

Reaction Conditions

In some embodiments, the glycan unit and catalyst react for at least 30 minutes, at least 1 hour, at least 2 hours, at least 3 hours, at least 4 hours, at least 6 hours, at least 8 hours, at least 16 hours, at least 24 hours, at least 36 hours, or at least 48 hours; or between 1-24 hours, between 2-12 hours, between 3-6 hours, between 1-96 hours, between 12-72 hours, or between 12-48 hours.

In some embodiments, the degree of polymerization of the glycan polymer preparations produced according to the methods described herein can be regulated by the reaction time. For example, in some embodiments, the degree of polymerization of the glycan polymer preparations is increased by increasing the reaction time, while in other embodiments, the degree of polymerization of the glycan polymer preparations is decreased by decreasing the reaction time.

Reaction Temperature

In some embodiments, the reaction temperature is maintained in the range of about 25° C. to about 150° C. In certain embodiments, the temperature is from about 30° C. to about 125° C., about 60° C. to about 120° C., about 80° C. to about 115° C., about 90° C. to about 110° C., about 95° C. to about 105° C., or about 100° C. to 110° C. In certain embodiments, the reaction temperature is maintained by applying heat via the walls of the reaction vessel (e.g., via a steam or hot-oil jacket). In other embodiments, the reaction temperature is maintained by passing the reactor contents through an external heat exchange unit (e.g., a shell-in-tube heat exchanger). In other embodiments, the reaction temperature is maintained by the direct injection of high-pressure steam into the reactor and/or by flash cooling from the evaporation of water.

Reaction Pressure

In some embodiments, the pressure of the reaction is maintained in a certain range. The reaction pressure may be measured using any method known in the art, for example, in pounds per square inch (psi), millimeters of mercury (mmHg), Pascals (Pa), bar, or atmospheres (atm). In some embodiments, the reaction pressure is maintained in the range of about 0.1 psi to about 100 psi. For example, the pressure of the reaction may be maintained between about 1 psi and 75 psi, about 5 psi to about 50 psi, or about 10 psi to about 25 psi. In certain embodiments, the reaction pressure is greater than about 5 psi, about 10 psi, about 12 psi, about 15 psi, about 20 psi, about 25 psi, about 30 psi, about 35 psi, about 40 psi, about 45 psi, or about 50 psi. In other embodiments, the reaction pressure is lower than about 70 psi, about 60 psi, about 50 psi, about 40 psi, about 30 psi, about 20 psi, about 15 psi, about 10 psi, about 5 psi, or about 1 psi. In certain embodiments, the reaction pressure may be measured in units of gauge pressure (e.g., relative to ambient atmospheric pressure) or in units of absolute pressure.

Amount of Glycan Units

The amount of the glycan unit used in the methods described herein relative to the amount solvent used may affect the rate of reaction and yield. The amount of the glycan unit used may be characterized by the dry solids content. In certain embodiments, dry solids content refers to the total solids of a slurry as a percentage on a dry weight basis. In some embodiments, the dry solids content of the glycan unit is between about 5 wt % to about 95 wt %, between about 10 wt % to about 80 wt %, between about 15 wt % to about 75 wt %, or between about 15 wt % to about 50 wt %. In some embodiments, the aqueous concentration of glycan units is about 0.1, 0.2, 0.3, 0.4, 0.5 or about 0.6. In some embodiments, the aqueous concentration of glycan units is about 0.20. In some embodiments, the aqueous concentration of glycan units is about 0.25. In some embodiments, the aqueous concentration of glycan units is about 0.30. In some embodiments, the aqueous concentration of glycan units is about 0.35. In some embodiments, the aqueous concentration of glycan units is about 0.40. In some embodiments, the aqueous concentration of glycan units is between about 0.25 and 0.35.

Amount of Catalyst

The amount of the catalyst used in the methods described herein may depend on several factors including, for example, the selection of the type of glycan unit, the concentration of the glycan unit, and the reaction conditions (e.g., temperature, time, and pH). In some embodiments, the weight ratio of the catalyst to the glycan unit is about 0.01 g/g to about 50 g/g, about 0.01 g/g to about 5 g/g, about 0.05 g/g to about 1.0 g/g, about 0.05 g/g to about 0.5 g/g, about 0.05 g/g to about 0.2 g/g, or about 0.1 g/g to about 0.2 g/g.

Reaction Viscosity

The viscosity of the reaction mixture may be measured and/or altered over the course of the reaction. In general, viscosity refers to a measurement of a fluid's internal resistance to flow (e.g., "thickness") and is expressed in centipoise (cP) or pascal-seconds. In some embodiments, the viscosity of the reaction mixture is between about 100 cP and about 95,000 cP, about 5,000 cP and about 75,000 cP, about 5,000 and about 50,000 cP, or about 10,000 and about 50,000 cP. In certain embodiments, the viscosity of the reaction mixture is between about 50 cP and about 200 cP.

Solvent

In certain embodiments, the methods of using the catalyst are carried out in an aqueous environment. One suitable aqueous solvent is water, which may be obtained from various sources. Generally, water sources with lower concentrations of ionic species (e.g., salts of sodium, phosphorous, ammonium, or magnesium) are preferable, as such ionic species may reduce effectiveness of the catalyst. In some embodiments where the aqueous solvent is water, the water has less than 10% of ionic species (e.g., salts of sodium, phosphorous, ammonium, magnesium). In some embodiments where the aqueous solvent is water, the water has a resistivity of at least 0.1 megaohm-centimeters, of at least 1 megaohm-centimeters, of at least 2 megaohm-centimeters, of at least 5 megaohm-centimeters, or of at least 10 megaohm-centimeters.

Water Content

Moreover, as the dehydration reaction of the methods progresses, water (such as evolved water) is produced with each coupling of the one or more glycan units. In certain embodiments, the methods described herein may further include monitoring the amount of water present in the reaction mixture and/or the ratio of water to monomer or catalyst over a period of time. In some embodiments, the method further includes removing at least a portion of water produced in the reaction mixture (e.g., by removing at least about any of 10%, 20%, 30%, 40%, 50%, 60%, 70%, 80%, 90%, 95%, 97%, 99%, or 100%, such as by vacuum filtration). It should be understood, however, that the amount of water to monomer may be adjusted based on the reaction conditions and specific catalyst used.

In some embodiments, the water evolved over the course of the reaction is produced at a measurable rate. For example, the evolved water may be determined by measuring an amount of evolved water (e.g, milligrams, grams, or kilograms of water) per amount of input glycan unit (e.g., milligram, gram, kilogram of input glycan unit) per unit of time (e.g., second, minute, hour, or day). In some embodiments, the water evolved is produced at a rate of at least about 0.1 g/kg input glycan unit/hour, e.g., at least about 0.5 g, 1 g, 2 g, 3 g, 4 g, 5 g, 6 g, 7 g, 8 g, 9 g, 10 g, 12 g, 15 g, or 20 g/kg input glycan unit/hour. In some embodiments, the water evolved is produced at a rate of at least about 2 g/kg input glycan unit/hour. In some embodiments, the water evolved is produced at a rate of at least about 4 g/kg input glycan unit/hour. In some embodiments, the water evolved is produced at a rate of at least about 6 g/kg input glycan unit/hour. In some embodiments, the water evolved is produced at a rate of at least about 8 g/kg input glycan unit/hour. In some embodiments, the water evolved is produced at a rate of at least about 10 g/kg input glycan unit/hour. Evolved water may be measured by any known method in the art, e.g., by acquiring the mass or volume of the evolved water.

The water content of the reaction mixture may be altered over the course of the reaction, for example, removing evolved water produced. Any method known in the art may be used to remove water (e.g., evolved water) in the reaction mixture, including, for example, by vacuum filtration, vacuum distillation, heating, and/or evaporation. In some embodiments, the method comprises including water in the reaction mixture.

In some embodiments, the degree of polymerization of the one or more glycan polymers produced according to the methods described herein can be regulated by adjusting or controlling the concentration of water present in the reaction mixture. For example, in some embodiments, the degree of polymerization of the one or more glycan polymers is increased by decreasing the water concentration, while in other embodiments, the degree of polymerization of the one or more glycan polymers is decreased by increasing the water concentration. In some embodiments, the water content of the reaction is adjusted during the reaction to regulate the degree of polymerization of the one or more glycan polymers produced.

Additional Processing Steps

Optionally, the preparation may undergo additional processing steps. Additional processing steps may include, for example, purification steps. Purification steps may include, for example, separation, dilution, concentration, filtration, desalting or ion-exchange, chromatographic separation, or decolorization, or any combination thereof.

Decolorization

In some embodiments, the methods described herein further include a decolorization step. The one or more glycan polymers produced may undergo a decolorization step using any method known in the art, including, for example, treatment with an adsorbent, activated carbon, chromatography (e.g., using ion exchange resin), hydrogenation, and/or filtration (e.g., microfiltration).

In certain embodiments, the one or more glycan polymers produced are contacted with a color-adsorbing material at a particular temperature, at a particular concentration, and/or for a particular duration of time. In some embodiments, the mass of the color adsorbing species contacted with the one or more glycan polymers is less than 50% of the mass of the one or more glycan polymers, less than 35% of the mass of the one or more glycan polymers, less than 20% of the mass of the one or more glycan polymers, less than 10% of the mass of the one or more glycan polymers, less than 5% of the mass of the one or more glycan polymers, less than 2% of the mass of the one or more glycan polymers, or less than 1% of the mass of the one or more glycan polymers. In certain embodiments, the one or more glycan polymer produced are made to flow through a fixed or packed bed of color-adsorbing material at a particular temperature and at a particular flow rate.

In some embodiments, the one or more glycan polymers are contacted with a color adsorbing material. In certain embodiments, the one or more glycan polymers are contacted with a color adsorbing material for less than 10 hours, less than 5 hours, less than 1 hour, or less than 30 minutes. In a particular embodiment, the one or more glycan polymers are contacted with a color adsorbing material for 1 hour.

In certain embodiments, the one or more glycan polymers are contacted with a color adsorbing material at a temperature from 20 to 100 degrees Celsius, 30 to 80 degrees Celsius, 40 to 80 degrees Celsius, or 40 to 65 degrees Celsius. In a particular embodiment, the one or more glycan polymers are contacted with a color adsorbing material at a temperature of 50 degrees Celsius.

In certain embodiments, the color adsorbing material is activated carbon. In one embodiment, the color adsorbing material is powdered activated carbon. In other embodiments, the color adsorbing material is an ion exchange resin. In one embodiment, the color adsorbing material is a strong base cationic exchange resin in a chloride form. In another embodiment, the color adsorbing material is cross-linked polystyrene. In yet another embodiment, the color adsorbing material is cross-linked polyacrylate. In certain embodiments, the color adsorbing material is Amberlite FPA91, Amberlite FPA98, Dowex 22, Dowex Marathon MSA, or Dowex Optipore SD-2.

Ion-Exchange/De-Salting (Demineralization)

In some embodiments, the one or more glycan polymers produced are contacted with a material to remove salts, minerals, and/or other ionic species. In certain embodiments, the one or more glycan polymers produced are flowed through an anionic exchange column. In other embodiments, the one or more glycan polymers produced are flowed through an anionic/cationic exchange column pair. In one embodiment, the anionic exchange column contains a weak base exchange resin in a hydroxide form and the cationic exchange column contains a strong acid exchange resin in a protonated form. In certain embodiments, the one or more glycan polymers produced are flowed through the ion exchange resin columns at a specified temperature and flow rate determined for the particular column and/or exchange medium. In particular embodiment, the one or more glycan polymers produced are flowed through the ion exchange resin columns for a period of time, after which the ion exchange media are regenerated. In a certain embodiment, the anionic exchange resin is Dowex 66 or Dowex 77.

Separation and Concentration

In some embodiments, the methods described herein further include isolating the one or more glycan polymers produced. In certain variations, isolating the one or more glycan polymers comprises separating at least a portion of the one or more glycan polymers from at least a portion of the catalyst, using any method known in the art, including, for example, centrifugation, filtration (e.g., vacuum filtration, membrane filtration), and gravity settling. In some embodiments, isolating the one or more glycan polymers comprises separating at least a portion of the one or more glycan polymers from at least a portion of any unreacted sugar, using any method known in the art, including, for example, filtration (e.g., membrane filtration), chromatography (e.g., chromatographic fractionation), differential solubility, and centrifugation (e.g., differential centrifugation).

In some embodiments, the methods described herein further include a concentration step. For example, in some embodiments, the isolated glycan polymers undergo evaporation (e.g., vacuum evaporation) to produce a concentrated glycan polymers composition. In other embodiments, the isolated glycan polymers undergo a spray drying step to produce an oligosaccharide powder. In certain embodiments, the isolated glycan polymers undergo both an evaporation step and a spray drying step.

Fractionation

In some embodiments, the methods described herein further include a fractionation step. Glycan polymers prepared and purified may be subsequently separated by molecular weight using any method known in the art, including, for example, high-performance liquid chromatography, adsorption/desorption (e.g. low-pressure activated carbon chromatography), or filtration (for example, ultrafiltration or diafiltration). In certain embodiments, prepared and purified glycan polymers are separated into pools representing 60%, 65%, 70%, 75%, 80%, 85%, 90%, 95%, 97%, 98%, or greater than 98% short (about DP1-2), medium (about DP3-10), long (about DP11-18), or very long (about DP>18) species.

In certain embodiments, prepared glycan polymers are fractionated by adsorption onto a carbonaceous material and subsequent desorption of fractions by washing the material with mixtures of an organic solvent in water at a concentration of 1%, 5%, 10%, 20%, 50%, or 100%. In one embodiment, the adsorption material is activated charcoal. In another embodiment, the adsorption material is a mixture of activated charcoal and a bulking agent such as diatomaceous earth or Celite 545 in 5%, 10%, 20%, 30%, 40%, or 50% portion by volume or weight.

In further embodiments, prepared glycan polymers are separated by passage through a high-performance liquid chromatography system. In certain variations, prepared glycan polymers are separated by ion-affinity chromatography, hydrophilic interaction chromatography, or size-exclusion chromatography including gel-permeation and gel-filtration.

In other embodiments, low molecular weight materials are removed by filtration methods. In certain variations, low molecular weight materials may be removed by dialysis, ultrafiltration, diafiltration, or tangential flow filtration. In certain embodiments, the filtration is performed in static dialysis tube apparatus. In other embodiments, the filtration is performed in a dynamic flow filtration system. In other embodiments, the filtration is performed in centrifugal force-driven filtration cartridges.

Additional Reaction Features

In some embodiments, the reaction is free of biological substances, such as proteins or nucleic acids. In certain embodiments, the reaction does not comprise an enzyme, e.g., a glycosidic linkage modifying enzyme (e.g., an active form of a glycosidic linkage modifying enzyme). Exemplary glycosidic linkage modifying enzymes include glycosidases, glycan synthases (e.g., glycogen synthase or cellulose synthase), hydrolases (e.g., beta-galactosidase, alpha-amylase, lichenase, lactosidase), glycosyltransferases, or a debranching enzyme (e.g., pullulanase, alpha-amylo-1,6-glucosidase). In some embodiments, less than 50, 30, 10, or 5% of glycosidic bond formation is the result of a glycosidic linkage modifying enzyme.

In some embodiments, the reaction mixture is carried out under conditions to inactivate (e.g., completely or partially inactivate) a biological substance (e.g., a protein or nucleic acid). For example, the reaction mixture may be subjected to a temperature (e.g., high temperature or low temperature) or pressure (e.g., high pressure or low pressure) to render a protein (e.g., an enzyme) partially or completely inactive.

Properties of Glycan Polymer Preparations

Glycan polymer preparations may have any one or more of the characteristics and properties disclosed in WO2016/122889, WO2016/172657, WO 2016/007778, and WO2016/172658, each of which is incorporated herein by reference in its entirety, and any characteristics and properties disclosed herein.

The glycan polymer preparations produced by the methods described herein may comprise oligosaccharides. In some embodiments, the glycan polymer preparations comprise homo-oligosaccharides (or homoglycans), wherein all the monosaccharides in a polymer are of the same type.

In some embodiments, the glycan polymer preparations comprise hetero-oligosaccharides (or heteroglycans), wherein more than one type of monosaccharide is present in the polymer. In some embodiments, the glycan polymer preparations have one or more of the properties described herein. In some embodiments, the glycan polymer preparation has one or more of the bulk properties described herein.

Degree of Polymerization (DP)

In some embodiments, glycan polymer preparations are produced, e.g., using a method described herein, that are polydisperse, exhibiting a range of degrees of polymerization. Optionally, the preparations may be fractionated, e.g. representing 60%, 65%, 70%, 75%, 80%, 85%, 90%, 95%, 97%, 98%, or greater than 98% short (about DP1-2), medium (about DP3-10), long (about DP11-18), or very long (about DP>18) species. In one embodiment, a polydisperse, fractionated glycan polymer preparation is provided comprising at least 85%, 90%, or at least 95% medium-length species with a DP of about 3-10. In one embodiment, a polydisperse, fractionated glycan polymer preparation is provided comprising at least 85%, 90%, or at least 95% long-length species with a DP of about 11-18. In one embodiment, a polydisperse, fractionated glycan polymer preparation is provided comprising at least 85%, 90%, or at least 95% very long-length species with a DP of about 18-30.

Optionally, the preparations may be fractionated, e.g. representing 60%, 65%, 70%, 75%, 80%, 85%, 90%, 95%, 97%, 98%, or greater than 98% short (about DP1-2) or medium (about DP3-10) glycans in the preparation. Alternatively, or in addition to fractionation, the small DP fraction (e.g. monomers and dimers) are subjected to enzymatic fermentation, e.g. with suitable yeasts to break down these sugars. In one embodiment, a polydisperse, fractionated glycan polymer preparation is prepared using a method described herein, comprising at least 85%, 90%, or at least 95% of glycans with a DP of about 3-10.

In some embodiments, about 55%, 60%, 65%, 70%, 75%, 80%, 85%, 90%, 95%, or about 97% of the glycans of the glycan polymer preparation have a DP of at least DP3, DP4, DP5, DP6 or DP7. In some embodiments, about 55%, 60%, 65%, 70%, 75%, 80%, 85%, 90%, 95%, or about 97% of the glycans of the glycan polymer preparation have a DP from about DP3 to about DP10, from about DP3 to about DP8, from about DP3 to about DP6, from about DP3 to about DP5, from about DP3 to about DP4, from about DP2 to about DP4, from about DP2 to about DP5, from about DP2 to about DP6, from about DP2 to about DP8, or from about DP2 to about DP10. In some embodiments, less than 1%, 2%, 3%, 5%, 10%, 15%, 20%, 25%, 30%, 40%, or less than 50% of the glycans of the glycan polymer preparation have a DP of DP2 or less.

In some embodiments, about 55%, 60%, 65%, 70%, 75%, 80%, 85%, 90%, 95%, or about 97% of the glycan polymer preparation has a DP of between 2 and 25, between 3 and 25, between 4 and 25, between 5 and 25, between 6 and 25, between 7 and 25, between 8 and 25, between 9 and 25, between 10 and 25, between 2 and 30, between 3 and 30, between 4 and 30, between 5 and 30, between 6 and 30, between 7 and 30, between 8 and 30, between 9 and 30, or between 10 and 30. In one embodiment, the glycan polymer preparation has a degree of polymerization (DP) of at least 3 and less than 30 glycan units.

In some embodiments, about 55%, 60%, 65%, 70%, 75%, 80%, 85%, 90%, 95%, or about 97% of the glycan polymer preparation has a DP of at least 5 and less than 30 glycan units. In some embodiments, about 55%, 60%, 65%, 70%, 75%, 80%, 85%, 90%, 95%, or about 97% of the glycan polymer preparation has a DP of at least 8 and less than 30 glycan units. In some embodiments, about 55%, 60%, 65%, 70%, 75%, 80%, 85%, 90%, 95%, or about 97% of the glycan polymer preparation has a DP of at least 10 and less than 30 glycan units. In some embodiments, about 55%, 60%, 65%, 70%, 75%, 80%, 85%, 90%, 95%, or about 97% of the glycan polymer preparation has a DP of between 3, 4, 5, 6, 7, 8 and 10, 11, 12, 13, 14, 15, 16, 17, 18, 19, 20 glycan units. In some embodiments, about 55%, 60%, 65%, 70%, 75%, 80%, 85%, 90%, 95%, or about 97% of the glycan polymer preparation has a DP of between 10, 11, 12, 13, 14, 15, 16, 17, 18, 19 and 20, 21, 22, 23, 24, 25, 26, 27, 28, 29, 30 glycan units. In some embodiments, about 55%, 60%, 65%, 70%, 75%, 80%, 85%, 90%, 95%, or about 97% of the glycan polymer preparation has a DP of between 3, 4, 5, 6, 7, 8, 9, 10 and 20, 21, 22, 23, 24, 25, 26, 27, 28 glycan units. In one embodiment, about 55%, 60%, 65%, 70%, 75%, 80%, 85%, 90%, 95%, or about 97% of the glycan polymer preparation has a DP of at least 2. In one embodiment, about 55%, 60%, 65%, 70%, 75%, 80%, 85%, 90%, 95%, or about 97% of the glycan polymer preparation has a DP of at least 3.

Average DP

In some embodiments, the glycan polymer preparation has an average degree of polymerization (average DP) of about DP2, DP3, DP4, DP5, DP6, DP7, DP8, or DP9. In some embodiments, the glycan polymer preparation has an average degree of polymerization (average DP) of between about 2 and about 10, between about 2 and about 8, between about 2 and about 6, between about 2 and about 4, between about 3 and about 10, between about 3 and about 8, between about 3 and about 6, or between about 3 and about 4.

In some embodiments, about 55%, 60%, 65%, 70%, 75%, 80%, 85%, 90%, 95%, or about 97% of the glycan polymer preparation has an average degree of polymerization (DP) of about DP5, DP6, DP7, DP8, DP9, DP10, DP11, or DP12. In some embodiments, the average DP of the glycan polymer preparation is between about DP5 and DP10, between about DP6 and DP10, between about DP6 and DP12, between about DP6 and DP14, between about DP8 and DP12, between about DP8 and DP14, between about DP8 and DP16, between about DP10 and DP16 between about DP10 and DP18, between about DP4 and DP18, between about DP6 and DP18, or between about DP8 and DP18.

Average Molecular Weight

In some embodiments, about 55%, 60%, 65%, 70%, 75%, 80%, 85%, 90%, 95%, or about 97% of the glycans of the preparation have an average molecular weight of about 200, 250, 300, 350, 400, 450, 500, 550, 600, 650, 700, 750, 800, 850, 900, 950, 1000, 1050, 1100, 1150, 1200, 1250, 1300, 1350, 1400, 1450, 1500, 1550, 1600, 1650, 1700, 1750, 1800 g/mol and less than 400, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, and 5000 g/mol.

Degree of Branching (DB)

In some embodiments, the glycan polymer preparations range in structure from linear to branched. Branched glycans may contain at least one glycan subunit being linked via an alpha or a beta glycosidic bond so as to form a branch. The branching rate or degree of branching (DB) may vary, such that the glycans of a preparation comprise at least 1, at least 2, at least 3, at least 4, at least 5, or at least about 6 branching points in the glycan. In some embodiments, the glycans of the glycan polymer preparation are unbranched (DB=0).

In some embodiments, the glycan polymer preparations range in structure from linear to highly branched. Unbranched glycans may contain only alpha linkages or only beta linkages. Unbranched glycans may contain at least one alpha and at least one beta linkage. Branched glycans may contain at least one glycan unit being linked via an alpha or a beta glycosidic bond so as to form a branch. The branching rate or degree of branching (DB) may vary, such that about every $2^{nd}$, $3^{rd}$, $4^{th}$, $5^{th}$, $6^{th}$, $7^{th}$, $8^{th}$, $9^{th}$, $10^{th}$, $15^{th}$, $20^{th}$, 25th, $30^{th}$, $35^{th}$, $40^{th}$, $45^{th}$, $50^{th}$, $60^{th}$, or $70^{th}$ unit comprises at least one branching point. For example, animal glycogen contains a branching point approximately every 10 units.

In some embodiments, preparations of glycan are provided, wherein the preparation comprises a mixture of branched glycans, wherein the average degree of branching (DB, branching points per residue) is 0 (unbranched), 0.01. 0.02, 0.03, 0.04, 0.05, 0.06, 0.07, 0.08, 0.09, 0.1, 0.2, 0.3, 0.4, 0.5, 0.6, 0.7, 0.8, 0.9, 0.95, 0.99, 1, or 2. In some embodiments, preparations of glycans are provided, wherein the average degree of branching is at least 0.01, 0.05, 0.1, 0.2, 0.3, or at least 0.4. In some embodiments, preparations of glycans are provided, wherein the average degree of branching is between about 0.01 and 0.1, 0.01 and 0.2, 0.01 and 0.3, 0.01 and 0.4, 0.01 and 0.5, 0.01 and 0.6, or between about 0.01 and 0.7. In some embodiments, preparations of glycans are provided, wherein the average degree of branching is between about 0.05 and 0.1, 0.05 and 0.2, 0.05 and 0.3, 0.05 and 0.4, 0.05 and 0.5, 0.05 and 0.6, or between about 0.05 and 0.7. In some embodiments, preparations of glycans are provided, wherein the average degree of branching is not 0. In some embodiments, preparations of glycans are provided, wherein the average degree of branching is not between at least 0.1 and less than 0.4 or at least 0.2 and less than 0.4. In some embodiments, the preparations of glycans comprise linear glycans. In some embodiments, the preparations of glycans comprise glycans that exhibit a branched or branch-on-branch structure.

In some embodiments, preparations of glycans are provided wherein the average degree of branching (DB) is not 0, but is at least 0.01, 0.05, 0.1, or at least 0.2, or ranges between about 0.01 and about 0.2 or between about 0.05 and 0.1.

Glycosidic Bonds and Linkages

Linkages between the individual glycan subunits found in preparations of glycans may include alpha 1→2, alpha 1→3, alpha 1→4, alpha 1→5, alpha 1→6, alpha 2→1, alpha 2→3, alpha 2→4, alpha 2→6, beta 1→2, beta 1→3, beta 1→4, beta 1→5, beta 1→6, beta 2→1, beta 2→3, beta 2→4, and beta 2→6.

In some embodiments, the glycan polymer preparations comprise only alpha linkages. In some embodiments, the glycan polymer preparations comprise only beta linkages. In some embodiments, the glycan polymer preparations comprise mixtures of alpha and beta linkages. In some embodiments, the alpha:beta glycosidic bond ratio in a preparation is about 1:1, 2:1, 3:1, 4:1, or 5:1. In some embodiments, the beta:alpha glycosidic bond ratio in a preparation is about 1:1, 2:1, 3:1, 4:1, or 5:1.

In some embodiments, the alpha:beta glycosidic bond ratio in a preparation is about 0.1:1, 0.2:1, 0.3:1, 0.4:1, 0.5:1, 0.6:1, 0.7:1, 0.8:1, 0.9:1, 1:1, 1.2:1, 1.5:1, 1.7:1, 2:1, 2.2:1, 2.5:1, 2.7:1, 3:1, 4:1, 5:1, 6:1, 7:1, 8:1, 9:1, or about 10:1.

In some embodiments, the glycans of the glycan polymer preparation comprise both alpha- and beta-glycosidic bonds selected from the group consisting of 1→2 glycosidic bond, a 1→3 glycosidic bond, a 1→4 glycosidic bond, a 1→5 glycosidic bond and a 1→6 glycosidic bond. In some embodiments, the glycan polymer preparation comprises at least two or at least three alpha and beta 1→2 glycosidic bonds, alpha and beta 1→3 glycosidic bonds, alpha and beta 1→4 glycosidic bonds, alpha and beta 1→5 glycosidic bonds, and/or alpha and beta 1→6 glycosidic bonds.

In some embodiments, the glycans of the glycan polymer preparation comprise substantially all alpha- or beta configured glycan subunits, optionally comprising about 1%, 2%, 3%, 4% 5%, 6%, 7%, 8%, 9%, 10%, 11%, 12%, 13%, 14%, 15%, 16%, 17%, 18%, 19%, or 20% of the respective other configuration.

In some embodiments, the preparations of glycans comprise at least 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, 97%, 98%, 99%, at least 99.9% or even 100% glycans with alpha glycosidic bonds. In some embodiments, the preparations of glycans comprise at least 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, 97%, 98%, 99%, at least 99.9% or even 100% glycans with beta glycosidic bonds. In some embodiments, preparations of glycans are provided, wherein at least 10%, 15%, 20%, 25%, 30%, 35%, 40%, 45%, 50%, 55%, 60%, 65%, 70%, 75%, 80%, or at least 85% of glycans with glycosidic bonds that are alpha glycosidic bonds, at least 10%, 15%, 20%, 25%, 30%, 35%, 40%, 45%, 50%, 55%, 60%, 65%, 70%, 75%, 80%, or at least 85% of glycans with glycosidic bonds that are beta glycosidic bonds, and wherein the percentage of alpha and beta glycosidic bonds does not exceed 100%.

In some embodiments, preparations of glycans are provided, wherein at least 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, 97%, 98%, 99%, at least 99.9% or even 100% of glycan glycosidic bonds are one or more of: 1→2 glycosidic bonds, 1→3 glycosidic bonds, 1→4 glycosidic bonds, and 1→6 glycosidic bonds. In some embodiments, preparations of glycans are provided, wherein at least 1%, 2%, 3%, 4%, 5%, 6%, 7%, 8%, 9%, 10%, 15%, at least 20%, or 25% each of glycan glycosidic bonds are 1→2, 1→3, 1→4, and 1→6 glycosidic bonds.

Optionally, the preparations of glycans further comprise at least 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, or at least 85% of glycan glycosidic bonds that are selected from the group consisting of: alpha 2→1, alpha 2→3, alpha 2→4, alpha 2→6, beta 2→1, beta 2→3, beta 2→4, and beta 2→6, glycosidic bonds.

In some embodiments, the glycans of the glycan polymer preparation comprise at least two glycosidic bonds selected from the group consisting of alpha 1→2 and alpha 1→3, alpha 1→2 and alpha 1→4, alpha 1→2 and alpha 1→6, alpha 1→2 and beta 1→2, alpha 1→2 and beta 1→3, alpha 1→2 and beta 1→4, alpha 1→2 and beta 1→6, alpha 1→3 and alpha 1→4, alpha 1→3 and alpha 1→6, alpha 1→3 and beta 1→2, alpha 1→3 and beta 1→3, alpha 1→3 and beta 1→4, alpha 1→3 and beta 1→6, alpha 1→4 and alpha 1→6, alpha 1→4 and beta 1→2, alpha 1→4 and beta 1→3, alpha 1→4 and beta 1→4, alpha 1→4 and beta 1→6, alpha 1→6 and beta 1→2, alpha 1→6 and beta 1→3, alpha 1→6 and beta 1→4, alpha 1→6 and beta 1→6, beta 1→2 and beta 1→3, beta 1→2 and beta 1→4, beta 1→2 and beta 1→6, beta 1→3 and beta 1→4, beta 1→3 and beta 1→6, and beta 1→4 and beta 1→6.

L- and D-Forms

In some embodiments, preparations of glycans are provided, wherein at least one glycan subunit is a sugar in L-form. In some embodiments, preparations of glycans are provided, wherein at least one glycan subunit is a sugar in D-form. In some embodiments, preparations of glycans are provided, wherein the glycan subunits are sugars in L- or D-form as they naturally occur or are more common (e.g. D-glucose, D-xylose, L-arabinose).

In some embodiments, the preparation of glycans (e.g. oligosaccharides and polysaccharides) comprises a desired mixture of L- and D-forms of glycan subunits, e.g. of a desired ratio, such as: 1:1, 1:2, 1:3, 1:4, 1:5 L- to D-forms or D- to L-forms.

In some embodiments, the preparation of glycans comprises a desired mixture of L- and D-forms of glycan units, e.g. of a desired ratio, such as: 1:1, 1:2, 1:3, 1:4, 1:5, 1:6, 1:7, 1:8, 1:9, 1:10, 1:12, 1:14, 1:16, 1:18, 1:20, 1:25, 1:30, 1:35, 1:40, 1:45, 1:50, 1:55, 1:60, 1:65, 1:70, 1:75, 1:80, 1:85, 1:90, 1:100, 1:150 L- to D-forms or D- to L-forms.

In some embodiments, the preparation of glycans comprises glycans with substantially all L- or D-forms of glycan subunits, optionally comprising about 1%, 2%, 3%, 4% 5%, 6%, 7%, 8%, 9%, 10%, 11%, 12%, 13%, 14%, 15%, 16%, 17%, 18%, 19%, or 20% of the respective other form.

Glycan Unit Content

In some embodiments, preparations of glycans are provided, wherein at least one glycan subunit is a tetrose, a pentose, a hexose, or a heptose. Optionally, the glycan subunits involved in the formation of the glycans of the glycan polymer preparation are varied. Examples of monosaccharide glycan subunits include hexoses, such as glucose, galactose, and fructose, and pentoses, such as xylose. Monosaccharides generally have the chemical formula: $C_x(H_2O)_y$, where conventionally x≥3. Monosaccharides can be classified by the number x of carbon atoms they contain, for example: diose (2) triose (3) tetrose (4), pentose (5), hexose (6), and heptose (7). The monosaccharide glycan subunits may exist in an acyclic (open-chain) form. Open-chain monosaccharides with same molecular graph may exist as two or more stereoisomers. The monosaccharides may also exist in a cyclic form through a nucleophilic addition reaction between the carbonyl group and one of the hydroxyls of the same molecule. The reaction creates a ring of carbon atoms closed by one bridging oxygen atom. In these cyclic forms, the ring usually has 5 (furanoses) or 6 atoms (pyranoses).

In some embodiments, the preparation of glycans comprises a desired mixture of different monosaccharide glycan subunits, such as a mixture of a diose (2), a triose (3), tetrose (4), pentose (5), hexose (6), or heptose (7). In some embodiments, the glycans of the glycan polymer preparation comprise a desired mixture of a pentose (5) and a hexose (6).

In some embodiments, the preparation of glycans comprises a desired mixture of two, three, four or five different glycan subunits, such as a mixture of, e.g., i) one or more glycan subunits selected from monosaccharides, selected from glucose, a galactose, an arabinose, a mannose, a fructose, a xylose, a fucose, and a rhamnose; ii) one or more glycan subunits selected from disaccharides selected from acarviosin, n-acetyllactosamine, allolactose, cellobiose, chitobiose, glactose-alpha-1,3-galactose, gentiobiose, isomalt, isomaltose, isomaltulose, kojibiose, lactitol, lactobionic acid, lactose, lactulose, laminaribiose, maltitol, maltose, mannobiose, melibiose, melibiulose, neohesperidose, nigerose, robinose, rutinose, sambubiose, sophorose, sucralose, sucrose, sucrose acetate isobutyrate, sucrose octaacetate, trehalose, turanose, vicianose, and xylobiose; iii) one or more glycan subunits selected from amino sugars selected from acarbose, N-acetylemannosamine, N-acetylmuramic acid, N-acetylneuraminic acid, N-acetyletalosaminuronic acid, arabinopyranosyl-N-methyl-N-nitrosourea, D-fructose-L-histidine, N-glycolyneuraminic acid, ketosamine, kidamycin, mannosamine, 1B-methylseleno-N-acetyl-D-galactosamine, muramic acid, muramyl dipeptide, phosphoribosylamine, PUGNAc, sialyl-Lewis A, sialyl-Lewis X, validamycin, voglibose, N-acetylgalactosamine, N-acetylglucosamine, aspartylglucosamine, bacillithiol, daunosamine, desosamine, fructosamine, galactosamine, glucosamine, meglumine, and perosamine; iv) one or more glycan subunits selected from deoxy sugars selected from 1-5-ahydroglucitol, cladinose, colitose, 2-deoxy-D-glucose, 3-deoxyglucasone, deoxyribose, dideoxynucleotide, digitalose, fludeooxyglucose, sarmentose, and sulfoquinovose; v) one or more glycan subunits selected from imino sugars selected from castanospermine, 1-deoxynojirimycin, iminosugar, miglitol, miglustat, and swainsonine; one or more glycan subunits selected from sugar acids selected from N-acetylneuraminic acid, N-acetyltalosamnuronic acid, aldaric acid, aldonic acid, 3-deoxy-D-manno-oct-2-ulosonic acid, glucuronic acid, glucosaminuronic acid, glyceric acid, N-glycolylneuraminic acid, iduronic acid, isosaccharinic acid, pangamic acid, sialic acid, threonic acid, ulosonic acid, uronic acid, xylonic acid, gluconic acid, ascorbic acid, ketodeoxyoctulosonic acid, galacturonic acid, galactosaminuronic acid, mannuronic acid, mannosaminuronic acid, tartaric acid, mucic acid, saccharic acid, lactic acid, oxalic acid, succinic acid, hexanoic acid, fumaric acid, maleic acid, butyric acid, citric acid, glucosaminic acid, malic acid, succinamic acid, sebacic acid, and capric acid; vi) one or more glycan subunits selected from short-chain fatty acids selected from formic acid, acetic acid, propionic acid, butyric acid, isobutyric acid, valeric acid, and isovaleric acid; and vii) one or more glycan subunits selected from sugar alcohols selected from methanol, ethylene glycol, glycerol, erythritol, threitol, arabitol, ribitol, xylitol, mannitol, sorbitol, galactitol, iditol, volemitol, fucitol, inositol, maltotritol, maltotetraitol, and polyglycitol.

Exemplary glycans are described by a three-letter code representing the monomeric sugar component followed by a number out of one hundred reflecting the percentage of the material that monomer constitutes. Thus, 'glu100' is ascribed to a glycan generated from a 100% D-glucose (glycan unit) input and 'glu50gal50' is ascribed to a glycan generated from 50% D-glucose and 50% D-galactose (glycan units) input or, alternatively from a lactose dimer (glycan unit) input. As used herein: xyl=D-xylose; ara=L-arabinose; gal=D-galactose; glu=D-glucose; rha=L-rhamnose; fuc=L-fucose; man=D-mannose; sor=D-sorbitol; gly=D-glycerol; neu=NAc-neuraminic acid.

In some embodiments, the preparation of glycans comprises one glycan unit A selected from i) to vii) above, wherein glycan unit A comprises 100% of the glycan unit input. For example, in some embodiments, the glycan polymer preparation is selected from the homo-glycans xyl100, rha100, ara100, gal100, glu100, and man100. In some embodiments, the glycan polymer preparation is selected from the homo-glycans fuc100 and fru100.

In some embodiments, the preparation of glycans comprises a mixture of two glycan units A and B selected independently from i) to vii) above, wherein A and B may be selected from the same or a different group i) to vii) and wherein A and B may be selected in any desired ratio (e.g. anywhere from 1-99% A and 99-1% B, not exceeding 100%).

For example, in some embodiments, the glycan polymer preparation is selected from the hetero-glycans ara50gal50, ara50gal50, xyl75gal25, ara80xyl20, ara60xyl40, ara50xyl50, glu80man20, glu60man40, man80glu20, man60glu40, xyl75ara25, gal75xyl25, man80gal20, gal75xyl25, man66gal33, man75gal25, glu80gal20, glu60gal40, glu40gal60, glu20gal80, gal80man20, gal60man40, gal40man60, glu80xyl20, glu60xyl40, glu40xyl60, glu20xyl80, glu80ara20, glu60ara40, glu40ara60, glu20ara80, gal80xyl20, gal60xyl40, gal40xyl60, gal20xyl80, gal80ara20, gal60ara40, gal40ara60, gal20ara80, man80xyl20, man60xyl40, man40xyl60, man20xyl80, man80ara20, man60ara40, man40ara60, man20ara80, xyl80ara20, xyl60ara40, glu50gal50, and man62glu38.

In some embodiments, the preparation of glycans comprises a mixture of three glycan units A, B and C selected independently from i) to vii) above, wherein A, B and C may be selected from the same or a different group i) to vii) and wherein A, B and C may be selected in any desired ratio (e.g. anywhere from 1-99% A, 1-99% B, 1-99% C, not exceeding 100%).

For example, in some embodiments, the glycan polymer preparation is selected from the hetero-glycans xyl75glu12gal12, xyl33glu33gal33, xyl75glu12gal12, glu33gal33fuc33, glu33gal33nman33, glu33gal33xyl33, glu33gal33ara33, gal33man33xyl33, gal33man33ara33, man52glu29gal19, glu33man33xyl33, glu33man33ara33, glu33xyl33ara33, gal33man33xyl33, gal33man33ara33, gal33xyl33ara33, man33xyl33ara33, glu90gal5man5, glu80gal10man10, glu60gal20man20, glu40gal30man30, glu20gal40man40, glu10gal45man45, glu5gal90man5, glu10gal80man10, glu20gal60man20, glu30gal40man30, glu40gal20man40, glu45gal10man45, glu5gal5man90, glu10gal10man80, glu20gal20man60, glu30gal30man40, glu40gal40man20, and glu45gal45man10.

In some embodiments, the preparation of glycans comprises a mixture of four glycan units A, B, C and D selected independently from i) to vii) above, wherein A, B, C and D may be selected from the same or a different group i) to vii) and wherein A, B, C and D may be selected in any desired ratio (e.g. anywhere from 1-99% A, 1-99% B, 1-99% C, 1-99% D, not exceeding 100%).

In some embodiments, the preparation of glycans comprises a mixture of five glycan units A, B, C, D and E selected independently from i) to vii) above, wherein A, B, C, D and E may be selected from the same or a different group i) to vii) and wherein A, B, C, D and E may be selected in any desired ratio (e.g. anywhere from 1-99% A, 1-99% B, 1-99% C, 1-99% D, 1-99% E, not exceeding 100%).

Provided herein are glycan polymer preparations (as described herein, e.g., having any DP, DB, alpha:beta glycosidic bond ratio, number of glycosidic bonds, bond regiochemistry and bond stereochemistry, and other characteristics (e.g., solubility, fermentability, viscosity, sweetness, etc.) described herein), comprising glycans comprising:

1) a glucose glycan unit, optionally wherein the glycan polymer preparation comprises any amount of glucose between 1% and 100%, further optionally wherein the glycan polymer preparation comprises a second, third, fourth or fifth glycan unit (optionally, independently selected from xylose, arabinose, galactose, mannose, rhamnose, fructose, or fucose), further optionally, wherein the glycan polymer preparation is one of: gal50glu25fru25, gal57glu43, gal57glu43, glu100, glu10gal10man80, glu10gal45man45, glu10gal80man10, glu20ara80, glu20gal20man20xyl20ara20, glu20gal20man60, glu20gal40man40, glu20gal60man20, glu20gal80, glu20xyl80, glu25gal25man25ara25, glu25gal25man25xyl25, glu25gal25xyl25ara25, glu25man25xyl25ara25, glu30gal30man40, glu30gal40man30, glu33gal33ara33, glu33gal33fuc33, glu33gal33man33, glu33gal33xyl33, glu33man33ara33, glu33man33xyl33, glu33xyl33ara33, glu40ara60, glu40gal20man40, glu40gal30man30, glu40gal40man20, glu40gal60, glu40xyl60, glu45gal10man45, glu45gal45man10, glu50gal50, glu5gal5man90, glu5gal90man5, glu60ara40, glu60gal20man20, glu60gal40, glu60man40, glu60xyl40, glu66fru33, glu80ara20, glu80gal10man10, glu80gal20, glu80man20, glu80man20, glu80xyl20, glu90gal5man5, man52glu29gal19, man60glu40, man62glu38, man80glu20, xyl33glu33gal33, or xyl75glu12gal12;

2) a galactose glycan unit, optionally wherein the glycan polymer preparation comprises any amount of galactose between 1% and 100%, further optionally wherein the glycan polymer preparation comprises a second, third, fourth or fifth glycan unit (optionally, independently selected from xylose, arabinose, glucose, mannose, rhamnose, fructose, or fucose), further optionally, wherein the glycan polymer preparation is one of: ara50gal50, gal100, gal20ara80, gal20xyl80, gal25man25xyl25ara25, gal33man33ara33, gal33man33xyl33, gal33xyl33ara33, gal40ara60, gal40man60, gal40xyl60, gal50glu25fru25, gal57fru43, gal57glu43, gal60ara40, gal60man40, gal60xyl40, gal75xyl25, gal80ara20, gal80man20, gal80xyl20, glu10gal10man80, glu10gal45man45, glu10gal80man10, glu20gal20man20xyl20ara20, glu20gal20man60, glu20gal40man40, glu20gal60man20, glu20gal80, glu25gal25man25ara25, glu25gal25man25xyl25, glu25gal25xyl25ara25, glu30gal30man40, glu30gal40man30, glu33gal33ara33, glu33gal33fuc33, glu33gal33man33, glu33gal33xyl33, glu40gal20man40, glu40gal30man30, glu40gal40man20, glu40gal60, glu45gal10man45, glu45gal45man10, glu50gal50, glu5gal5man90, glu5gal90man5, glu60gal20man20, glu60gal40, glu80gal10man10, glu80gal20, glu90gal5man5, man52glu29gal19, man66gal33, man75gal25, man80gal20, xyl33glu33gal33, xyl75gal25, or xyl75glu12gal12;

3) a mannose glycan unit, optionally wherein the glycan polymer preparation comprises any amount of mannose between 1% and 100%, further optionally wherein the glycan polymer preparation comprises a second, third, fourth or fifth glycan unit (optionally, independently selected from xylose, arabinose, glucose, galactose, rhamnose, fructose, or fucose), further optionally, wherein the glycan polymer preparation is one of: gal25man25xyl25ara25, gal33man33ara33, gal33man33xyl33, gal40man60, gal60man40, gal80man20, glu10gal10man80, glu10gal45man45, glu10gal80man10, glu20gal20man20xyl20ara20, glu20gal20man60, glu20gal40man40, glu20gal60man20, glu25gal25man25ara25, glu25gal25man25xyl25, glu25man25xyl25ara25, glu30gal30man40, glu30gal40man30, glu33gal33man33, glu33man33ara33, glu33man33xyl33, glu40gal20man40, glu40gal30man30, glu40gal40man20, glu45gal10man45, glu45gal45man10, glu5gal5man90, glu5gal90man5, glu60gal20man20, glu60man40, glu80gal10man10, glu80man20, glu80man20, glu90gal5man5, man100, man20ara80, man20xyl80, man33xyl33ara33, man40ara60, man40xyl60, man52glu29gal19, man60ara40, man60glu40, man60xyl40, man62glu38, man66gal33, man75gal25, man80ara20, man80gal20, man80glu20, or man80xyl20;

4) an arabinose glycan unit, optionally wherein the glycan polymer preparation comprises any amount of arabinose between 1% and 100%, further optionally wherein the glycan polymer preparation comprises a second, third, fourth or fifth glycan unit (optionally, independently selected from xylose, glucose, galactose, mannose, rhamnose, fructose, or fucose), further optionally, wherein the glycan polymer preparation is one of: ara100, ara50gal50, ara50xyl50, ara60xyl40, ara80xyl20, gal20ara80, gal25man25xyl25ara25, gal33man33ara33, gal33xyl33ara33, gal40ara60, gal60ara40, gal80ara20, glu20ara80, glu20gal20man20xyl20ara20, glu25gal25man25ara25, glu25gal25xyl25ara25, glu25man25xyl25ara25, glu33gal33ara33, glu33man33ara33, glu33xyl33ara33, glu40ara60, glu60ara40, glu80ara20, man20ara80, man33xyl33ara33, man40ara60, man60ara40, man80ara20, xyl60ara40, xyl75ara25, or xyl80ara20;

5) a xylose glycan unit, optionally wherein the glycan polymer preparation comprises any amount of xylose between 1% and 100%, further optionally wherein the glycan polymer preparation comprises a second, third, fourth or fifth glycan unit (optionally, independently selected from arabinose, glucose, galactose, mannose, rhamnose, fructose, or fucose), further optionally, wherein the glycan polymer preparation is one of: ara50xyl50, ara60xyl40, ara80xyl20, gal20xyl80, gal25man25xyl25ara25, gal33man33xyl33, gal33xyl33ara33, gal40xyl60, gal60xyl40, gal75xyl25, gal80xyl20, glu20gal20man20xyl20ara20, glu20xyl80, glu25gal25man25xyl25, glu25gal25xyl25ara25, glu25man25xyl25ara25, glu33gal33xyl33, glu33man33xyl33, glu33xyl33ara33, glu40xyl60, glu60xyl40, glu80xyl20, man20xyl80, man33xyl33ara33, man40xyl60, man60xyl40, man80xyl20, xyl100, xyl33glu33gal33, xyl60ara40, xyl75ara25, xyl75gal25, xyl75glu12gal12, or xyl80ara20;

6) a fructose glycan unit, optionally wherein the glycan polymer preparation comprises any amount of fructose between 1% and 100%, further optionally wherein the glycan polymer preparation comprises a second, third, fourth or fifth glycan unit (optionally, independently selected from xylose, arabinose, glucose, galactose, mannose, rhamnose, or fucose), further optionally, wherein the glycan polymer preparation is one of: fru100, gal50glu25fru25, gal57fru43, or glu66fru33;

7) a fucose glycan unit, optionally wherein the glycan polymer preparation comprises any amount of fucose between 1% and 100%, further optionally wherein the glycan polymer preparation comprises a second, third, fourth or fifth glycan unit (optionally, independently selected from xylose, arabinose, glucose, galactose, mannose, rhamnose, or fructose), further optionally, wherein the glycan polymer preparation is one of: glu33gal33fuc33;

8) a rhamnose glycan unit, optionally wherein the glycan polymer preparation comprises any amount of rhamnose between 1% and 100%, further optionally wherein the glycan polymer preparation comprises a second, third, fourth or fifth glycan unit (optionally, independently selected from xylose, arabinose, glucose, galactose, mannose, fructose, or fucose), further optionally, wherein the glycan polymer preparation is rha100; and
further, optionally, wherein the glycan polymer preparation comprises one or more (e.g., two, three, four, five, six, seven, eight, or nine) of the following properties (including bulk properties):

i) the glycan polymer preparation comprises glycans that comprise glucose, galactose, arabinose, mannose, fructose, xylose, fucose, or rhamnose glycan units;

ii) the average degree of branching (DB) of the glycans in the glycan polymer preparation is 0, between 0.01 and 0.6, between 0.05 and 0.5, between 0.1 and 0.4, or between 0.15 and 0.4;

iii) at least 50% (at least 60%, 65%, 70%, 75%, 80%, or 85%, or less than 50%) of the glycans in the glycan polymer preparation have a degree of polymerization (DP) of at least 3 and less than 30 glycan units, at least 2 and less than 10 glycan units, at least 5 and less than 25 glycan units, or at least 10 and less than 35 glycan units (optionally, wherein the glycan unit is a monomer, e.g., a monosugar);

iv) the average DP (mean DP) of the glycan polymer preparation is between about 2 and 5, between about 5 and 8, between about 8 and 13, between about 13 and 25, between 5 and 15, between about 5 and 20, or between about 5-15;

v) the ratio of alpha- to beta-glycosidic bonds present in the glycans of the glycan polymer preparation is 0, or between about 0.8:1 to about 5:1, between about 1:1 to about 5:1, between about 1:1 to about 3:1, between about 3:2 to about 2:1, or between about 3:2 to about 3:1, vi) the glycan polymer preparation comprises between 15 mol % and 75 mol % (between 20 mol % and 60 mol %, between 25 mol % and 50 mol %, or between 30 mol % and 45 mol %) 1,6 glycosidic bonds;

vii) the glycan polymer preparation comprises between 1 mol % and 40 mol % (between 1 mol % and 30 mol %, between 5 mol % and 25 mol %, between 10 mol % and 20 mol %) of at least one, two, or three of 1,2; 1,3; and 1,4 glycosidic bonds;

viii) the glycan polymer preparation has a final solubility limit in water of at least about 50 (at least about 60, 70, at least about 75, or less than 50) Brix at 23° C.; or ix) the glycan polymer preparation has a dietary fiber content (e.g., as measured by AOAC 2009.01) of at least 50% (at least 60%, 70%, 80%, or at least 90%, or less than 50%), x) any combination of:
two of: i), ii), iii), iv), v), vi), vii), viii), and ix);
three of: i), ii), iii), iv), v), vi), vii), viii), and ix);
four of: i), ii), iii), iv), v), vi), vii), viii), and ix);
five of: i), ii), iii), iv), v), vi), vii), viii), and ix);
six of: i), ii), iii), iv), v), vi), vii), viii), and ix);
seven of: i), ii), iii), iv), v), vi), vii), viii), and ix);
eight of: i), ii), iii), iv), v), vi), vii), viii), and ix); or
all of: i), ii), iii), iv), v), vi), vii), viii), and ix).

In some embodiments, preparations of glycans are provided, wherein at least one glycan subunit is selected from the group consisting of a glucose, a galactose, an arabinose, a mannose, a fructose, a xylose, a fucose, and a rhamnose.

In some embodiments, the preparation of glycans comprises a desired mixture of two different monosaccharide glycan subunits, such as a mixture of, e.g., glucose and galactose, glucose and arabinose, glucose and mannose, glucose and fructose, glucose and xylose, glucose and fucose, glucose and rhamnose, galactose and arabinose, galactose and mannose, galactose and fructose, galactose and xylose, galactose and fucose, and galactose and rhamnose, arabinose and mannose, arabinose and fructose, arabinose and xylose, arabinose and fucose, and arabinose and rhamnose, mannose and fructose, mannose and xylose, mannose and fucose, and mannose and rhamnose, fructose and xylose, fructose and fucose, and fructose and rhamnose, xylose and fucose, xylose and rhamnose, and fucose and rhamnose, e.g. in a ratio of 1:1, 1:2, 1:3, 1:4, or 1:5 or the reverse ratio thereof, or a in a ratio of 1:1, 1:2, 1:3, 1:4, 1:5, 1:6, 1:7, 1:8, 1:9, 1:10, 1:12, 1:14, 1:16, 1:18, 1:20, 1:25, 1:30, 1:35, 1:40, 1:45, 1:50, 1:55, 1:60, 1:65, 1:70, 1:75, 1:80, 1:85, 1:90, or 1:100 or the reverse ratio thereof.

In some embodiments, the preparation of glycans comprises a desired mixture of three different monosaccharide glycan subunits, such as a mixture of, e.g. for glucose-containing glycan polymer preparations, glucose, galactose and arabinose; glucose, galactose and mannose; glucose, galactose and fructose; glucose, galactose and xylose; glucose, galactose and fucose, glucose, galactose and rhamnose; glucose, arabinose, and mannose; glucose, arabinose and fructose; glucose, arabinose and xylose; glucose, arabinose and fucose; glucose, arabinose and rhamnose; glucose, mannose and fructose; glucose, mannose and xylose; glucose, mannose and fucose; glucose, mannose rhamnose; glucose, fructose and xylose; glucose, fructose and fucose; glucose, fructose and rhamnose; glucose, fucose and rhamnose, e.g. in a ratio of 1:1:1, 1:2:1, 1:3:1, 1:4:1, 1:5:1, 1:1:2, 1:2:2, 1:3:2, 1:4:2, 1:1:3, 1:2:3, 1:3:3, 1:1:4, 1:2:4, 1:1:5, 1:2:5, etc., or in a ratio of 1:1:1, 1:2:1, 1:3:1, 1:4:1, 1:5:1, 1:6:1, 1:7:1, 1:8:1, 1:9:1, 1:10:1, 1:12:1, 1:14:1, 1:16:1, 1:18:1, 1:20:1, 1:1:2, 1:2:2, 1:3:2, 1:4:2, 1:5:2, 1:6:2, 1:7:2, 1:8:2, 1:9:2, 1:10:2, 1:1:3, 1:2:3, 1:3:3, 1:4:3, 1:5:3, 1:6:3, 1:7:3, 1:8:3, 1:9:3, 1:10:3, 1:1:4, 1:2:4, 1:3:4, 1:4:4, 1:5:4, 1:6:4, 1:7:4, 1:8:4, 1:9:4, 1:10:4, 1:1:5, 1:2:5, 1:3:5, 1:4:5, 1:5:5, 1:6:5, 1:7:5, 1:8:5, 1:9:5, 1:10:5, etc. In some embodiments, the preparation of glycans does not comprise N-acetylgalactosamine or N-acetylglucosamine. In some embodiments, the preparation of glycans does not comprise sialic acid. In some embodiments, the preparation of glycans does not comprise a lipid and fatty acid. In some embodiments, the preparation of glycans does not comprise an amino acid.

In one embodiment, the glycan polymer preparation has an average DP of 3 to 12 (e.g., an average DP between 5 to 10, or an average DP of 7), an average molecular weight of about 800 g/mol to about 1600 g/mol (e.g., an average molecular weight of about 1000 g/mol to about 1400 g/mol, e.g., 1200 g/mol). Such glycan polymer preparations may be a glu100 or glu50gal50 polymer preparation as described in the examples, e.g. in Examples 1-9.

In one embodiment, the glycan polymer preparation has an average DP of 3 to 12 (e.g., an average DP between 5 to 10, or an average DP of 7), an average molecular weight of about 800 g/mol to about 1600 g/mol (e.g., an average molecular weight of about 1000 g/mol to about 1400 g/mol, e.g., 1200 g/mol). Such glycan polymer preparations may be a glu100 or glu50gal50 oligosaccharide as described in the examples, e.g. in Examples 1-9.

In one embodiment, the glycan polymer preparation has an DP greater than or equal to 2 (DP2+) or a DP greater than or equal to 3 (DP3+). In one embodiment, the glycan polymer preparation has a DP2+ value ranging from 75-95% (e.g., 80-90%) or a DP3+ value ranging from 40-80% (e.g., 45-75%). Such glycan polymer preparations may be a glu100 or glu50gal50 polymer preparation as described in the examples, e.g. in Examples 1-9.

In one embodiment, the glycan polymer preparation has an average alpha/beta ratio from 0.8 to 2.2 (e.g., an average alpha/beta ratio from 1.0 to 2.0, e.g., about 1.5, about 1.6 or about 1.7). Such glycan polymer preparations may be a glu100, gal100, man100, xyl100, glu50gal50, glu33gal33fruc33 or xyl75gal25 polymer preparation as described in the examples, e.g. in Examples 1-5. In another embodiment, the glycan polymer preparation has an average alpha/beta ration from 2.5 to 5.0 (e.g., an average alpha/beta ratio from 3.0 to 4.5, e.g., about 3.8, 3.9, 4.0, or 4.1). Such glycan polymer preparations may be rha100 or gal33man33ara33 polymer preparation as described in the examples, e.g. in Examples 1-9.

In one embodiment, the glycan polymer preparation has about 5 to 50% of branched monomers (e.g., 10 to 45%, 5 to 25%, or such as 10 to 20% of branched monomers). Such glycan polymer preparations may be a glu100, glu80man20, glu60man20, man80glu20, or man60glu40 polymer preparation as described in the examples, e.g. in Examples 1-9.

In one embodiment, the glycan polymer preparation is prepared on a large scale (e.g., greater than about 10 kg, about 20 kg, about 30 kg, about 40 kg, about 50 kg, about 60 kg, about 70 kg, about 80 kg, about 90 kg, about 100 kg, about 200 kg, or more glycan polymer preparation produced). In one embodiment, the glycan polymer preparation is prepared on a large scale and has a DP described in Table 6a or Table 8a. In one embodiment, the glycan polymer preparation is prepared on a large scale and has a DP described in Table 6a or Table 8a. In one embodiment, the glycan polymer preparation is prepared on a large scale and has an average molecular weight (e.g., number average molecular weight or weight average molecular weight) or polydispersity described in Table 7 or Table 9. In one embodiment, the glycan polymer preparation is prepared on a large scale and has a glycosidic linkage distribution described in Table 7. In one embodiment, the glycan polymer preparation is prepared on a large scale and has a quality acceptance criterion described in Table 10.

In one embodiment, the glycan polymer preparation is glycan polymer preparation described in Table 4a or Table 4b. In one embodiment, the glycan polymer preparation has a characteristic described in Table 4a or Table 4b, e.g., a total 1,2, total 1,3, total 1,4, or total 1,6 molecular incidence of a bond (%); total branching (%); total furanose content (%); total terminal sugar content (%); alpha/beta ratio (%); DP2+ (%); average number molecular weight; average weight molecular weight; or polydispersity. In one embodiment, the glycan polymer preparation is prepared on a large scale and has a characteristic described in Table 4a or Table 4b, e.g., a total 1,2, total 1,3, total 1,4, or total 1,6 molecular incidence of a bond (%); total branching (%); total furanose content (%); total terminal sugar content (%); alpha/beta ratio (%); DP2+(%); average number molecular weight; average weight molecular weight; or polydispersity.

Furanose: Pyranose

In some embodiments, preparations of glycans are provided, wherein at least one glycan subunit is a furanose sugar. In some embodiments, preparations of glycans are provided, wherein at least one glycan subunit is a pyranose sugar. In some embodiments, glycans comprise mixtures of furanose and pyranose sugars. In some embodiments, the furanose: pyranose sugar ratio in a preparation is about 0.1:1, 0.2:1, 0.3:1, 0.4:1, 0.5:1, 0.6:1, 0.7:1, 0.8:1, 0.9:1, 1:1, 1.2:1, 1.5:1, 1.7:1, 2:1, 2.2:1, 2.5:1, 2.7:1, 3:1, 4:1, 5:1, or about 6:1 or the furanose: pyranose sugar ratio in a preparation is about 7:1, 8:1, 9:1, or about 10:1.

In some embodiments, the preparation of glycans comprises substantially all furanose or pyranose sugar, optionally comprising 1%, 2%, 3%, 4% 5%, 6%, 7%, 8%, 9%, 10%, 11%, 12%, 13%, 14%, 15%, 16%, 17%, 18%, 19%, or 20% of the respective other sugar.

In some embodiments, the preparation of glycans comprises substantially all pyranose sugar and no more than about 0.1%, 02%, 0.5%, 1%, 2%, 3%, 4%, or no more than 5% of glycan units in the preparation in furanose form. In some embodiments, no more than 3%, 2% or no more than 1% of monomeric glycan units in the preparation are in furanose form.

Salts

In some embodiments, the preparation of glycans comprises a glycan subunit or plurality of glycan subunits present in a salt form (e.g., a pharmaceutically acceptable salt form), such as, e.g., a hydrochlorate, hydroiodate, hydrobromate, phosphate, sulfate, methanesulfate, acetate, formate, tartrate, malate, citrate, succinate, lactate, gluconate, pyruvate, fumarate, propionate, aspartate, glutamate, benzoate, ascorbate salt.

Derivatization

If desired, the monosaccharide or oligosaccharide glycan subunits of the glycans are further substituted or derivatized, e.g., hydroxyl groups can be etherified or esterified. For example, the glycans can contain modified saccharide units, such as 2'-deoxyribose wherein a hydroxyl group is removed, 2'-fluororibose wherein a hydroxyl group is replaced with a fluorine, or N-acetylglucosamine, a nitrogen-containing form of glucose (e.g., 2'-fluororibose, deoxyribose, and hexose). The degree of substitution (DS, average number of hydroxyl groups per glycosyl unit) can be 1, 2, or 3, or another suitable DS. In some embodiments, 1%, 2%, 3%, 4% 5%, 6%, 7%, 8%, 9%, 10%, 11%, 12%, 13%, 14%, 15%, 16%, 17%, 18%, 19%, 20%, 25%, 30%, 35%, 40%, 45%, 50%, 55%, 60%, 65%, 70%, 80%, 85%, 90%, 95%, 96%, 97%, 98%, 99%, or 100% of glycan subunits are substituted or derivatized. In some embodiments, the degree of substitution varies between subunits, e.g., a certain percentage is not derivatized, exhibits a DS of 1, exhibits a DS of 2, or exhibits a DS of 3. Any desired mixture can be generated, e.g. 0-99% of subunits are not derivatized, 0-99% of subunits exhibit a DS of 1, 0-99% of subunits exhibit a DS of 2, and 0-99% of subunits exhibit a DS of 3, with the total making up 100%. The degree of substitution can be controlled by adjusting the average number of moles of substituent added to a glycosyl moiety (molar substitution (MS)). The distribution of substituents along the length of the glycan chain can be controlled by adjusting the reaction conditions, reagent type, and extent of substitution. In some embodiments, the monomeric subunits are substituted with one or more of an acetate ester, sulfate half-ester, phosphate ester, or a pyruvyl cyclic acetal group.

Solubility

In some embodiments, the glycans in a preparation are highly soluble. In some embodiments, glycan polymer preparations can be concentrated to at least to 55 Brix, 65 Brix, 60 Brix, 65 Brix, 70 Brix, 75 Brix, 80 Brix, or at least 85 Brix without obvious solidification or crystallization at 23° C. (final solubility limit). In some embodiments, glycan polymer preparations are concentrated to at least about 0.5 g/ml, 1 g/ml, 1.5 g/ml, 2 g/ml, 2.5 g/ml, 3 g/ml, 3.5 g/ml or at least 4 g/ml without obvious solidification or crystallization at 23° C. (final solubility limit).

In some embodiments, the glycan polymer preparations (e.g. oligosaccharides) are branched, e.g. have an average DB of at least 0.01, 0.05, or 0.1 and has a final solubility limit in water of at least about 70 Brix, 75 Brix, 80 Brix, or at least about 85 Brix at 23° C. or is at least about 1 g/ml, 2 g/ml or at least about 3 g/ml.

In some embodiments, the preparation of glycans has a final solubility limit of at least 0.001 g/L, 0.005 g/L, 0.01 g/L, 0.05 g/L, 0.1 g/L, 0.2 g/L, 0.3 g/L, 0.4 g/L, 0.5 g/L, 0.6 g/L, 0.7 g/L, 0.8 g/L, 0.9 g/L, 1 g/L, 5 g/L, 10 g/L, 20 g/L, 30 g/L, 40 g/L, 50 g/L, 100 g/L, 200 g/L, 300 g/L, 400 g/L, 500 g/L, 600 g/L, 700 g/L, 800 g/L, 900 g/L, 1000 g/L in deionized water, or in a suitable buffer such as, e.g., phosphate-buffered saline, pH 7.4 or similar physiological pH) and at 20° C. In some embodiments, the preparation of glycans is greater than 50%, greater than 60%, greater than 70%, greater than 80%, greater than 90%, greater than 95%, greater than 96%, greater than 97%, greater than 98%, greater than 99%, or greater than 99.5% soluble with no precipitation observed at a concentration of greater than 0.001 g/L, 0.005 g/L, 0.01 g/L, 0.05 g/L, 0.1 g/L, 0.2 g/L, 0.3 g/L, 0.4 g/L, 0.5 g/L, 0.6 g/L, 0.7 g/L, 0.8 g/L, 0.9 g/L, 1 g/L, 5 g/L, 10 g/L, 20 g/L, 30 g/L, 40 g/L, 50 g/L, 100 g/L, 200 g/L, 300 g/L, 400 g/L, 500 g/L, 600 g/L, 700 g/L, 800 g/L, 900 g/L, 1000 g/L in deionized water, or in a suitable buffer such as, e.g., phosphate-buffered saline, pH 7.4 or similar physiological pH) and at 20° C.

Sweetness

In some embodiments, the preparation of glycans has a desired degree of sweetness. For example, sucrose (table sugar) is the prototype of a sweet substance. Sucrose in solution has a sweetness perception rating of 1, and other substances are rated relative to this (e.g., fructose, is rated at 1.7 times the sweetness of sucrose). In some embodiments, the sweetness of the preparation of glycans ranges from 0.1 to 500,000 relative to sucrose. In some embodiments, the relative sweetness is 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 80, 90, 100, 150, 200, 250, 300, 350, 400, 450, 500, 550, 600, 650, 700, 750, 800, 850, 900, 950, 1000, 2000, 3000, 4000, 5000, 6000, 7000, 8000, 9000, 10000, 25000, 50000, 75000, 100000, 150000, 200000, 250000, 300000, 350000, 40000, 450000, 500000, or more than 500,000 relative to sucrose (with sucrose scored as one). In some embodiments, the preparation of glycans is mildly sweet, or both sweet and bitter.

In some embodiments, the preparation of glycans, e.g. a preparation that is substantially DP2+ or DP3+(e.g. at least 80%, 90%, or at least 95%, or a fractionated preparation of DP2+ or DP3+), is substantially imperceptible as sweet and the relative sweetness is about 0, 0.0001, 0.001, 0.005, 0.01, 0.05, 0.1, 0.2, 0.3, 0.4, 0.5, 0.6, 0.7, or about 0.8 relative to sucrose (with sucrose scored as one).

Glycan polymer preparations can be characterized by any suitable methods including those described in WO2016/122889, WO2016/172657, WO 2016/007778, and WO2016/172658, incorporated herein by reference.

In embodiments, glycan compositions and glycan polymer preparations may comprise one or more (e.g., two, three, four, five, six or more) of the following properties (including bulk properties):

a) the glycan comprising at least one of glucose, galactose, arabinose, mannose, fructose, xylose, fucose, or rhamnose, b) a high degree of polymerization (DP), e.g. at least about 50%, 60%, 70%, 80%, 90%, 95%, 98%, 99% of polymers range in DP from about 30-100,000, about 30-50,000, about 30-10,000, about 30-5,000, about 30-1,000, about 30-500, about 30-200, about 30-100, or about 3-50, c) a low degree of polymerization, e.g. at least about 50%, 60%, 70%, 80%, 90%, 95%, 98%, 99% of polymers range in DP from about 2-29, about 2-25, about 2-20, about 2-15, about 2-10, about 2-8, about 2-6, about 3-8, or about 4-8, d) a high viscosity e.g., ranging from about 100-10,000 mPas, 100-5,000 mPas, 100-1,000 mPas, 100-500 mPas, in water at 20° C., e) a low viscosity, e.g., ranging from about 1-99 mPas, 1-50 mPas, 1-10 mPas, 1-5 mPas, 25-75 mPas, or 10-50 mPas, in water at 20° C., f) a high final solubility limit in water of at least about 60, 70, or at least about 75 Brix at 23° C., g) a low final solubility limit in water of no more than 5, 10, 20, 30, 40, 50 Brix at 23° C., or insolubility (e.g. no more than 0.1 Brix)

h) a caloric value of about 0.1 cal/g to 3 cal/g, 0.1 cal/g to 2 cal/g, 0.1 cal/g to 1.5 cal/g, 0.1 cal/g to 1 cal/g, 0.1 cal/g to 0.5 cal/g, i) a non-caloric value (e.g., about 0 cal/g to 0.09 cal/g, 0 cal/g to 0.05 cal/g or about 0 cal/g to 0.01 cal/g j) a low degree of digestibility, wherein no more than about 30%, 20%, 10%, 5%, 1%, 0.5% of the glycan is digestible by a human glycosidase (e.g., alpha-amylase)

k) a high degree of digestibility, wherein at least 50%, 60%, 70%, 80%, 90%, 95% of the glycan is digestible by a human glycosidase (e.g., alpha-amylase)

l) a low degree of fermentability, wherein no more than about 40%, 30%, 20%, 10%, 5%, 1%, 0.5% of the glycan is fermentable by a human (e.g., colonic) microbial community or a single bacterial strain, m) a high degree of fermentability, wherein at least 50%, 60%, 70%, 80%, 90%, 95% of the glycan is fermentable by a human (e.g. colonic) microbial community or a single bacterial strain, n) a slow rate of fermentation, wherein no more than about 0.5%, 1%, 2%, 5%, 10%, or 15% of the glycan is fermented by a human (e.g., colonic) microbial community or a single bacterial strain in 12-24 hours, o) a fast rate of fermentation, wherein at least about 15%, 20%, 30%, 40%, or 50% of the glycan is fermented by a human (e.g. colonic) microbial community or a single bacterial strain in 12-24 hours, p) a high degree of gastrointestinal tolerance (e.g., is tolerated by a subject in high daily doses, e.g. at least about 5 g/day, 10 g/day, 15 g/day, 20 g/day, 30 g/day, 40 g/day, 50 g/day, 60 g/day, or 70 g/day without substantial side effects, e.g. such as bloating, excess gas, GI discomfort, diarrhea or constipation);

q) any combination of:
two of: a), b), c), d), e), f), g), h), i), j), k), l), m), n), o), p);
three of: a), b), c), d), e), f), g), h), i), j), k), l), m), n), o), p);
four of: a), b), c), d), e), f), g), h), i), j), k), l), m), n), o), p);
five of: a), b), c), d), e), f), g), h), i), j), k), l), m), n), o), p);
six of: a), b), c), d), e), f), g), h), i), j), k), l), m), n), o), p);
seven of: a), b), c), d), e), f), g), h), i), j), k), l), m), n), o), p);
eight of: a), b), c), d), e), f), g), h), i), j), k), l), m), n), o), p);
nine of: a), b), c), d), e), f), g), h), i), j), k), l), m), n), o), p);
ten of: a), b), c), d), e), f), g), h), i), j), k), l), m), n), o), p); or
all of: a), b), c), d), e), f), g), h), i), j), k), l), m), n), o), p).

In embodiments, glycan compositions and glycan polymer preparations may comprise one or more (e.g., two, three, four, five, six or more) of the following properties (including bulk properties):

i) the glycan polymer preparation comprises glycans that comprise glucose, galactose, arabinose, mannose, fructose, xylose, fucose, or rhamnose glycan units;

ii) the average degree of branching (DB) of the glycans in the glycan polymer preparation is 0, between 0.01 and 0.6, between 0.05 and 0.5, between 0.1 and 0.4, or between 0.15 and 0.4;

iii) at least 50% (at least 60%, 65%, 70%, 75%, 80%, or 85%, or less than 50%) of the glycans in the glycan polymer preparation have a degree of polymerization (DP) of at least 3 and less than 30 glycan units, at least 2 and less than 10 glycan units, at least 5 and less than 25 glycan units, or at least 10 and less than 35 glycan units (optionally, wherein the glycan unit is a monomer, e.g., a monosugar);

iv) the average DP (mean DP) of the glycan polymer preparation is between about 2 and 5, between about 5 and 8, between about 8 and 13, between about 13 and 25, between about 5 and 15, between about 5 and 20, or between about 5-15;

v) the ratio of alpha- to beta-glycosidic bonds present in the glycans of the glycan polymer preparation is 0, or between about 0.8:1 to about 5:1, between about 1:1 to about 5:1, between about 1:1 to about 3:1, between about 3:2 to about 2:1, or between about 3:2 to about 3:1, vi) the glycan polymer preparation comprises between 15 mol % and 75 mol % (between 20 mol % and 60 mol %, between 25 mol % and 50 mol %, or between 30 mol % and 45 mol %) 1,6 glycosidic bonds;

vii) the glycan polymer preparation comprises between 1 mol % and 40 mol % (between 1 mol % and 30 mol %, between 5 mol % and 25 mol %, between 10 mol % and 20 mol %) of at least one, two, or three of 1,2; 1,3; and 1,4 glycosidic bonds;

viii) the glycan polymer preparation has a final solubility limit in water of at least about 50 (at least about 60, 70, at least about 75, or less than 50) Brix at 23° C.; or ix) the glycan polymer preparation has a dietary fiber content (e.g., as measured by AOAC 2009.01) of at least 50% (at least 60%, 70%, 80%, or at least 90%, or less than 50%), x) any combination of two, three, four, five, six, seven, eight, or nine of i), ii), iii), iv), v), vi), vii), viii), and ix).

Glycan compositions described herein can comprise one or more sugars and/or sugar alcohols. Compositions can comprise a simple sugar (such as a monosaccharide, a disaccharide, a trisaccharide, a tetrasacchaaride or a pentasaccharide), a sugar alcohol, or any combination thereof.

In some embodiments, composition comprises a metabolizable sugar or metabolizable sugar alcohol, wherein the sugar or sugar alcohol is metabolized in the gastrointestinal tract of the host. In some embodiments, the sugars and sugar alcohols disclosed in WO 2016/172658, which is hereby incorporated by reference, are suitable for use in methods and compositions described herein. In some embodiments, a composition described herein, e.g., glycan composition described herein, can comprise polyphenols, fatty acids (e.g., short chain fatty acids), amino acids, peptides, and micronutrients, e.g., as described herein and in WO 2016/172658 hereby incorporated by reference and in Table 5.

TABLE 5

Exemplary constituents of glycan compositions: Sugars, Sugar Alcohols, Amino Acids, Vitamins, Minerals, Fatty Acids, and Polyphenols

| Compound | Examples |
| --- | --- |
| Sugar | glucose, galactose, N-acetylglucosamine, N-acetylgalactosamine, fructose, fucose, mannose, N-acetylmannosamine, glucuronic acid, N-acetylglucuronic acid, galactosuronic acid, N-acetylgalactosuronic acid, xylose, arabinose, rhamnose, ribose, sucrose, sorbose, lactose, maltose, lactulose, tagatose, kojibiose, nigerose, isomaltose, trehalose, sophorose, laminaribiose, gentiobiose, turanose, maltulose, palatinose, gentiobiulose, mannobiose, melibiulose, rutinulose, xylobiose |

TABLE 5-continued

Exemplary constituents of glycan compositions: Sugars, Sugar Alcohols, Amino Acids, Vitamins, Minerals, Fatty Acids, and Polyphenols

| Compound | Examples |
|---|---|
| Sugar Alcohol | sorbitol, mannitol, lactitol, erythritol, glycerol, arabitol, maltitol, xylitol, ribitol, threitol, galactitol, fucitol, iditol, inositol |
| Amino Acid | alanine, arginine, asparagine, aspartic acid, cysteine, glutamic acid, glutamine, glycine, histidine, isoleucine, leucine, lysine, methionine, phenylalanine, proline, serine, threonine, tryptophan, tyrosine, valine |
| Vitamin | pantothenate, thiamine, riboflavin, niacin, pyridoxol, biotin, folate, 4-aminobenzoate, cobinamide, phenyolyl cobamide, 5-methylbenzimidazolyl cobamide, cobalamin, pyridoxine, pyridoxamine, ergadenylic acid, cyanocobalamin, choline, retinol, a carotenoid, zeaxanthin |
| Element/Mineral | chloride, sodium, calcium, magnesium, nitrogen, potassium, manganese, iron, zinc, nickel, copper, cobalt |
| Fatty Acid | acetic acid, propionic acid, butryic acid, isobutyric acid, valeric acid, isovaleric acid, hexanoic acid, octanoic acid, formic acid, oxalic acid, glyoxylic acid, glycolic acid, acrylic acid, malonic acid, pyruvic acid, lactic acid, succinic acid, acetoacetic acid, fumaric acid, maleic acid, oxaloacetic acid, malic acid, tartaric acid, crotonic acid, glutaric acid, alpha-ketoglutaric acid, caproic acid, adipic acid, citric acid, aconitic acid, isocitric acid, sorbic acid, enanthic acid, pimelic acid, benzoic acid, salicylic acid, caprylic acid, phthalic acid, pelargonic acid, trimesic acid, cinnamic acid, capric acid, sebacic acid, stearic acid, oleic acid, linoleic acid, α-linolenic acid, γ-linolenic acid, stearidonic acid |
| Polyphenol | Anthocyanins, Chalcones, Dihydro-chalcones, Dihydro-flavonols, Flavanols, Flavanones, Flavones, Flavonols, Isoflavonoids, Lignans, Non-phenolic metabolites, Alkylmethoxy-phenols, Alkylphenols,, Betacyanins, Capsaicinoids, Curcuminoids, Dihydro-capsaicins, Furano-coumarins, Hydroxy-benzaldehydes, Hydroxy-benzoketones, Hydroxycinnam-aldehydes, Hydroxy-coumarins, Hydroxyphenyl-alcohols, Hydroxy-phenylpropenes, Methoxyphenols, Naphtoquinones, Phenolic terpenes, Tyrosols, Hydroxybenzoic acids, Hydroxy-cinnamic acids, Hydroxy-phenylacetic acids, Hydroxy-phenylpropanoic acids, Hydroxy-phenylpentanoic acids, Stilbenes, catechin, ellagitannin, isoflavone, flavonol, flavanone, anthocyanin, lignin, alkylmethoxyphenol, alkylphenol, curcuminoid, furanocoumarin, hydroxybenzaldehyde, hydroxybenzoketone, hydroxycinnamaldehyde, hydroxycoumarin, hydroxyphenylpropene, methoxyphenol, naphtoquinone, phenolic terpenes, tyrosols |

Probiotics

In embodiments, a composition described herein, e.g., glycan polymer preparation described herein, can comprise commensal or probiotic bacterial taxa, e.g., bacteria that are generally recognized as safe (GRAS) or known commensal or probiotic microbes. In embodiments, a composition described herein, e.g., glycan polymer preparation described herein, can comprise bacterial taxa described in Tables 6-8. In some embodiments, probiotic or commensal bacterial taxa (or preparations thereof) may be administered to a subject receiving the glycan polymer preparations.

In some embodiments, the composition further comprises at least about 1% (w/w) of a probiotic or commensal bacterium or a combination thereof (e.g., at least about 2%, about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 96%, about 97%, about 98%, about 99%, or more).

Probiotic microorganisms may also be included in the glycan compositions, or used in combination with a glycan composition described herein. A probiotic microorganism is also referred to a probiotic. Probiotics can include the metabolites generated by the probiotic microorganisms during fermentation. These metabolites may be released to the medium of fermentation, e.g., into a host organism (e.g., subject), or they may be stored within the microorganism. Probiotic microorganism includes bacteria, bacterial homogenates, bacterial proteins, bacterial extracts, bacterial ferment supernatants and combinations thereof, which perform beneficial functions to the host animal, e.g., when given at a therapeutic dose. Useful probiotic microorganisms include at least one lactic acid and/or acetic acid and/or propionic acid producing bacteria, e.g., microbes that produce lactic acid and/or acetic acid and/or propionic acid by decomposing carbohydrates such as glucose and lactose. Preferably, the probiotic microorganism is a lactic acid bacterium. In embodiments, lactic acid bacteria include *Lactobacillus, Leuconostoc, Pediococcus, Streptococcus,* and *Bifidobacterium*. Suitable probiotic microorganisms can also include other microorganisms which beneficially affect a host by improving the hosts intestinal microbial balance, such as, but not limited to yeasts such as *Saccharomyces, Debaromyces, Candida, Pichia* and *Torulopsis*, molds such as *Aspergillus, Rhizopus, Mucor,* and *Penicillium* and *Torulopsis*, and other bacteria such as but not limited to the genera *Bacteroides, Clostridium, Fusobacterium, Melissococcus, Propionibacterium, Enterococcus, Lactococcus, Staphylococcus, Peptostreptococcus, Bacillus, Pediococcus, Micrococcus, Leuconostoc, Weissella, Aerococcus,* and *Oenococcus,* and combinations thereof. Non-limiting examples of lactic acid bacteria useful in the disclosure herein include strains of *Streptococcus lactis, Streptococcus cremoris, Streptococcus diacetylactis, Streptococcus thermophilus, Lactobacillus bulgaricus, Lactobacillus acidophilus, Lactobacillus helveticus, Lactobacillus bifidus, Lactobacillus casei, Lactobacillus lactis, Lactobacillus plantarum, Lactobacillus rhamnosus, Lactobacillus delbruekii, Lactobacillus thermophilus, Lactobacillus fermentii, Lactobacillus salivarius, Lactobacillus paracasei, Lactobacillus brevis, Bifidobacterium longum, Bifidobacterium infantis, Bifidobacterium bifidum, Bifidobcterium animalis, Bifidobcterium lactis, Bifidobcterium breve, Bifidobcterium adolescentis,* and *Pediococcus cerevisiae* and combinations thereof, in particular *Lactobacillus, Bifidobacterium,* and combinations thereof Probiotic microorganisms which are particularly useful in the present disclosure include those which (for human administration) are of human origin (or of the origin of the mammal to which the probiotic microorganism is being administered), are non-pathogenic to the host, resist technological processes (i.e. can remain viable and active during processing and in delivery vehicles), are resistant to gastric acidity and bile toxicity, adhere to gut epithelial tissue, have the ability to colonize the gastrointestinal tract, produce antimicrobial substances, modulate immune response in the host, and influence metabolic activity (e.g. cholesterol assimilation, lactase activity, vitamin production).

The probiotic microorganism can be included in the glycan polymer preparations as a single strain or a combination of multiple strains, wherein the total number of bacteria in a dose of probiotic microorganism is from about $1\times10^3$ to about $1\times10^{14}$, or from about $1\times10$ to about $1\times10^{12}$, or from about $1\times10^7$ to about $1\times10^{11}$ CFU per dose.

The probiotic microorganisms can be incorporated into the glycan polymer preparations while the probiotic microorganism is alive but in a state of "suspended animation" or somnolence. Once freeze-dried, the viable cultures(s) of probiotic microorganism are handled so as to minimize exposure to moisture that would reanimate the cultures because, once reanimated, the cultures can experience high rates of morbidity unless soon cultured in a high moisture environment or medium. Additionally, the cultures are handled to reduce possible exposure to high temperatures (particularly in the presence of moisture) to reduce morbidity.

The probiotic microorganisms can be used in a powdered, dry form. The probiotic microorganisms can also be administered in the glycan polymer preparation or in a separate glycan polymer preparation, administered at the same time or different time as the glycan polymer preparations.

Examples of probiotics include, but are not limited to, those that acidify the colon such as those from the genera *Lactobacillus* or *Bifidobacterium*, which are thought to maintain a healthy balance of intestinal microbiota by producing organic acids (lactic & acetic acids), hydrogen peroxide, and bacteriocins which are documents to inhibit enteric pathogens.

Other *Lactobacillus* bacteria which can be employed include, but are not limited to, *L. crispatus, L. casei, L. rhamnosus, L. reuteri, L. fermentum, L. plantarum, L. sporogenes,* and *L. bulgaricus*. Other probiotic bacteria suitable for the glycan compositions include *Bifidobacterium lactis, B. animalis, B. bifidum, B. longum, B. adolescentis,* and *B. infantis.*

In embodiments, a commensal bacterial taxa that can be used in and/or in combination with a composition described herein comprises *Akkermansia, Anaerococcus, Bacteroides, Bifidobacterium* (including *Bifidobacterium lactis, B. animalis, B. bifidum, B. longum, B. adolescentis, B. breve,* and *B. infantis*), *Blautia, Clostridium, Corynebacterium, Dialister, Eubacterium, Faecalibacterium, Finegoldia, Fusobacterium, Lactobacillus* (including, *L. acidophilus, L. helveticus, L. bifidus, L. lactis, L. fermentii, L. salivarius, L. paracasei, L. brevis, L. delbruekii, L. thermophiles, L. crispatus, L. casei, L. rhamnosus, L. reuteri, L. fermentum, L. plantarum, L. sporogenes,* and *L. bulgaricus*), *Peptococcus, Peptostreptococcus, Peptoniphilus, Prevotella, Roseburia, Ruminococcus, Staphylococcus,* and/or *Streptococcus* (including *S. lactis, S. cremoris, S. diacetylactis, S. thermophiles*).

In embodiments, a commensal bacterial taxa, e.g., GRAS strain, that can be used in and/or in combination with a composition described herein comprises *Bacillus coagulans* GBI-30, 6086; *Bifidobacterium animalis* subsp. *Lactis* BB-12; *Bifidobacterium breve* Yakult; *Bifidobacterium infantis* 35624; *Bifidobacterium animalis* subsp. *Lactis* UNO 19 (DR10); *Bifidobacterium longum* BB536; *Escherichia coli* M-17; *Escherichia coli* Nissle 1917; *Lactobacillus acidophilus* DDS-1; *Lactobacillus acidophilus* LA-5; *Lactobacillus acidophilus* NCFM; *Lactobacillus casei* DN 114-001 (*Lactobacillus casei* Immunitas(s)/Defensis); *Lactobacillus casei* CRL431; *Lactobacillus casei* F19; *Lactobacillus paracasei* Stl 1 (or NCC2461); *Lactobacillus johnsonii* Lai (*Lactobacillus* LCI, *Lactobacillus johnsonii* NCC533); *Lactococcus lactis* L1A; *Lactobacillus plantarum* 299V; *Lactobacillus reuteri* ATTC 55730 (*Lactobacillus reuteri* SD2112); *Lactobacillus rhamnosus* ATCC 53013; *Lactobacillus rhamnosus* LB21; *Saccharomyces cerevisiae* (*boulardii*) lyo; mixture of *Lactobacillus rhamnosus* GR-1 and *Lactobacillus reuteri* RC-14; mixture of *Lactobacillus acidophilus* NCFM and *Bifidobacterium lactis* BB-12 or BL-04; mixture of *Lactobacillus acidophilus* CL1285 and *Lactobacillus casei*; and a mixture of *Lactobacillus helveticus* R0052, *Lactobacillus rhamnosus* R0011, and/or *Lactobacillus rhamnosus* GG (LGG).

Prebiotics

In some embodiments, the glycan polymer preparations comprise a prebiotic substance. In some embodiments, prebiotics may be administered to a subject receiving the glycan polymer preparations. Prebiotics are substantially non-digestible substances by the host that when consumed may provide a beneficial physiological effect on the host by selectively stimulating the favorable growth or activity of a limited number of indigenous bacteria in the gut (Gibson G R, Roberfroid M B. *J Nutr.* (1995) 125:1401-12.). A prebiotic such as a dietary fiber or prebiotic oligosaccharide (e.g. crystalline cellulose, wheat bran, oat bran, cone fiber, soy fiber, beet fiber and the like) may further encourage the growth of probiotic and/or commensal bacteria in the gut by providing a fermentable dose of carbohydrates to the bacteria and increase the levels of those microbial populations (e.g. lactobacilli and bifidobacteria) in the gastrointestinal tract. Prebiotics may include, but are not limited to, various galactans and carbohydrate based gums, such as psyllium, guar, carrageen, gellan, lactulose, and konjac. In some embodiments, the prebiotic is one or more of galacto-oligosaccharides (GOS), lactulose, raffinose, stachyose, lactosucrose, fructo-oligosaccharides (FOS, e.g. oligofructose or oligofructan), inulin, isomaltooligosaccharide, xylo-oligosaccharides (XOS), paratinose oligosaccharide, isomaltose oligosaccharides (IMOS), transgalactosylated oligosaccharides (e.g. transgalacto-oligosaccharides), transgalactosylate disaccharides, soybean oligosaccharides (e.g. soyoligosaccharides), chitosan oligosaccharide (chioses), gentiooligosaccharides, soy- and pectin-oligosaccharides, glucooligosaccharides, pecticoligosaccharides, palatinose polycondensates, difructose anhydride III, sorbitol, maltitol, lactitol, polyols, polydextrose, linear and branched dextrans, pullulan, hemicelluloses, reduced paratinose, cellulose, beta-glucose, beta-galactose, beta-fructose, verbascose, galactinol, xylan, inulin, chitosan, beta-glucan, guar gum, gum arabic, pectin, high sodium alginate, and lambda carrageenan, or mixtures thereof. Prebiotics can be found in certain foods, e.g. chicory root, Jerusalem artichoke, Dandelion greens, garlic, leek, onion, asparagus, wheat bran, wheat flour, banana, milk, yogurt, sorghum, burdock, broccoli, Brussels sprouts, cabbage, cauliflower, collard greens, kale, radish and rutabaga, and miso. In some embodiments, the glycan polymer preparations described herein are administered to a subject in conjunction with a diet that includes foods rich in prebiotics. Suitable sources of soluble and insoluble fibers are commercially available.

In some embodiments, a glycan polymer preparation comprises at least about 1% (w/w) of a prebiotic substance (e.g., at least about 2%, about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 96%, about 97%, about 98%, about 99%, or more).

In some embodiments, the glycan polymer preparation comprises an antibiotic, an antifungal agent, an antiviral agent, or an anti-inflammatory agent (e.g. a cytokine, hormone, etc.).

In some embodiments, the glycan compositions further comprise a second therapeutic agent or preparation thereof, such as a drug.

Formulations

Pharmaceutical compositions, medical foods, supplements (e.g., dietary supplements) and unit dosage forms suitable for use in the methods and compositions described herein can be found in WO 2016/122889, WO 2016/172657, and WO 2016/172658, which are hereby incorporated by reference. Provided herein are also food supplements, food ingredients, food additives, and nutraceuticals. Provided herein are also animal (e.g., non-human) therapeutic compositions, animal (e.g., non-human) feed ingredients, and feed additives.

In some embodiments, a glycan composition does not contain a prebiotic substance. In some embodiments, a glycan composition does not contain a probiotic bacterium.

In some embodiments, a glycan composition comprises one or more of glycan polymer preparations described herein.

The glycan polymer preparations described herein may be formulated into any suitable dosage form, e.g. for nasal, oral, rectal or gastric administration. In some embodiments, the glycan polymer preparations described herein may be formulated for enteral administration. In some embodiments, the glycan polymer preparations described herein may be formulated for tube feeding (e.g. naso-gastric, oral-gastric or gastric feeding). The dosage forms described herein can be manufactured using processes that are known to those of skill in the art. The dosage form may be a packet, such as any individual container that contains a glycan polymer preparation in the form of, e.g., a liquid (e.g., a beverage), a gel, a cream, an ointment, a powder, a tablet, a pill, a capsule, a sachet, a gummy, a suppository, a single-use applicator or medical device (e.g. a syringe). For example, provided is also an article of manufacture, such as a container comprising a unit dosage form of the glycan polymer preparation, and a label containing instructions for use of such glycan.

Forms of the compositions that can be used orally include tablets, push-fit capsules made of gelatin, as well as soft, sealed capsules made of gelatin and a plasticizer, such as glycerol or sorbitol. Tablets can be made by compression or molding, optionally with one or more accessory ingredients. Compressed tablets can be prepared by compressing in a suitable machine the active ingredient in a free-flowing form such as a powder or granules, optionally mixed with binders (e.g., povidone, gelatin, hydroxypropylmethyl cellulose), inert diluents, preservative, antioxidant, disintegrant (e.g., sodium starch glycolate, cross-linked povidone, cross-linked sodium carboxymethyl cellulose) or lubricating, surface active or dispersing agents. Molded tablets can be made by molding in a suitable machine a mixture of the powdered compound moistened with an inert liquid diluent. The tablets can optionally be coated or scored and can be formulated so as to provide slow or controlled release of the active ingredient therein. Tablets can optionally be provided with an enteric coating, to provide release in parts of the gut (e.g., colon, lower intestine) other than the stomach. All formulations for oral administration can be in dosages suitable for such administration. The push-fit capsules can contain the active ingredients in admixture with filler such as lactose, binders such as starches, and/or lubricants such as talc or magnesium stearate and, optionally, stabilizers. In soft capsules, the active compounds and/or other agents (e.g., prebiotics or probiotics) can be dissolved or suspended in suitable liquids, such as fatty oils, liquid paraffin, or liquid polyethylene glycols. In addition, stabilizers can be added. Dragee cores are provided with suitable coatings. For this purpose, concentrated sugar solutions can be used, which can optionally contain gum arabic, talc, polyvinyl pyrrolidone, carbopol gel, polyethylene glycol, or titanium dioxide, lacquer solutions, and suitable organic solvents or solvent mixtures. Dyestuffs or pigments can be added to the tablets or dragee coatings for identification or to characterize different combinations of active compound doses.

Formulations for oral use can also be presented as hard gelatin capsules wherein the active ingredient is mixed with an inert solid diluent, for example, calcium carbonate, calcium phosphate or kaolin, or as soft gelatin capsules wherein the active ingredient is mixed with water soluble carrier such as polyethylene glycol or an oil medium, for example peanut oil, liquid paraffin, or olive oil.

In one embodiment, a provided glycan polymer preparation includes a softgel formulation. A softgel can contain a gelatin based shell that surrounds a liquid fill. The shell can be made of gelatin, plasticizer (e.g., glycerin and/or sorbitol), modifier, water, color, antioxidant, or flavor. The shell can be made with starch or carrageenan. The outer layer can be enteric coated. In one embodiment, a softgel formulation can include a water or oil soluble fill solution, or suspension of a composition covered by a layer of gelatin.

Solid formulations for oral use may comprise an enteric coating, which may control the location at which a glycan polymer preparation is absorbed in the digestive system. For example, an enteric coating can be designed such that a glycan polymer preparation does not dissolve in the stomach but rather travels to the small intestine, where it dissolves. An enteric coating can be stable at low pH (such as in the stomach) and can dissolve at higher pH (for example, in the small intestine). Material that can be used in enteric coatings includes, for example, alginic acid, cellulose acetate phthalate, plastics, waxes, shellac, and fatty acids (e.g., stearic acid, palmitic acid).

Formulations for oral use may also be presented in a liquid dosage form (e.g. beverage). Liquid preparations can be in the form of, for example, aqueous or oily suspensions, solutions, emulsions, syrups or elixirs, or can be presented as a dry product (e.g. sachet) for reconstitution with water or other suitable aqueous vehicle before use. Such liquid preparations can contain conventional additives, such as suspending agents, for example sorbitol, methyl cellulose, glucose syrup, gelatin, hydroxyethyl cellulose, carboxymethyl cellulose, aluminum stearate gel or hydrogenated edible fats, emulsifying agents, for example lecithin, sorbitan monooleate, acacia; non-aqueous vehicles (which can include edible oils), for example almond oil, oily esters such as glycerine, propylene glycol, or ethyl alcohol; preservatives, for example methyl or propyl p-hydroxybenzoate or sorbic acid, and, if desired, conventional flavoring or coloring agents. In some embodiments, liquid formulations can comprise, for example, an agent in water-in-solution and/or suspension form; and a vehicle comprising polyethoxylated castor oil, alcohol, and/or a polyoxyethylated sorbitan mono-oleate with or without flavoring. Each dosage form may comprise an effective amount of a glycan and can optionally comprise pharmaceutically inert agents, such as conventional excipients, vehicles, fillers, binders, disintegrants, pH adjusting substances, buffer, solvents, solubilizing agents, sweeteners, coloring agents, and any other inactive agents that can be included in pharmaceutical dosage forms for administration. Examples of such vehicles and additives can be found in Remington's Pharmaceutical Sciences, 17th edition (1985).

The pharmaceutical compositions provided herein can be in unit-dosage forms or multiple-dosage forms. A unit-dosage form, as used herein, refers to physically discrete unit suitable for administration to human in need thereof. In an embodiment, the unit-dosage form is provided in a package. Each unit-dose can contain a predetermined quantity of an active ingredient(s) sufficient to produce the desired therapeutic effect, in association with other pharmaceutical carriers or excipients. Examples of unit-dosage forms include, but are not limited to, ampoules, syringes, and individually packaged tablets and capsules. Unit-dosage forms can be administered in fractions or multiples thereof. A multiple-dosage form is a plurality of identical unit-dosage forms packaged in a single container, which can be administered in segregated unit-dosage form. Examples of multiple-dosage forms include, but are not limited to, vials, bottles of tablets or capsules, or bottles of pints or gallons. In another embodiment, the multiple dosage forms comprise different pharmaceutically active agents. For example, a multiple dosage form can be provided which comprises a first dosage element comprising a composition comprising a glycan and a second dosage element comprising a prebiotic, a therapeutic agent and/or a probiotic, which can be in a modified release form. In this example a pair of dosage elements can make a single unit dosage. In one embodiment, a kit is provided comprising multiple unit dosages, wherein each unit comprises a first dosage element comprising a composition comprising a glycan polymer preparation and a second dosage element comprising probiotic, a pharmaceutical agent, a prebiotic or a combination thereof, which can be in a modified release form. In another embodiment, the kit further comprises a set of instructions.

In some embodiments, the unit-dosage form comprises between about 1 mg to about 100 g of the glycan polymer preparation (e.g., a glycan disclosed herein). For example, the unit-dosage form may comprise about 50 mg to about 50 g, about 500 mg to about 50 g, about 5 g to about 50 g, about 100 mg to about 100 g, about 1 g to about 100 g, about 10 g to about 100 g, about 1 g to about 10 g, about 1 g to about 20 g, about 1 g to about 30 g, about 1 g to about 40 g, about 1 g to about 50 g, about 1 g to about 60 g, about 1 g to about 70 g, about 1 g to about 80 g, about 1 g to about 90 g, about 1 g to about 100 g, about 1 g to about 150 g, about 1 g to about 200 g of the glycan.

In other embodiments, the unit-dosage form comprises between about 0.001 mL to about 1000 mL of the glycan (e.g., a glycan disclosed herein). For example, the unit-dosage form may comprise about 0.001 mL to about 950 mL, about 0.005 mL to about 900 mL, about 0.01 mL to about 850 mL, about 0.05 mL to about 800 mL, about 0.075 mL to about 750 mL, about 0.1 mL to about 700 mL, about 0.25 mL to about 650 mL, about 0.5 mL to about 600 mL, about 0.75 mL to about 550 mL, about 1 mL to about 500 mL, about 2.5 mL to about 450 mL, about 5 mL to about 400 mL, about 7.5 mL to about 350 mL, about 10 mL to about 300 mL, about 12.5 mL to about 250 mL, about 15 mL to about 200 mL, about 17.5 mL to about 150 mL, about 20 mL to about 100 mL, or about 25 mL to about 75 mL of the glycan.

In certain embodiments, the unit-dosage form comprises about 0.001 mL to about 10 mL, about 0.005 mL to about 7.5 mL, about 0.01 mL to about 5 mL, about 0.05 mL to about 2.5 mL, about 0.1 mL to about 1 mL, about 0.25 mL to about 1 mL, or about 0.5 mL to about 1 mL of the glycan. In other embodiments, the unit-dosage form comprises about 0.01 mL to about 10 mL, about 0.025 mL to about 7.5 mL, about 0.05 mL to about 5 mL, or about 0.1 mL to about 2.5 mL of the glycan. In other embodiments, the unit-dosage form comprises about 0.1 mL to about 10 mL, about 0.25 mL to about 7.5 mL, about 0.5 mL to about 5 mL, about 0.5 mL to about 2.5 mL, or about 0.5 mL to about 1 mL of the glycan.

In some embodiments, the unit-dosage form, e.g., a tablet, capsule (e.g., a hard capsule, push-fit capsule, or soft capsule), or softgel, has a body length of between about 0.1 inches to about 1.5 inches (e.g., about 0.5 inches and about 1 inch), or about 5 mm to about 50 mm (e.g., about 10 mm to about 25 mm). In some embodiments, the unit-dosage form. e.g., a tablet, capsule (e.g., a hard capsule, push-fit capsule, or soft capsule), or softgel, has an external diameter of about 0.05 inches to about 1 inch (e.g., about 0.1 inches to about 0.5 inches), or about 1 mm to about 25 mm (e.g., about 5 mm to about 10 mm).

Each unit-dosage form of the glycan may have a caloric value of between about 0.01 kcal and about 1000 kcal. For example, the unit-dosage form may have a caloric value of about 0.01 kcal to about 100 kcal, about 0.05 kcal to about 50 kcal, about 0.1 kcal to about 10 kcal, about 0.25 kcal to about 2.5 kcal, about 0.5 kcal to about 5 kcal, about 0.75 kcal to about 7.5 kcal, about 1 kcal to 10 kcal, about 5 kcal to about 50 kcal, or about 10 kcal to about 100 kcal. In certain embodiments, the unit-dosage form of the glycan has a caloric value of between 10 kcal to about 500 kcal. In certain embodiments, the unit-dosage form of the glycan has a caloric value of between 1 kcal to about 100 kcal. In certain embodiments, the unit-dosage form of the glycan has a caloric value of between 0.1 kcal to about 10 kcal.

In still other embodiments, the unit-dosage form may have a caloric value of about 0.001 kcal to about 10 kcal, about 0.005 kcal to about 10 kcal, about 0.01 kcal to about 10 kcal, about 0.025 kcal to about 25 kcal, about 0.05 kcal to about 50 kcal, about 0.075 kcal to about 75 kcal, about 0.1 kcal to 100 kcal, about 0.25 kcal to about 10 kcal, about 0.5 kcal to about 5 kcal, about 0.25 kcal to about 25 kcal, or about 0.1 kcal to about 1 kcal.

The unit-dosage form of the glycan may be formulated to dissolve in an aqueous solution (e.g., water, milk, juice, and the like) and is orally administered as a beverage, syrup, solution, or suspension. For example, the unit-form dosage of the glycan may comprise a cube, packet, lozenge, pill, tablet, capsule, candy, powder, elixir, or concentrated syrup formulated for dissolving into an aqueous solution prior to oral administration. In other embodiments, the unit-dosage form of the glycan may comprise a cube, packet, lozenge, pill, tablet, capsule, candy, powder, elixir, or concentrated syrup formulated to dissolve in vivo, e.g., in the mouth, stomach, intestine, or colon of the subject upon oral administration.

In some embodiments, the glycan polymer preparation is administered enterically. This preferentially includes oral administration, or by an oral or nasal tube (including nasogastric, nasojejunal, oral gastric, or oral jejunal). In other embodiments, administration includes rectal administration (including enema, suppository, or colonoscopy).

The dosage forms described herein can be manufactured using processes that are known to those of skill in the art. For example, for the manufacture of tablets, an effective amount of a prebiotic can be dispersed uniformly in one or more excipients or additives, for example, using high shear granulation, low shear granulation, fluid bed granulation, or by blending for direct compression. Excipients and additives include diluents, binders, disintegrants, dispersants, lubricants, glidants, stabilizers, surfactants, antiadherents, sorbents, sweeteners, and colorants, or a combination thereof. Diluents, also termed fillers, can be used to increase the bulk of a tablet so that a practical size is provided for compression. Non-limiting examples of diluents include lactose, cellulose, microcrystalline cellulose, mannitol, dry starch, hydrolyzed starches, powdered sugar, talc, sodium chloride, silicon dioxide, titanium oxide, dicalcium phosphate dihydrate, calcium sulfate, calcium carbonate, alumina and kaolin. Binders can impart cohesive qualities to a tablet formulation and can be used to help a tablet remain intact after compression. Non-limiting examples of suitable binders include starch (including corn starch and pregelatinized starch), gelatin, sugars (e.g., glucose, dextrose, sucrose, lactose and sorbitol), celluloses, polyethylene glycol, alginic acid, dextrin, casein, methyl cellulose, waxes, natural and synthetic gums, e.g., acacia, tragacanth, sodium alginate, gum arabic, xantan gum, and synthetic polymers such as polymethacrylates, polyvinyl alcohols, hydroxypropylcellulose, and polyvinylpyrrolidone. Lubricants can also facilitate tablet manufacture; non-limiting examples thereof include magnesium stearate, calcium stearate, stearic acid, glyceryl behenate, and polyethylene glycol. Disintegrants can facilitate tablet disintegration after administration, and non-limiting examples thereof include starches, alginic acid, crosslinked polymers such as, e.g., crosslinked polyvinylpyrrolidone, croscarmellose sodium, potassium or sodium starch glycolate, clays, celluloses (e.g., carboxymethylcelluloses (e.g., carboxymethylcellulose (CMC), CMC-Na, CMC-Ca)), starches, gums and the like. Non-limiting examples of suitable glidants include silicon dioxide, talc, and the like. Stabilizers can inhibit or retard drug decomposition reactions, including oxidative reactions. Surfactants can also include and can be anionic, cationic, amphoteric or nonionic. Exemplary sweeteners may include stevia extract, aspartame, sucrose, alitame, saccharin, and the like. If desired, the tablets can also comprise nontoxic auxiliary substances such as pH buffering agents, preservatives, e.g., antioxidants, wetting or emulsifying agents, solubilizing agents, coating agents, flavoring agents (e.g., mint, cherry, anise, peach, apricot, licorice, raspberry, vanilla), and the like. Additional excipients and additives may include aluminum acetate, benzyl alcohol, butyl paraben, butylated hydroxy toluene, calcium disodium EDTA, calcium hydrogen phosphate dihydrate, dibasic calcium phosphate, tribasic calcium phosphate, candelilla wax, carnuba wax, castor oil hydrogenated, cetylpyridine chloride, citric acid, colloidal silicone dioxide, copolyvidone, corn starch, cysteine HCl, dimethicone, disodium hydrogen phosphate, erythrosine sodium, ethyl cellulose, gelatin, glycerin, glyceryl monooleate, glyceryl monostearate, glycine, HPMC pthalate, hydroxypropylcellulose, hydroxyl propyl methyl cellulose, hypromellose, iron oxide red or ferric oxide, iron oxide yellow, iron oxide or ferric oxide, magnesium carbonate, magnesium oxide, magnesium stearate, methionine, methacrylic acid copolymer, methyl paraben, silicified microcrystalline cellulose, mineral oil, phosphoric acid, plain calcium phosphate, anhydrous calcium phosphate, polaxamer 407, polaxamer 188, plain polaxamer, polyethylene oxide, polyoxy 140 stearate, polysorbate 80, potassium bicarbonate, potassium sorbate, potato starch, povidone, propylene glycol, propylene paraben, propyl paraben, retinyl palmitate, saccharin sodium, selenium, silica, silica gel, fumed silica, sodium benzoate, sodium carbonate, sodium citrate dihydrate, sodium crossmellose, sodium lauryl sulfate, sodium metabisulfite, sodium propionate, sodium starch, sodium starch glycolate, sodium stearyl fumarate, sorbic acid, sorbitol, sorbitan monooleate, pregelatinized starch, succinic acid, triacetin, triethyl citrate, vegetable stearin, vitamin A, vitamin E, vitamin C, or a combination thereof. The amounts of these excipients and additives can be properly selected based on their relation to other components and properties of the preparation and production method.

Immediate-release formulations of an effective amount of a glycan polymer preparation can comprise one or more combinations of excipients that allow for a rapid release of a pharmaceutically active agent (such as from 1 minute to 1 hour after administration). Controlled-release formulations (also referred to as sustained release (SR), extended-release (ER, XR, or XL), time-release or timed-release, controlled-release (CR), or continuous-release) refer to the release of a glycan polymer preparation from a dosage form at a particular desired point in time after the dosage form is administered to a subject.

In one embodiment a controlled release dosage form begins its release and continues that release over an extended period of time. Release can occur beginning almost immediately or can be sustained. Release can be constant, can increase or decrease over time, can be pulsed, can be continuous or intermittent, and the like. In one embodiment, a controlled release dosage refers to the release of an agent from a composition or dosage form in which the agent is released according to a desired profile over an extended period of time. In one aspect, controlled-release refers to delayed release of an agent from a composition or dosage form in which the agent is released according to a desired profile in which the release occurs after a period of time.

Pharmaceutical carriers or vehicles suitable for administration of the compounds provided herein include all such carriers known to those skilled in the art to be suitable for the particular mode of administration. In addition, the compositions can one or more components that do not impair the desired action, or with components that supplement the desired action, or have another action.

In a further aspect, the dosage form can be an effervescent dosage form. Effervescent means that the dosage form, when mixed with liquid, including water and saliva, evolves a gas.

Some effervescent agents (or effervescent couple) evolve gas by means of a chemical reaction which takes place upon exposure of the effervescent disintegration agent to water or to saliva in the mouth. This reaction can be the result of the reaction of a soluble acid source and an alkali monocarbonate or carbonate source. The reaction of these two general compounds produces carbon dioxide gas upon contact with water or saliva. An effervescent couple (or the individual acid and base separately) can be coated with a solvent protective or enteric coating to prevent premature reaction. Such a couple can also be mixed with previously lyophilized particles (such as a glycan). The acid sources can be any which are safe for human consumption and can generally include food acids, acid and hydrite antacids such as, for example: citric, tartaric, amalic, fumeric, adipic, and succinics. Carbonate sources include dry solid carbonate and bicarbonate salt such as sodium bicarbonate, sodium carbonate, potassium bicarbonate and potassium carbonate, magnesium carbonate and the like. Reactants which evolve oxygen or other gas and which are safe for human consumption are also included. In one embodiment citric acid and sodium bicarbonate are used.

In another aspect, the dosage form can be in a candy form (e.g., matrix), such as a lollipop or lozenge. In one embodiment an effective amount of a glycan is dispersed within a candy matrix. In one embodiment the candy matrix comprises one or more sugars (such as dextrose or sucrose). In another embodiment the candy matrix is a sugar-free matrix. The choice of a particular candy matrix is subject to wide variation. Conventional sweeteners (e.g., sucrose), sugar alcohols suitable for use with diabetic subjects (e.g., sorbitol or mannitol), or other sweeteners (e.g., sweeteners described herein) may be employed. The candy base can be very soft and fast dissolving, or can be hard and slower dissolving. Various forms will have advantages in different situations.

A candy mass composition comprising an effective amount of the glycan can be orally administered to a subject in need thereof so that an effective amount of the glycan will be released into the subject's mouth as the candy mass dissolves and is swallowed. A subject in need thereof includes a human adult or child.

The dosage forms described herein can also take the form of pharmaceutical particles manufactured by a variety of methods, including but not limited to high-pressure homogenization, wet or dry ball milling, or small particle precipitation. Other methods useful to make a suitable powder formulation are the preparation of a solution of active ingredients and excipients, followed by precipitation, filtration, and pulverization, or followed by removal of the solvent by freeze-drying, followed by pulverization of the powder to the desired particle size. In one embodiment, the pharmaceutical particles have a final size of 3-1000 microns, such as at most 3, 4, 5, 6, 7, 8, 9, 10, 20, 30, 40, 50, 60, 70, 80, 90, 100, 150, 200, 250, 300, 350, 400, 450, 500, 550, 600, 650, 700, 750, 800, 850, 900, 950, 1000 microns. In another embodiment, the pharmaceutical particles have a final size of 10-500 microns. In another embodiment, the pharmaceutical particles have a final size of 50-600 microns. In another embodiment, the pharmaceutical particles have a final size of 100-800 microns.

In another aspect, the disclosure provides a method of making a unit-dosage form described herein, comprising providing a glycan (e.g., a glycan described herein); formulating the glycan into a unit-dosage form (e.g., a unit-dosage form described herein), packaging the unit-dosage form, labelling the packaged unit-dosage form, and/or selling or offering for sale the packaged and labeled unit-dosage form.

The unit-dosage forms described herein may also be processed. In one embodiment, the processing comprises one or more of: processing the dosage form into a pharmaceutical composition, e.g., formulating, combining with a second component, e.g., an excipient or buffer; portioning into smaller or larger aliquots; disposing into a container, e.g., a gas or liquid tight container; packaging; associating with a label; shipping or moving to a different location. In one embodiment, the processing comprises one or more of: classifying, selecting, accepting or discarding, releasing or withholding, processing into a pharmaceutical composition, shipping, moving to a different location, formulating, labeling, packaging, releasing into commerce, or selling or offering for sale, depending on whether the predetermined threshold is met. In some embodiments, the processed dosage forms comprise a glycan described herein.

In some embodiments, the processing comprises one or more of: processing the dosage form into a pharmaceutical composition, e.g., formulating, combining with a second component, e.g., an excipient or buffer; portioning into smaller or larger aliquots; disposing into a container, e.g., a gas or liquid tight container; packaging; associating with a label; shipping or moving to a different location. In one embodiment, the processing comprises one or more of: classifying, selecting, accepting or discarding, releasing or withholding, processing into a pharmaceutical composition, shipping, moving to a different location, formulating, labeling, packaging, releasing into commerce, or selling or offering for sale, depending on the determination.

In another embodiment, an oral dosage form is provided comprising a glycan polymer preparation, wherein the oral dosage form is a syrup. The syrup can comprise about 1%, 5%, 10%, 15%, 20%, 25%, 30%, 35%, 40%, 45%, 50%, 55%, 60%, 65%, 70%, 75%, 80%, or 85% solid. The syrup can comprise about 15%, 20%, 25%, 30%, 35%, 40%, 45%, or 50% liquid, for example, water. The solid can comprise a glycan polymer preparation. The solid can be, for example, about 1-96%, 10-96%, 20-96%, 30-96%, 40-96%, 50-96%, 60-96%, 70-96%, 80-96%, or 90-96% glycan polymer preparation. In another embodiment, a glycan polymer preparation is formulated as a viscous fluid.

In one embodiment, the composition comprises a foaming component, a neutralizing component, or a water-insoluble dietary fiber. A foaming component can be at least one member selected from the group consisting of sodium hydrogen carbonate, sodium carbonate, and calcium carbonate. In one embodiment a neutralizing component can be at least one member selected from the group consisting of citric acid, L-tartaric acid, fumaric acid, L-ascorbic acid, DL-malic acid, acetic acid, lactic acid, and anhydrous citric acid. In one embodiment a water-insoluble dietary fiber can be at least one member selected from the group consisting of crystalline cellulose, wheat bran, oat bran, cone fiber, soy fiber, and beet fiber. The formulation can contain a sucrose fatty acid ester, powder sugar, fruit juice powder, and/or flavoring material.

In some embodiments, the dosage forms are formulated to release the pharmaceutical compositions comprising glycan polymer preparations in a specific region(s) of the GI tract, such as the small or the large intestine. In some embodiments, the dosage forms are formulated to release the pharmaceutical compositions comprising glycan polymer preparations in a specific region(s) of the GI tract, such as the cecum, ascending colon, transverse colon, descending colon, sigmoid colon, and/or rectum.

In some embodiments, the dosage form for the glycan polymer preparations described herein is an enzyme-responsive delivery system. For example, trypsin responsive polymers can be made using hydrogels that are crosslinked by peptides that are degraded by trypsin. Trypsin is active in the small intestine. Trypsin-responsive delivery systems can be used to target delivery of the glycan polymer preparations to the small intestine. In another example, enzyme-digestible hydrogels consisting of poly(vinyl pyrrolidone) crosslinked with albumin are degraded in the presence of pepsin.

In some embodiments, the dosage form for the glycan polymer preparations described herein is a delivery device that enables prolonged retention at a specific site in the GI tract. For example, a gastroretentive delivery system enables prolonged release of the glycan polymer preparations to the stomach. Gastroretentive delivery may be used for the glycan polymer preparations that modulate bacteria in the stomach or in the upper small intestine.

In some embodiments, the dosage form for the glycan polymer preparations described herein is a mucoadhesive delivery system that adheres to the mucosal surfaces of the stomach. They are typically composed of polymers with numerous hydrogen-bonding groups, e.g., cross-linked polyacrylic acids, sodium carboxymethyl cellulose, sodium alginate, carrageenan, Carbopol 934P, or thiolated polycarbophil.

In some embodiments, the dosage form for the glycan polymer preparations described herein is an expanding delivery system that rapidly increases in size in the stomach, which slows its passage through the pylorus. Such systems include systems that unfold in the stomach. For example, geometric shapes such as tetrahedrons, rings, disks, etc. can be packed into a gelatin capsule. When the capsule dissolves, the shape unfolds. The systems can be composed of one or more erodible polymer (e.g., hydroxypropyl cellulose), one or more non-erodible polymer (e.g., polyolefins, polyamides, polyurethanes). The glycan may then be dispersed within the polymer matrix. The retention times can be fine-tuned by the polymer blend. Alternatively, devices made from elastic polymers that are stable in the acidic pH of the stomach but dissolve in the neutral/alkaline conditions further along the GI tract can be used. Such polymer formulations can prevent intestinal obstruction when the device exits the stomach. Supramolecular polymer gels crosslinked by hydrogen bonds between carboxyl groups may also be used, e.g. composed of poly(acryloyl 6-aminocaproic acid) (PA6ACA) and poly(methacrylic acid-co-ethyl acrylate) (EUDRAGIT L 100-55). Other systems include swellable excipients, such as collagen sponges. For example, a hydrogel matrix (e.g. a swellable core: polyvinyl pyrrolidone XL, Carbopol 934P, calcium carbonate) swells 2-50 times in the stomach. Superporous hydrogel composites swell to hundreds of times their original volume in a few minutes. Some systems exploit gas generation to achieve expansion, e.g. carbon dioxide-generating, expandable systems that are surrounded by a hydrophilic membrane.

In some embodiments, the dosage form for the glycan polymer preparations described herein is a density-controlled delivery system. These systems are designed to either float or sink in gastric fluids, which delays their emptying from the stomach. For example, high-density systems enable the device to settle to the bottom of the stomach, below the pylorus, and thus avoid stomach emptying. Other systems are low-density/floating systems. Such devices may, e.g., comprise entrapped air in hollow chambers or may incorporate low-density materials like fats, oils, or foam powder. Low density may be achieved through swelling, e.g. hydrocolloid containing capsules dissolve upon contacting gastric fluid and the hydrocolloids swell to form a mucous body. Alternative polymers include: chitosans, sodium alginate, and glycerol monooleate matrix. Low density may be achieved through gas generation. For example, tablets loaded with carbonate and optionally citric acid generate carbon dioxide after contact with acidic aqueous media. The carbon dioxide generated is entrapped within the gelling hydrocolloid causing the system to float. Hydrocolloids include hydroxypropyl methylcellulose and Carbopol 934P.

In some embodiments, the dosage form for the glycan polymer preparations described herein employs a design to retain a device in the small or large intestine. The location-specific nature of the device is provided by a specific triggering method, e.g. pH, enzyme, etc. These include systems designed for mucoadhesion and also microneedle pills. Microneedle pills comprise a drug reservoir spiked with microneedles that is encapsulated in a pH-responsive coating. When the pill reaches the desired location in the GI tract and the coating dissolves, the microneedles enable the pill to become stuck to the lining of the GI tract. In other embodiments, the microneedle pills comprise a capsule that consists of two chemical compartments filled with citric acid and sodium bicarbonate, respectively. As the pill dissolves in the digestive system, barriers between the two substances erode, allowing them to mix and create a chemical reaction that pushes micro-needles of saccharides through the outer layer of the capsule and into the lining of the small intestine. The saccharide needles can be filled with drugs that are delivered into nearby blood vessels as the saccharide is absorbed.

In some embodiments, the dosage form for the glycan polymer preparations described herein employs a pH sensitive polymer coating. For example, pH-dependent polymers (bi- or tri-phasic) can be insoluble at low pH levels (e.g. acid resistance in the stomach, pH 1-2) and become increasingly soluble as pH rises, e.g. to about 5.5-6.2 in the duodenum, to about pH 5.7 in the ascending colon, to about pH 6.4 in the cecum, to about pH 6.6 in the transverse colon, to about pH 7.0 in the descending colon, to about 7.2-7.5 in the ileum, or to about pH 7.5 in the distal small intestine. In one example, TARGIT™ technology may be used for site-specific delivery of the glycan polymer preparations in the gastrointestinal (GI) tract. The system employs pH-sensitive coatings onto injection-molded starch capsules to target the terminal ileum and colon.

In some embodiments, the dosage form for the glycan polymer preparations described herein is a delayed release system or time controlled release system. Such systems usually employ enteric coatings that may be combined with pH sensitive and time release functions. For example, ETP (enteric coated time-release press coated) tablets may be used that are composed of three components: a glycan-containing core tablet (rapid release function), a press-coated, swellable hydrophobic polymer layer (e.g. hydroxypropyl cellulose layer (HPC), and a time release function. The duration of lag phase can be controlled either by weight or composition of polymer layer and an enteric coating layer (acid resistance function).

In some embodiments, the dosage form for the glycan polymer preparations described herein employs Eudragit® enteric coatings of tablets and capsules. Other suitable synthetic polymers include: Shellac, ethyl cellulose, cellulose acetate phthalate, hydroxypropylmethyl cellulose, polyvinyl acetate phthalate and poly glutamic acid coatings, such as poly-γ-glutamic acid (γ-PGA). These coatings combine both mucoadhesive and pH-dependent release strategies. To enhance colon targeted delivery Eudragits® are methacrylic co-polymers with varying side group compositions that alter the pH at which they are soluble. For example, for Eudragit®-coated systems no significant drug release occurs in the stomach (e.g. at pH 1.4) and in the small intestine (e.g. at pH 6.3), while significant drug release can be seen at pH 7.8 in the ileocaecal region.

In some embodiments, the dosage form for the glycan polymer preparations described herein is a microbial-triggered system, such as a polysaccharide based delivery system. Polysaccharide based delivery systems contain biodegradable and mucoadhesive polymer coatings, including coatings of chitosan and pectin. Other suitable natural polymers include, e.g., guar gum, inulin, cyclodextrin, dextran, amylase, chondrotin sulphate, and locust bean gum. These delivery systems can be used to target the glycan to the small intestine. Coatings with naturally occurring polysaccharides like guar gum, xanthan gum, chitosan, alginates, etc. are degraded by colonic gut microbiota, e.g. enzymes such as, xylosidase, arabinosidase, galactosidase etc. For example, CODES™ technology may be used to deliver the glycan polymer preparations. This system combines the polysaccharide coating with a pH-sensitive coating. In some embodiments, the system consists of a core tablet coated with three layers of polymer coatings: The outer coating is composed of Eudragit L. This coating gets dissolved in the duodenum and exposes the next coating. The next coating is composed of Eudragit E. This layer allows the release of lactulose present in the inner core. The lactulose gets metabolized into short chain fatty acids that lower the surrounding pH where the Eudragit E layer dissolves. The dissolving of Eudragit E results in the exposure of the glycan. The bacteria present in the colon are responsible for the degradation of polysaccharides that are released from the core tablet. The degradation of polysaccharides may result in organic acids formation that lowers the pH of the contents surrounding the tablet.

In some embodiments, the dosage form for the glycan polymer preparations described herein is a pressure-controlled delivery system. The system employs the fact that higher pressures are encountered in the colon than in the small intestine. For example, for ethylcellulose systems that are insoluble in water, the release of glycans occurs following disintegration of a water-insoluble polymer capsule as a result of pressure in the lumen of the colon. The release profile may be adjusted by varying the thickness of the ethylcellulose, the capsule size and/or density of the capsule.

In some embodiments, the dosage form for the glycan polymer preparations described herein is a pulsatile colon targeted delivery system. For example, the system can be a pulsincap system. The capsule which is employed comprises a plug that is placed in the capsule that controls the release of the glycan. A swellable hydrogel (e.g. hydroxyl propyl methyl cellulose (HPMC), poly methyl methacrylate or polyvinyl acetate) seals the drug content. When the capsule gets in contact with a fluid the plug is pushed off from the capsule and the glycan is released. The release profile can be controlled by varying the length and/or point of intersection of the plug with the capsule body. Another system is a port system. The capsule body is enclosed in a semi-permeable membrane. The insoluble plug consists of an osmotically active agent and the glycan. When the capsule gets in contact with a fluid the semi-permeable membrane permits inflow of the fluid which increases pressure in the capsule body. This leads to an expelling of the plug and release of the glycan.

In some embodiments, the dosage form for the glycan polymer preparations described herein is an osmotically controlled colon targeted delivery system. An exemplary system, OROS-CT, consists of osmotic units (up to 5 or 6 push pull units) encapsulated in a hard gelatin capsule. The push pull units are bi-layered with outer enteric impermeable membrane and inner semi-permeable membrane. The internal, central part of the push pull consists of the drug layer and push layer. The glycan is released through the semi-permeable membrane. The capsule body enclosing the push pull units is dissolved immediately after administration. In the GI tract the enteric impermeable membrane prevents water absorption. The enteric coating is dissolved in small intestine (higher pH, >7), water enters the unit through the semi-permeable membrane causing push layer to swell and force out the glycan.

In some embodiments, the dosage form for the glycan polymer preparations described herein is "smart pill" which can be used to release the glycan just before reaching the ileocecal valve.

In some embodiments, the dosage form for the glycan polymer preparations described herein is a rectally administered formulation. For example, enemas introduce a glycan polymer preparation in liquid formulation into the rectum. The volume administered is typically less than 10 mL. Suppositories introduce a glycan polymer preparation into the rectum. Suppositories are solid dosage forms that melt or dissolve when inserted into the rectum, releasing the glycans. Typical excipients for suppository formulations include cocoa butter, polyethylene glycols, and agar.

Dosage Forms

The glycan compositions described herein may be formulated into any suitable dosage form, e.g. for oral or enteral administration or formulated for injection. Suitable dosage forms for use in the methods and compositions described herein can be found in WO 2016/122889, WO 2016/172657, and WO 2016/172658, which in their entirety, is hereby incorporated by reference.

The dosage forms described herein can be manufactured using processes that are known to those of skill in the art. The dosage form may be suitable for any suitable route of administration. In some embodiments, the administration is enteral (e.g., topical, oral, rectal, vaginal, etc.).

The dosage form may be a packet, such as any individual container that contains a glycan composition in the form of, e.g., a liquid (e.g., a beverage), a solid, a gel, a cream, an ointment, a powder, a sachet, a tablet, a pill, a capsule, a lozenge, a gummy, a suppository, a depository, a single-use applicator, a softgel or medical device (e.g. a syringe). For example, provided is also an article of manufacture, such as a container comprising a unit dosage form of the glycan composition, and a label containing instructions for use of such glycan composition.

The compositions provided herein can be in unit-dosage forms or multiple-dosage forms. A unit-dosage form, as used herein, refers to physically discrete unit suitable for administration to human in need thereof. In an embodiment, the unit-dosage form is provided in a package. Each unit-dose can contain a predetermined quantity of an active ingredient(s) sufficient to produce the desired therapeutic effect, in association with other pharmaceutical carriers or excipients. Examples of unit-dosage forms include ampoules, syringes, and individually packaged tablets and capsules. Unit-dosage forms can be administered in fractions or multiples thereof. A multiple-dosage form is a plurality of identical unit-dosage forms packaged in a single container, which can be administered in segregated unit-dosage form.

Kits

Kits also are contemplated. For example, a kit can comprise unit dosage forms of the glycan polymer preparation, and a package insert containing instructions for use of the glycan in treatment of a gastrointestinal disorder or condition. The kits include a glycan polymer preparation in suitable packaging for use by a subject in need thereof. Any of the compositions described herein can be packaged in the form of a kit. A kit can contain an amount of a glycan polymer preparation (optionally additionally comprising a prebiotic substance, a probiotic bacterium, and/or a second therapeutic agent) sufficient for an entire course of treatment, or for a portion of a course of treatment. Doses of a glycan polymer preparation can be individually packaged, or the glycan polymer preparation can be provided in bulk, or combinations thereof. Thus, in one embodiment, a kit provides, in suitable packaging, individual doses of a glycan polymer preparation that correspond to dosing points in a treatment regimen, wherein the doses are packaged in one or more packets.

In one embodiment, the glycan polymer preparation can be provided in bulk in a single container, or in two, three, four, five, or more than five containers. For example, each container may contain enough of a glycan polymer preparation for a particular week of a treatment program that runs for a month. If more than one bulk container is provided, the bulk containers can be suitably packaged together to provide sufficient glycan polymer preparation for all or a portion of a treatment period. The container or containers can be labeled with a label indicating information useful to the subject in need thereof or the physician performing the treatment protocol, such as, e.g. dosing schedules.

The glycan polymer preparation can be packaged with other suitable substances, such as probiotic bacteria, prebiotic substances or other substances, as described herein. The other substance or substances can be packaged separately from the glycan polymer preparation, or mixed with the glycan polymer preparation, or combinations thereof. Thus, in one embodiment, kits include a dosage form containing all the ingredients intended to be used in a course of treatment or a portion of a course of treatment, e.g., a glycan polymer preparation and optionally buffers, excipients, etc., a probiotic, prebiotic or a polymer agent. In one embodiment, a glycan polymer preparation is packaged in one package or set of packages, and additional components, such as probiotic bacteria, prebiotics, and therapeutic agents are packaged separately from the glycan polymer preparation.

Kits can further include written materials, such as instructions, expected results, testimonials, explanations, warnings, clinical data, information for health professionals, and the like. In one embodiment, the kits contain a label or other information indicating that the kit is only for use under the direction of a health professional. The container can further include scoops, syringes, bottles, cups, applicators or other measuring or serving devices.

Medical Food

Also provided herein are preparations of glycans formulated as a medical food. Any glycan polymer preparation described herein may be formulated as a medical food as well as pharmaceutical compositions that comprise glycan polymer preparations.

A medical food is defined in section 5(b)(3) of the Orphan Drug Act (21 U.S.C. 360ee(b)(3)). Medical food is formulated to be consumed (oral intake) or administered enterally (e.g. feeding/nasogastric tube) under medical supervision, e.g. by a physician. It is intended for the specific dietary management of a disease or condition, such as, e.g. dysbiosis or a GI-tract disease. Medical foods as used herein do not include food that is merely recommended by a physician as part of an overall diet to manage the symptoms or reduce the risk of a disease or condition. Medical foods comprising a preparation of glycans are foods that are synthetic (e.g., formulated and/or processed products, such as, being formulated for the partial or exclusive feeding of a subject by oral intake or enteral feeding by tube) and not naturally occurring foodstuff used in a natural state.

In some embodiments, the subject has limited or impaired capacity to ingest, digest, absorb, or metabolize ordinary foodstuffs or certain nutrients. In other embodiments, the subject has other special medically determined nutrient requirements, the dietary management of which cannot be achieved by the modification of the normal diet alone. Medical foods comprising a preparation of glycans are administered to a subject in need thereof under medical supervision (which may be active and ongoing) and usually, the subject receives instructions on the use of the medical food. Medical foods may comprise one or more food additives, color additives, GRAS excipients and other agents or substances suitable for medical foods. Medical food preparations may be nutritionally complete or incomplete formulas.

Dietary Supplements

Any glycan polymer preparation described herein may be formulated as a dietary supplement, e.g, for use in a method described herein. Dietary supplements are regulated under the Dietary Supplement Health and Education Act (DSHEA) of 1994. A dietary supplement is a product taken by mouth that contains a "dietary ingredient" intended to supplement the diet. The "dietary ingredients" in these products may include, in addition to a glycan polymer preparation described herein, one or more of: vitamins, minerals, herbs or other botanicals, amino acids, and substances such as enzymes, organ tissues, glandulars, and metabolites. Dietary supplements can also be extracts or concentrates, and may be found in many forms such as tablets, capsules, softgels, gelcaps, liquids, or powders. They can also be in other forms, such as a bar, but if they are, information on their label must not represent the product as a conventional food or a sole item of a meal or diet. DSHEA requires that every supplement be labeled a dietary supplement and not as a general food.

Food Ingredient

Any glycan polymer preparation described herein may be formulated as a food ingredient or food additive, e.g., for use in a method described herein. Food ingredients may be generally recognized as safe (GRAS) or may require FDA authorization. Glycan polymer preparations can be added to any desirable food, e.g. beverages (incl., e.g., fruit juices), dairy products (e.g., milk, yogurt, cheese), cereals (any grain products), bread, spreads, etc.

A glycan polymer preparation may be formulated as a food. The term "food" as defined in the Federal Food, Drug and Cosmetic Act (21 U.S.C. Section 321(a)(f)) refers to articles used for food or drink for man or other animals, chewing gum, and articles used for components of any such article. Food is formulated to be consumed (oral intake). Foods may comprise, in addition to a glycan polymer preparation, one or more food additives, color additives, GRAS excipients and other agents or substances suitable for foods. Food preparations may be nutritionally complete or incomplete formulas. Food products can be, e.g., a beverage, a powdered beverage mix, a bar, a candy, a dairy product, confection, baked good, a gummy, and the like.

Animal Feed Ingredients and Additives

Any glycan polymer preparation described herein may be formulated as an animal feed ingredient or feed additive, e.g., as prepared by a method described herein.

A feed ingredient is a component part or constituent or any combination/mixture added to and comprising the feed. Feed ingredients might include grains, milling byproducts, added vitamins, minerals, fats/oils, and other nutritional and energy sources. Under the FFDCA any substance that is added to or is expected to become a component of animal food, either directly or indirectly, must be used in accordance with a food additive regulation unless it is generally recognized as safe for that use (GRAS). The Official Publication of the Association of American Feed Control Officials (AAFCO) provides definitions for feed ingredients and GRAS substances.

Methods of Characterization

If desired, the glycan polymer preparations can be characterized. For glycan polymer preparations, the monomeric building blocks (e.g. the monosaccharide or glycan unit composition), the anomeric configuration of side chains, the presence and location of substituent groups, degree of polymerization/molecular weight and the linkage pattern can be identified by standard methods known in the art, such as, e.g. methylation analysis, reductive cleavage, hydrolysis, GC-MS (gas chromatography-mass spectrometry), MALDI-MS (Matrix-assisted laser desorption/ionization-mass spectrometry), ESI-MS (Electrospray ionization-mass spectrometry), HPLC (High-Performance Liquid chromatography with ultraviolet or refractive index detection), HPAEC-PAD (High-Performance Anion-Exchange chromatography with Pulsed Amperometric Detection), CE (capillary electrophoresis), IR (infra red)/Raman spectroscopy, and NMR (Nuclear magnetic resonance) spectroscopy techniques. For polymers of crystalline consistency, the crystal structure can be solved using, e.g., solid-state NMR, FT-IR (Fourier transform infrared spectroscopy), and WAXS (wide-angle X-ray scattering). The DP, DP distribution, and polydispersity can be determined by, e.g., viscosimetry and SEC (SEC-HPLC, high performance size-exclusion chromatography). Alien groups, end groups and substituents can be identified, e.g., using SEC with labeling, aqueous analytics, MALDI-MS, FT-IR, and NMR. To identify the monomeric components of the glycans methods such as, e.g. acid-catalyzed hydrolysis, HPLC (high performance liquid chromatography) or GLC (gas-liquid chromatography) (after conversion to alditol acetates) may be used. To determine the linkages present in the glycans, in one example, the polysaccharide is methylated with methyl iodide and strong base in DMSO, hydrolysis is performed, a reduction to partially methylated alditols is achieved, an acetylation to methylated alditol acetates is performed, and the analysis is carried out by GLC/MS (gas-liquid chromatography coupled with mass spectrometry). In some embodiments, to determine the polysaccharide sequence a partial depolymerization is carried out using an acid or enzymes to determine the structures. Possible structures of the polysaccharide are compared to those of the hydrolytic oligomers, and it is determined which one of the possible structures could produce the oligomers. To identify the anomeric configuration, in one example, the intact polysaccharide or a preparation of glycan polymers are subjected to enzymatic analysis, e.g. they are contacted with an enzyme that is specific for a particular type of linkage, e.g., β-galactosidase, or α-glucosidase, etc., and NMR may be used to analyze the products.

For example, the distribution of (or average) degree of polymerization (DP) of a glycan polymer preparation may be measured by injecting a sample with a concentration of, e.g., 10-100 mg/mL onto an Agilent 1260 BioPure HPLC (or similar) equipped with a 7.8×300 mm BioRad Aminex HPX-42A column (or similar) and RI detector as described, e.g., in Gómez et al. (*J Agric Food Chem*, 2014, 62:9769). Alternatively, a sample with a concentration may be injected into a Dionex ICS5000 HPLC (or similar) equipped with a 4×250 mm Dionex CarboPac PA1 column (or similar) and PAD detector as described, e.g., in Holck et al., (*J Agric Food Chem*, 2011, 59(12), 6511-6519). Integration of the resulting spectrum compared against a standard solution of oligomers allows determination of the average DP.

Distribution of molecular weights can be measured, e.g., by MALDI mass spectrometry. Glycan polymer concentration can be measured with a Mettler-Toledo sugar refractometer (or similar) with the final value adjusted against a standardized curve to account for refractive differences between monomers and oligomers.

Distribution of glycoside regiochemistry can be characterized, e.g., by a variety of 2D-NMR techniques including COSY, HMBC, HSQC, DEPT, and TOCSY analysis using standard pulse sequences and a Bruker 500 MHz spectrometer. Peaks can be assigned by correlation to the spectra of naturally occurring polysaccharides with known regiochemistry.

In some embodiments, the relative peak assignment of a sample is dependent on a number of factors including, but not limited to, the concentration and purity of the sample, the identity and quality of the solvent (e.g., the isotopically labeled solvent), and the pulse sequence utilized. As such, in embodiments, the relative peak assignment of, for example, a glycan comprising glucose may vary (e.g., by about 0.01 ppm, about 0.02 ppm, or about 0.05 ppm) when the NMR spectrum is obtained in similar conditions due to said factors. In these instances as used herein, the terms "corresponding peak" or "corresponding peaks" refer to NMR peaks associated with the same sample but that vary (e.g., by about 0.01 ppm, about 0.02 ppm, or about 0.05 ppm) due to factors including, for example, the concentration and purity of the sample, the identity and quality of the isotopically labeled solvent, and the pulse sequence utilized.

Monomeric compositions of glycan polymers may be measured, e.g., by the complete hydrolysis method in which a known amount of oligomer is dissolved into a strong acid at elevated temperature and allowed sufficient time for total hydrolysis to occur. The concentration of individual monomers may then be measured by the HPLC or GC methods described herein and known in the art to achieve relative abundance measurements as in Holck et al. Absolute amounts can be measured by spiking the HPLC sample with a known amount of detector active standard selected to prevent overlap with any of the critical signals.

The degree of branching in any given glycan polymer population may be measured by the methylation analysis method established, e.g, by Hakomori (J. Biochem. (Tokyo), 1964, 55, 205). With these data, identification of potential repeat units may be established by combining data from the total hydrolysis, average DP, and methylation analysis and comparing them against the DEPT NMR spectrum. Correlation of the number of anomeric carbon signals to these data indicates if a regular repeat unit is required to satisfy the collected data as demonstrated, e.g., in Harding, et al. (Carbohydr. Res. 2005, 340, 1107).

Definitions

"Acquire" or "acquiring" as the terms are used herein, refer to obtaining possession of a value, e.g., a numerical value, or image, or a physical entity (e.g., a sample), by "directly acquiring" or "indirectly acquiring" the value or physical entity. "Directly acquiring" means performing a process (e.g., performing a synthetic or analytical method or protocol) to obtain the value or physical entity. "Indirectly acquiring" refers to receiving the value or physical entity from another party or source (e.g., a third party laboratory that directly acquired the physical entity or value). Directly acquiring a value or physical entity includes performing a process that includes a physical change in a physical substance or the use of a machine or device. Examples of directly acquiring a value include obtaining a sample from a human subject. Directly acquiring a value includes performing a process that uses a machine or device, e.g., an NMR spectrometer to obtain an NMR spectrum.

Agitation conditions: As used herein, the term "agitation conditions" refers to conditions that promote or maintain a substantially uniform or homogeneous state of a mixture (e.g., a reaction mixture comprising a dextrose preparation) with respect to dispersal of solids (e.g., solid catalysts), uniformity of heat transfer, or other similar parameters. Agitation conditions generally include stirring, shaking, and/or mixing of a reaction mixture. In some embodiments, agitation conditions may include the addition of gases or other liquids into a solution. In some embodiments, agitation conditions are used to maintain substantially uniform or homogenous distribution of a catalyst, e.g., an acid catalyst. In some embodiments, a dextrose preparation is heated in the presence of an acid catalyst under suitable conditions to achieve homogeneity and uniform heat transfer in order to synthesize an oligosaccharide composition.

Approximately: As used herein, the term "approximately" or "about," as applied to one or more values of interest, refers to a value that is similar to a stated reference value. In certain embodiments, the term "approximately" or "about" refers to a range of values that fall within 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value).

"Aqueous concentration of glycan units" as used herein refers to the mass of glycan units per mass of water and does not include or account for other solutes, dispersed material, catalyst, diluents or solvents, e.g., organic solvents and the like.

As used herein, "digestibility" is a value for the caloric value of a glycan or glycan polymer preparation, e.g., in the gastrointestinal tract of a subject. Glycan polymer preparations can have varied caloric value, depending on how well, if at all, a host, e.g., host enzyme, can digest it. For example, glycan polymer preparations that are indigestible by a host (e.g., mammal, e.g., human, enzyme) contain minimal caloric value (e.g., have no caloric value and are non-caloric). Caloric value as used herein, does not refer to the caloric value determined in a bomb calorimeter or similar device but to the caloric value usable by the subject. In some examples, glycan polymer preparation that are indigestible are not absorbed and thus not assimilated or utilized for energy in the human body. Caloric value refers to usable caloric value, e.g., calories that are assimilated or utilized for energy in the human body. Digestibility may be measured as described in McCleary (AOAC Method 2009.01, also referred to as AACC International Approved Method 32-45.01) (McCleary et al. (2010) J. AOAC Int., 93(1), 221-233), e.g., using pancreatic α-amylase and conditions close to physiological (pH 6, 37° C.) for the enzymatic incubation step. In other embodiments, digestibility can be measured as described in McCleary et al., (2012) J. AOAC Int., 95 (3), 824-844, e.g., using AOAC 201 1 .25 (Integrated Total Dietary Fiber Assay).

Dextrose monomer: As used herein, the term "dextrose monomer" refers to a D-isomer of a glucose monomer, known as $_D$-glucose.

Dextrose preparation: As used herein, the term "dextrose preparation" refers to a preparation that comprises two or more dextrose monomers. In some embodiments, a dextrose preparation comprises dextrose monohydrate. In some embodiments, a dextrose preparation comprises 70DS corn syrup.

"Distinct" as used herein, e.g. with reference to a species in a glycan polymer preparation, is meant to denote that it is chemically and/or structurally different from another. For example, two sugars are "distinct" if they are chemically different, e.g. a fucose and a xylose, or structurally different, e.g. cyclic vs. acyclic, L- vs. D-form. Two dimers are distinct if they consist of the same two monomers but one pair contains alpha-1,4 bond and the other contains a beta-1,6 bond. Distinct entities may have any other suitable distinguishing characteristic or property that can be detected by methods known in the art and/or described herein.

"Evolved water" as used herein refers to water that is produced as a result of forming a glycosidic bond between two glycan units (wherein one or both of the glycoan units is a free glycan unit or is a member of a polymer of glycan subunits).

As used herein, "fermentability" is a value for how readily a glycan or glycan polymer preparation can be used for fermentation by a microbe, microbial community, or microbiome (e.g., in the gastroinstestinal tract of a subject). In some examples, "non-fermentable" refers to glycan polymer preparations that have a relatively low fermentability, e.g., of less than 40% by weight, e.g., less than 40%, 35%, 30%, 20%, 15%, or less (by weight). In some examples, "fermentable" refers to glycan polymer preparations which have a relatively high fermentability, e.g., at least 60% by weight, e.g., at least 60%, 65%, 70%, 75%, 80%, 85% by weight, or higher. Fermentability can be determined by methods described in "Fermentability of Various Fiber Sources by Human Fecal Bacteria In Vitro", at AMERICAN JOURNAL CLINICAL NUTRITION, 1991, 53 1418-1424; or U.S. Pat. No. 5,085,883, both of which are incorporated herein by reference.

As used herein, a "glycan polymer preparation" (also referred to as a "preparation of glycans", "glycan preparation", "glycan polymer preparation", "glycan polymer composition", "glycan composition", "oligosaccharide preparation", "oligosaccharide composition" or "glycan") is a preparation comprising glycans (sometimes referred to as glycan polymers). In some embodiments, the glycan polymer preparation comprises a synthetic mixture of a plurality of mono-, di-, oligomeric and/or polymeric glycans, wherein the oligomeric and/or polymeric glycans comprise glycan units that are linked by bonds (e.g., glycosidic bonds). In some embodiments, preparations of glycan polymers do not contain one or more naturally occurring oligo- or polysaccharide, including: glucooligosaccharide, mannanoligosaccharide, inulin, lychnose, maltotretraose, nigerotetraose, nystose, sesemose, stachyose, isomaltotriose, nigerotriose, maltotriose, melezitose, maltotriulose, raffinose, kestose, fructooligosaccharide, 2'-fucosyllactose, galactooligosaccharide, glycosyl, idraparinux, isomaltooligosaccharide, maltodextrin, xylooligosaccharide, agar, agarose, alginic acid, alguronic acid, alpha glucan, amylopectin, amylose, arabioxylan, beta-glucan, callose, capsulan, carrageenan, cellodextrin, cellulin, cellulose, chitin, chitin nanofibril, chitin-glucan complex, chitosan, chrysolaminarin, curdlan, cyclodextrin, alpha-cylcodextrin, dextran, dextrin, dialdehyde starch, ficoll, fructan, fucoidan, galactoglucomannan, galactomannan, galactosamineogalactan, gellan gum, glucan, glucomannan, glucoronoxyland, glycocalyx, glycogen, hemicellulose, hypromellose, icodextrin, kefiran, laminarin, lentinan, levan polysaccharide, lichenin, mannan, mucilage, natural gum, paramylon, pectic acid, pectin, pentastarch, phytoglycogen, pleuran, poligeenan, polydextrose, porphyran, pullulan, schizophyllan, sepharose, sinistrin, sizofiran, sugammadex, welan gum, xantham gum, xylan, xyloglucan, zymosan, and the like. In some embodiments, a glycan exists as a salt, e.g., a pharmaceutically acceptable salt.

A "glycan unit" as used herein refers to the individual unit or building block from which the glycans are made. In an embodiment, a glycan unit is a monomer. In an embodiment, a glycan unit is a dimer. In an embodiment a glycan unit is a monosaccharide. In an embodiment, a glycan unit is a disaccharide. In some embodiments, the glycan unit is a carbohydrate and may be selected from a sugar alcohol, a short-chain fatty acid, a sugar acid, an imino sugar, a deoxy sugar, and an amino sugar. In some embodiments, the glycan unit is erythrose, threose, erythrulose, arabinose, lyxose, ribose, xylose, ribulose, xylulose, allose, altrose, galactose, glucose, gulose, idose, mannose, talose, fructose, psicose, sorbose, tagatose, fucose, fuculose, rhamnose, mannoheptulose, sedoheptulose, and the like. In some embodiments, the glycan unit is glucose, galactose, arabinose, mannose, fructose, xylose, fucose, or rhamnose. In an embodiment, the glycan unit is an oligomer. In an embodiment, the glycan unit is a polymer. In embodiments, a glycan comprises distinct glycan units, e.g., a first and a second glycan unit. In embodiments, a glycan comprises distinct glycan units, e.g., a first, a second, a third, a fourth, and/or a fifth distinct glycan unit.

As used herein, an "isolated" or "purified" glycan polymer preparation (also sometimes referred to as "polished") is substantially pure and free of contaminants, e.g. pathogens or otherwise unwanted biological material, or toxic or otherwise unwanted organic or inorganic compounds. In some embodiments, pure or isolated compounds, compositions or preparations may contain traces of solvents and/or salts (such as less than 10%, 9%, 8%, 7%, 6%, 5%, 4%, 3%, 2%, 1%, less than 0.5% or 0.1% by w/w, w/v, v/v or molar %). Purified compounds are glycan polymer preparations contain at least about 60% (by w/w, w/v, v/v or molar %), at least about 75%, at least about 90%, at least about 95%, at least about 97%, at least about 98%, or at least about 99% by w/w, w/v, v/v or molar % the compound(s) of interest. For example, a purified (substantially pure) or isolated preparation of glycan polymers is one that is at least 80%, 85%, 90%, 91%, 92%, 93%, 94%, 95%, 98%, 99%, 99.5%, 99.8%, 99.9% or 100% of the glycan polymers by w/w, w/v, v/v or molar % (i.e. not including any solvent, such as e.g. water, in which the glycan polymer preparation may be dissolved) and separated from the components that accompany it, e.g. during manufacture, extraction/purification and/or processing (e.g. such that the glycan polymers are substantially free from undesired compounds). Purity may be measured by any appropriate standard method, for example, by column chromatography (e.g., size-exclusion chromatography (SEC)), thin layer chromatography (TLC), gas chromatography (GC), high-performance liquid chromatography (HPLC) or nuclear magnetic resonance (NMR) spectroscopy. Purified or purity may also define a degree of sterility that is safe for administration to a human subject, e.g., lacking viable infectious or toxic agents.

As used herein, a "pharmaceutical composition" or "pharmaceutical preparation" is a composition or preparation, having pharmacological activity or other direct effect in the mitigation, treatment, or prevention of disease, and/or a finished dosage form or formulation thereof and is for human use. A pharmaceutical composition or pharmaceutical preparation is typically produced under good manufacturing practices (GMP) conditions. Pharmaceutical compositions or preparations may be sterile or non-sterile. If non-sterile, such pharmaceutical compositions or preparations typically meet the microbiological specifications and criteria for non-sterile pharmaceutical products as described in the U.S. Pharmacopeia (USP) or European Pharmacopoeia (EP). Pharmaceutical compositions may further comprise or may be co-administered with additional active agents, such as, e.g. additional therapeutic agents. Pharmaceutical compositions may also comprise e.g. additional therapeutic agents, polyphenols, prebiotic substances, probiotic bacteria, pharmaceutically acceptable excipients, solvents, carriers or any combination thereof. Any glycan polymers described herein may be formulated as a pharmaceutical composition.

"Synthetic" as used herein refers to a man-made compound or preparation, such as a glycan polymer preparation, that is not naturally occurring. In one embodiment, the catalyst described herein is used to synthesize the glycans of the preparation under suitable reaction conditions, e.g. by a polymerization reaction that creates glycan oligomers and polymers from individual glycan units that are added to the reaction. In some embodiments, the polymeric catalyst acts as a hydrolysis agent and can break glycosidic bonds. In other embodiments, the polymer catalyst can form glycosidic bonds. Synthetic glycan polymer preparations may also include glycan polymers that are not isolated from a natural oligo- or polysaccharide source. It is to be understood that while the glycan polymer preparation is not isolated from a natural oligo- or polysaccharide source, the glycan units making up the glycan polymers can be and often are isolated from natural oligo- or polysaccharide sources, including those listed herein, or are synthesized de novo.

All publications, patents, and patent applications cited or referenced in this specification are herein incorporated by reference to the same extent as if each independent publication or patent publication was specifically and individually indicated to be incorporated by reference.

EXAMPLES

The invention is further illustrated by the following examples. The examples are provided for illustrative purposes only, and are not to be construed as limiting the scope or content of the invention in any way. The practice of the present invention will employ, unless otherwise indicated, conventional methods of protein chemistry, biochemistry, recombinant DNA techniques and pharmacology, within the skill of the art. Such techniques are explained fully in the literature. See, e.g., T. E. Creighton, Proteins: Structures and Molecular Properties (W.H. Freeman and Company, 1993); Green & Sambrook et al., Molecular Cloning: A Laboratory Manual, 4th Edition (Cold Spring Harbor Laboratory Press, 2012); Colowick & Kaplan, Methods In Enzymology (Academic Press); Remington: The Science and Practice of Pharmacy, 22nd Edition (Pharmaceutical Press, 2012);

Sundberg & Carey, Advanced Organic Chemistry: Parts A and B, 5th Edition (Springer, 2007).

Example 1. Glycan Polymer Preparations

To a round bottom flask equipped with an overhead stirrer and a jacketed short-path condenser was added one or more mono- or disaccharides along with 3-20% by dry weight of one or more of the catalysts e.g. acid, ionic, ionic/acid containing catalysts such as, e.g. described in U.S. Pat. No. 9,079,171 (e.g., a catalyst in columns 13-19 or Examples 1-70 in U.S. Pat. No. 9,079,171) and WO 2016/007778, which are incorporated herein by reference in their entirety, or a catalyst described herein. Water or another compatible solvent (zero to 10 equiv.) was added to the dry mixture and the slurry was combined at approximately 100 rpm using a paddle sized to match the contours of the selected round bottom flask as closely as possible. The mixture was then heated to 80-185° C. Once the solids achieved a molten state, the vessel was placed under 10-1000 mbar vacuum pressure. The reaction was stirred for 30 minutes to 8 hours, constantly removing water from the reaction. Reaction progress was monitored by HPLC. When sufficient oligomerization had occurred, the stirrer was shut off, the reaction was cooled to room temperature and vented to atmospheric pressure, and the product, either as a solid or syrup, was dissolved in a volume of water sufficient to create a solution of approximately 50 Brix (grams sugar per 100 g solution). Once dissolution was complete, solid catalyst was removed by filtration and the oligomer solution was concentrated to approximately 50-75 Brix by rotary evaporation. In cases in which an organic solvent has been used, water immiscible solvents can be removed by biphasic extraction and water miscible solvents can be removed by rotary evaporation concomitant to the concentration step.

Among others, the following glycan polymers were made in multiple batches and tested in various assays described herein:

Single glycan unit (homo-glycans): ara100, fru100, gal100, galA100, glcNac100, glu100, gluA100, Lglu100, man100, rha100, xyl100.

Two glycan units (hetero-glycans): Ara60Xyl40, Ara80Xyl20, Gal20Ara80, Gal20Xyl80, Gal40Ara60, Gal40Man60, Gal40Xyl60, Gal57Glu43, Gal60Ara40, Gal60Man40, Gal60Xyl40, Gal80Ara20, Gal80Man20, Gal80Xyl20, Glu20Ara80, Glu20Xyl80, Glu40Ara60, Glu40Gal60, Glu40Xyl60, Glu50Gal50, Glu50Lglu50, Glu60Ara40, Glu60Gal20Man20, Glu60Gal40, Glu60Man40, Glu60Xyl40, Glu66Fru33, Glu75Gala25, Glu75GluA25, Glu75GluN25, Glu80Ara20, Glu80Gal20, Glu80Lglu20, Glu80Man20, Glu80Xyl20, Glu90LGlu10, Man20Ara80, Man20Xyl80, Man40Ara60, Man40Xyl60, Man60Ara40, Man60Glu40, Man60Xyl40, Man75Gal25, Man80Ara20, Man80Gal20, Man80Glu21, Man80Xyl20, Xyl60Ara40, Xyl75Ara25, Xyl80Ara20, and the hybrid glycans glu90sor10 and glu90gly10.

Three glycan units (hetero-glycans): Gal5Xyl5Ara90, Gal5Xyl90Ara5, Gal10Xyl10Ara80, Gal10Xyl45Ara45, Gal10Xyl80Ara10, Gal20Xyl20Ara60, Gal20Xyl40Ara40, Gal20Xyl60Ara20, Gal30Xyl30Ara40, Gal30Xyl40Ara30, Gal33Man33Ara33, Gal33Man33Xyl33, Gal33Xyl33Ara33, Gal45Xyl10Ara45, Gal45Xyl45Ara10, Gal50Glu25Fru25, Gal40Xyl20Ara40, Gal40Xyl30Ara30, Gal40Xyl40Ara20, Gal60Xyl20Ara20, Gal80Xyl10Ara10, Gal90Xyl5Ara5, Glu5Gal5Man90, Glu5Gal90Man5, Glu5Xyl5Ara90, Glu5Xyl90Ara5, Glu10Gal10Man80, Glu10Gal45Man45, Glu10Gal80Man10, Glu10Xyl10Ara80, Glu10Xyl45Ara45, Glu10Xyl80Ara10, Glu20Gal20Man60, Glu20Gal40Man40, Glu20Gal60Man20, Glu20Gal80, Glu20Xyl20Ara60, Glu20Xyl40Ara40, Glu20Xyl60Ara20, Glu30Gal30Man40, Glu30Gal40Man30, Glu30Xyl30Ara40, Glu30Xyl40Ara30, Glu33Gal33Ara33, Glu33Gal33Fuc33, Glu33Gal33Man33, Glu33Gal33Xyl33, Glu33Man33Ara33, Glu33Man33Xyl33, Glu33Xyl33Ara33, Glu40Gal20Man40, Glu40Gal30Man30, Glu40Gal40Man20, Glu40Xyl20Ara40, Glu40Xyl30Ara30, Glu40Xyl40Ara20, Glu45Gal10Man45, Glu45Gal45Man10, Glu45Xyl10Ara45, Glu45Xyl45Ara10, Glu60Xyl20Ara20, Glu75GluNAc25, Glu80Gal10Man10, Glu80Xyl10Ara10, Glu90Gal5Man5, Glu90Xyl5Ara5, Man33Xyl33Ara33, Man52Glu29Gal19.

Four glycan units (hetero-glycans): Gal25Man25Xyl25Ara25, Glu25Gal25Man25Ara25, Glu25Gal25Man25Xyl25, Glu25Gal25Xyl25Ara25, Glu25Man25Xyl25Ara25.

Five glycan units (hetero-glycans): Glu20Gal20Man20Xyl20Ara20.

Glycan polymers are described by a three- to six-letter code representing the monomeric sugar component followed by a number out of one hundred reflecting the percentage of the material that monomer constitutes. Thus, 'glu100' is ascribed to a glycan polymer generated from a 100% D-glucose (glycan unit) input and 'glu50gal50' is ascribed to a glycan polymer generated from 50% D-glucose and 50% D-galactose (glycan units) input or, alternatively from a lactose dimer (glycan unit) input. As used herein: xyl=D-xylose; ara=L-arabinose; gal=D-galactose; glu=D-glucose; rha=L-rhamnose; fuc=L-fucose; man=D-mannose; sor=D-sorbitol; gly=D-glycerol; neu=NAc-neuraminic acid; Lglu=L-glucose; gluA=D-glucuronic acid; gluN=D-glucosamine; gluNAc=N-acetyl-D-glucosamine; galA=D-galacturonic acid.

Example 2. Purification of Glycan Polymer Preparations

Glycan polymer were dissolved in deionized water to a final concentration of 25-50 Brix. The material was then exposed to at least 2 mass equivalents of Dowex Monosphere 88 ion exchange resin. Exposure may occur by swirling in a flask at 120-170 rpm or by filtration through a wet slurry packed column as long as the residence time is sufficient for the solution to achieve a final pH between 3 and 5. The oligomer solution was isolated by filtration (as in the case of swirled reactions) or elution (as in the case of column filtration) or centrifuge isolation and the process was repeated with Dowex Monosphere 77 ion exchange resin in an analogous fashion until the solution pH was above 5.5. Finally, the solution was exposed to Dowex Optipore SD-2 Adsorbent decolorizing resin until the solution was sufficiently clarified and filtered through a 0.2 micron filter to remove residual resin and resin fines. The final solution was then concentrated to 50-85 Brix by rotary evaporation or to a solid by lyophilization.

Example 3. High-Throughput Preparation at Small Scale

The glycan polymer preparations were synthesized in a parallel fashion in 24-, 48-, or 96-well plates or similarly sized arrays of 1 dram vials housed in aluminum heating blocks. In this example, all liquid transfers were handled by a programmable robot or manually using calibrated pipettes.

To each vial or well was added 20-100% by dry weight of one or more catalysts e.g. acid, ionic, ionic/acid containing catalysts such as, e.g. described in U.S. Pat. No. 9,079,171 and WO 2016/007778, or in Table 11. The plate or heating block was placed uncovered in a vacuum oven heated to 50 to 150° C. under a vacuum of 10-800 mbar. The oven vacuum pump was protected by a two-stage condenser consisting of a recirculating chiller trap followed by a dry ice/acetone trap. The plates or blocks are heated for 30 minutes to 6 hours under elevated temperature and reduced pressure without stirring. After a pre-established period of time, the oven was vented to atmospheric pressure, the plates or blocks were cooled to room temperature, and each well or vial was diluted to approximately 50 Brix with deionized water. The solid-phase extraction steps described in Example 2 were performed by elution through sequential wet-packed columns in which the eluent from each column flows immediately into the top of the next column at a rate between 2 and 6 bed volumes/hour using a peristaltic pump or other suitable small pump. The column stack was then rinsed with deionized water and the combined effluents are concentrated by lyophilization to isolate solid powders with residual water content of 1-10% by mass.

Example 4. Removal of Low Molecular Weight Species

Glycan polymer preparations were modified so as to remove low molecular weight species.

In one embodiment the separation was achieved by osmotic separation. Approximately 45 cm of 1.0 kD MWCO Biotech CE dialysis tubing (31 mm flat width) from Spectrum Labs was placed into deionized water and soaked for 10 minutes, then one end was sealed with a dialysis tubing clip. A 25 Brix solution of 8 grams dry oligosaccharide was sterile filtered and sealed into the tube with a second clip along with a few mL of air to permit the tube to float. The filled tube was then placed in a 3 gallon tank of deionized water which was stirred with sufficient force to induce slow swirling of the sealed tubes. After 8 hours, the water in the tank was replaced and the tube was allowed to stir for an additional 16 hours. Once the dialysis was complete and the material had a DP2+ yield greater than 95% and a DP3+ yield greater than 90%, the dilute solution was sterile filtered and concentrated in vacuo to a final concentration of approximately 65 Brix or lyophilized to a solid with a residual moisture between 1 and 10%.

In a second embodiment the separation was achieved by tangential flow filtration (TFF). In this case, 100 mL of 25 Brix glycan sample dissolved in deionized water and sterile filtered was placed into the feed bottle of a Spectrum Labs KrosFlo Research IIi TFF system that was prepared according to the manufacturer's recommendation. The sample was then diafiltered through a 1 kD mPES MidiKros hollow-fiber filter at a transmembrane pressure of 25 psig. HPLC samples of the feed stock taken every 0.5 diafiltration volumes were used to determine when the material had a DP2+ yield greater than 95% and a DP3+ yield greater than 90% at which point the solution was sterile filtered and concentrated in vacuo to a 65 Brix syrup or lyophilized to a solid with residual water content of 1-10% by mass.

In a third embodiment the separation was achieved by ethanol precipitation. In this case, 100 mL of 25 Brix glycan sample was poured into a vigorously stirred beaker containing 900 mL of pure, USP-grade ethanol at a rate no higher than 10 mL/minute. Once the addition was complete, the precipitated solids were subjected to stirring for an additional 15 minutes at or slightly below room temperature. The precipitated solids were isolated by filtration through a fine frit sintered glass funnel under an atmosphere of nitrogen to prevent hydration and gumming. The solids were rinsed once with ethanol, then dissolved in water to a final concentration of 25 Brix and reconcentrated to >65 Brix. This syrup was then diluted back to 25 Brix and concentrated once more to ensure removal of residual ethanol.

Example 5. Methods for Analyzing Glycan Polymer Preparations

Measurement of Concentration by Liquid Refractometry

This experiment was designed to quantitate the amount of glycan polymer in any given aqueous solution. A Mettler-Toledo Refracto 30GS portable sugar refractometer was calibrated using high-purity reverse-osmosis deionized water. Several drops of the glycan polymer solution were filtered through a 0.2 micron syringe filter directly onto the lens of the refractometer. The measurement was taken at room temperature and reported as Brix. The glycan polymers were routinely concentrated to 50, 60, 70, or 75 Brix without obvious solidification or crystallization at 23° C. Brix can then be converted to solubility assuming a specific density of water equal to 1.0 g/mL. Thus, 75 Brix (100 grams of solution consisting of 75 grams of glycan polymer and 25 grams of water) equals an aqueous solubility of 3.0 g/mL. As a comparison, the aqueous solubility of D-glucose is reported to be 0.909 g/mL (48 Brix) at 25° C. by Sigma-Aldrich.

Monomeric Composition by Hydrolysis and GC-MS

This experiment was designed to quantitate the ratio of monomer content within a given polymer preparation. Glycosyl composition analysis was performed by combined gas chromatography/mass spectrometry (GC/MS) of the per-O-trimethylsilyl (TMS) derivatives of the monosaccharide methyl glycosides produced from the sample by acidic methanolysis as described previously by Santander et al. (2013) Microbiology 159:1471. Between 100 and 200 μg of sample were lyophilized into a suitable test tube. Inositol (20 μg) was added to the sample as an internal standard, then the sample was heated to 80° C. in 1M HCl/methanol for 18 hours. The resulting monosaccharides were then re-acetylated using pyridine and acetic anhydride in MeOH, and per-O-trimethylsilylated with Tri-Sil (Pierce) at 80° C. for 30 minutes. GC/MS analysis of the TMS methyl glycosides was performed on an Agilent 7890A GC interfaced to a 5975C MSD, using a Supelco Equity-1 fused silica capillary column (30 m×0.25 mm ID). Each peak was assigned to a component sugar based upon comparison to known standards and integration of the respective peaks allowed clean calculation of the relative percentage of monomers within an exemplified glycan polymer preparation. In all enumerated glycan polymer preparations, conditions can be routinely identified in which the monomer composition of a given glycan polymer matched the input ratio within experimental error and the output composition matched the input composition within the precision of the measurement.

Molecular Weight Distribution by Size-Exclusion Chromatography (SEC)

This experiment was designed to quantitate the distribution of molecular weights within a given glycan polymer preparation. The measurement was made by HPLC using the method described in Monograph of United States Pharmacopeia, 38(6) In-Process Revision: Heparin Sodium (USP37-NF32). Separations were achieved on an Agilent 1200 HPLC system via a GE superpose 12 column using 50 mM ammonium acetate as an eluent at 1.0 mL/min flow rate and an ELSD detector. The column temperature was set at 30° C. and dextran (1 kD, 5 kD, 10 kD weight) were used to draw a standard curve. 2 mg/ml solutions of the glycan polymer samples were prepared and passed through a 0.45 µm spin filter, followed by 40 µl injections into the HPLC. A third-order polynomial curve was constructed based on the logarithmic molecular weights and elution volumes of the listed standards. The weight-average molecular weight (Mw), the number average molecular weight (Mn), and the polydispersity index (PDI) for the samples were calculated by comparison to the standard curve. FIG. 1 shows the curve generated during the SEC evaluation of a glu100 sample in which the average molecular weight was determined to be 1212 g/mol or approximately DP7. The upper end of molecular weight of the material as defined by the point of the curve at 10% of maximum absorption leading the curve was determined to be 4559 g/mol or approximately DP28. The lower end of molecular weight of the material as defined by 10% of the maximum absorption trailing the curve was determined to be 200 g/mol or approximately DP1. Similar analysis of a glu50gal50 sample showed a MW, high mass, and low mass of 1195 g/mol (~DP7), 4331 g/mol (~DP27), and 221 g/mol (~DP1) respectively.

Molecular Weight Distribution by Ion-Affinity Chromatography (IAC)

The proportion of glycan with DP greater than or equal to 2 (DP2+) and 3(DP3+) may be measured by ion-affinity chromatography. A sample of glycan polymer preparation was diluted out to 50-100 mg/mL and 10 µL of this solution was injected onto an Agilent 1260 BioPure HPLC equipped with a 7.8×300 mm BioRad Aminex HPX-42A column and RI detector. Using pure HPLC-grade water as an eluent, the sample was eluted at 0.6 mL/min through an 80° C. column and an RI detector maintained at 50° C. The peaks representing DP1-6 are assigned by comparison to reference standards and integrated using the Agilent ChemStation software. Peaks are typically integrated as DP1, DP2, DP3, DP4-7, and DP8+. The DP that is achievable by the reaction described in Example 1 varies from monomer to monomer although it is consistent across batches if the procedure is followed. For example, across 17 batches of glu100, DP2+ values ranged from 77-93% and DP3+ values ranged from 80-90%. Conversely, across 6 batches of ara100, DP2+ values ranged from 63-78% and DP3+ values ranged from 48-71%. Mixtures of monomers behaved as averages of the individual components.

Alpha-/Beta-Distribution by 2D NMR

Figure 2:
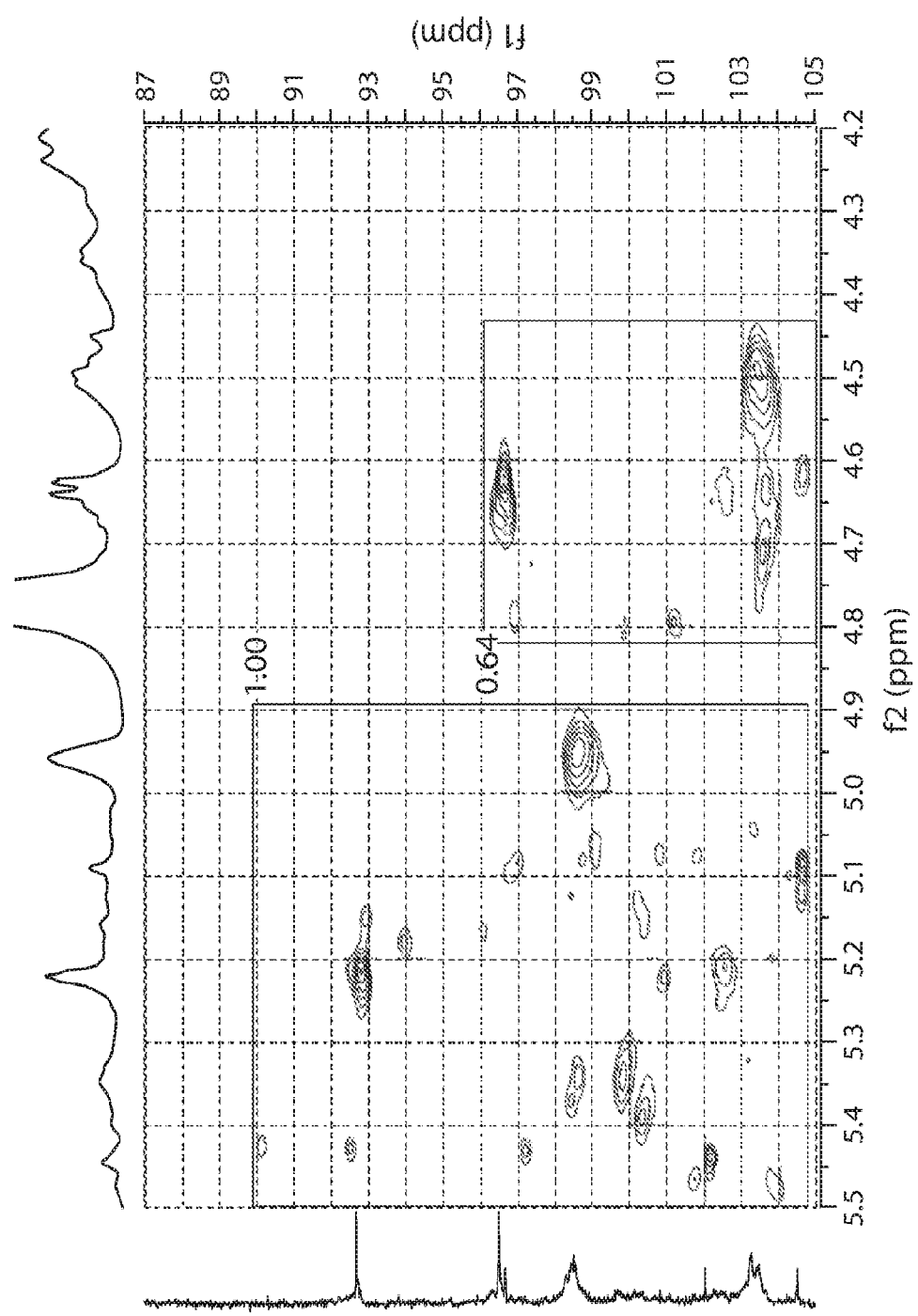
FIG. 2 depicts a representative anomeric region of an $^1$H-$^{13}$C HSQC spectrum of a glu100 sample showing the signal distribution of alpha- and beta-glycosidic bonds

This experiment was designed to quantitate the ratio of alpha- and beta-glycosidic bonds within a given sample by two-dimensional NMR. Approximately 150 mg of 65 Brix glycan polymer preparation was dried to stable mass in a vacuum oven at 45-95° C. under 400 mbar pressure. The sample was subjected to two cycles of dissolution in $D_2O$ and drying to remove residual $H_2O$. Once dried, the sample was dissolved in 750 µL $D_2O$ with 0.1% acetone, placed into a 3 mm NMR tube, and analyzed in a Bruker Avance-III operating at 500.13 MHz 1H (125.77 MHz 13C) equipped with a Bruker BBFO probe operating at 21.1° C. The sample was analyzed using a heteroatomic single quantum coherence pulse sequence (HSQC) using the standard Bruker pulse sequence. Anomeric protons between 4-6 ppm (1H) and 80-120 ppm (13C) were assigned by analogy to glucose as reported in Roslund, et al. (2008) Carbohydrate Res. 343:101-112. Spectra were referenced to the internal acetone signal: 1H—2.22 ppm; 13C—30.8 ppm. Isomers were quantitated by integration of their respective peaks using the MNova software package from Mestrelab Research (Santiago de Compostela, Spain). FIG. 2 shows the anomeric region of a representative spectrum. Over 300 samples have been assayed in this fashion and Table 2a lists the distribution across a sample of combinations of monomers showing the alpha-/beta-ratio to be as high as 4:1 as in the case of rha100 and as low as 1:1 as in the case of glu50gal50.

TABLE 2a

Distribution of alpha- and beta-bonds across batches and types of glycan polymers

| Glycan polymers | alpha-bonds (%) | beta-bonds (%) | alpha/beta ratio |
|---|---|---|---|
| Glu100 | 58 | 42 | 1.4 |
| | 61 | 39 | 1.6 |
| | 64 | 36 | 1.8 |
| | 64 | 36 | 1.8 |
| | 62 | 38 | 1.6 |
| | 61 | 39 | 1.6 |
| | 62 | 38 | 1.6 |
| | 63 | 37 | 1.7 |
| | 60 | 40 | 1.5 |
| | 65 | 35 | 1.9 |
| | 65 | 35 | 1.9 |
| | 60 | 40 | 1.5 |
| Gal100 | 60 | 40 | 1.5 |
| Gal33man33ara33 | 79 | 21 | 3.8 |
| | 75 | 25 | 3.0 |
| Glu50gal50 | 50 | 50 | 1.0 |
| | 56 | 44 | 1.3 |
| | 61 | 39 | 1.6 |
| | 65 | 35 | 1.9 |
| Glu33gal33fuc33 | 55 | 45 | 1.2 |
| Man100 | 57 | 43 | 1.3 |
| Man52glu29gal19 | 76 | 24 | 3.2 |
| Ara100 | 67 | 33 | 2.0 |
| Rha100 | 80 | 20 | 4.0 |
| Xyl100 | 57 | 43 | 1.3 |
| | 59 | 41 | 1.4 |
| Xyl75gal25 | 56 | 44 | 1.5 |

Identification of Composition by NMR

Figure 3A:
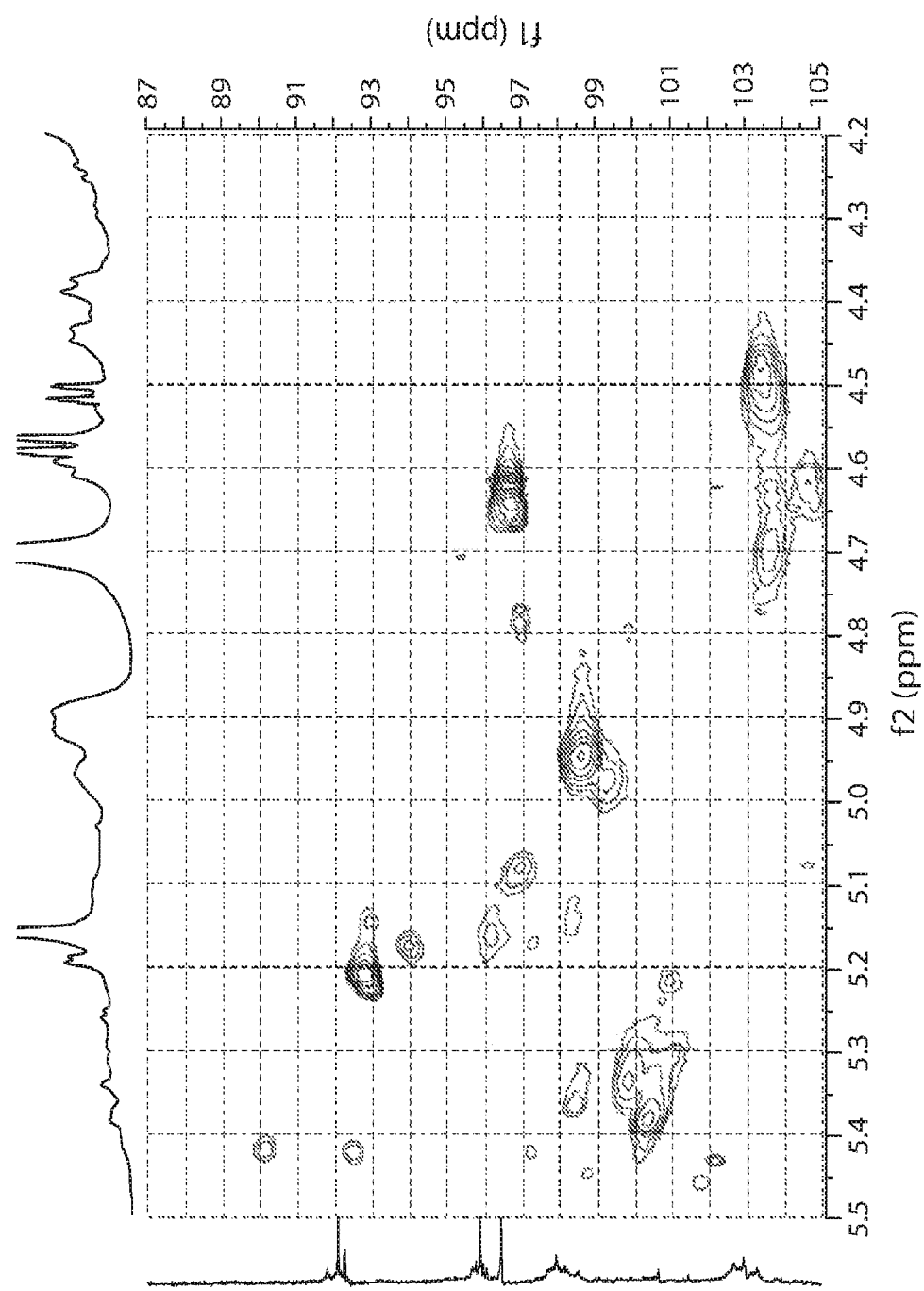
FIGS. 3A, 3B, and 3C depict representative anomeric regions of an $^1$H-$^{13}$C HSQC spectrum of glu100 (FIG. 3A), glu50gal50 (FIG. 3B), and gal100 (FIG. 3C) samples, demonstrating the additive effect of the fingerprint peaks.
Figure 3B:
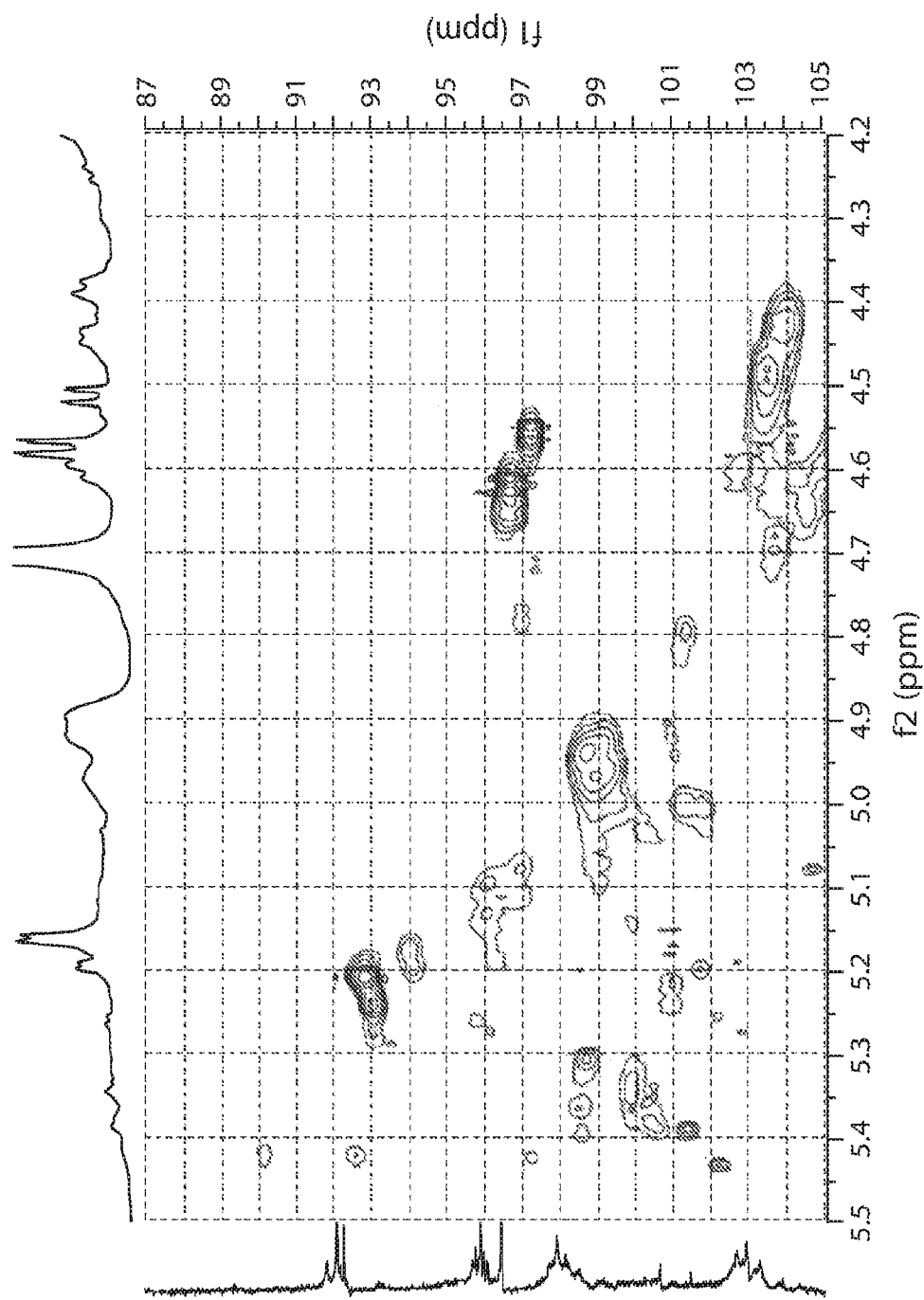
Figure 3C:
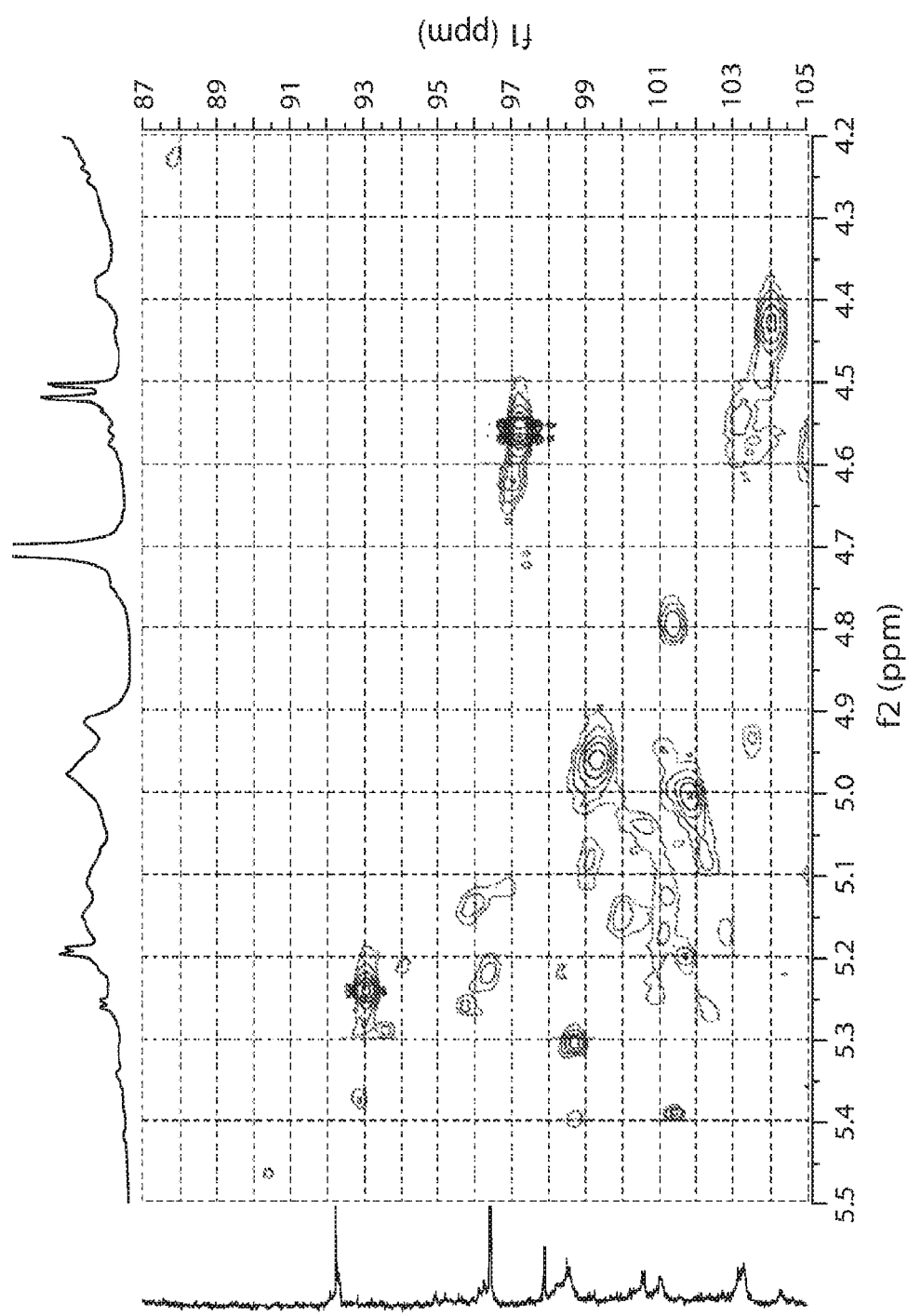
Figure 5:
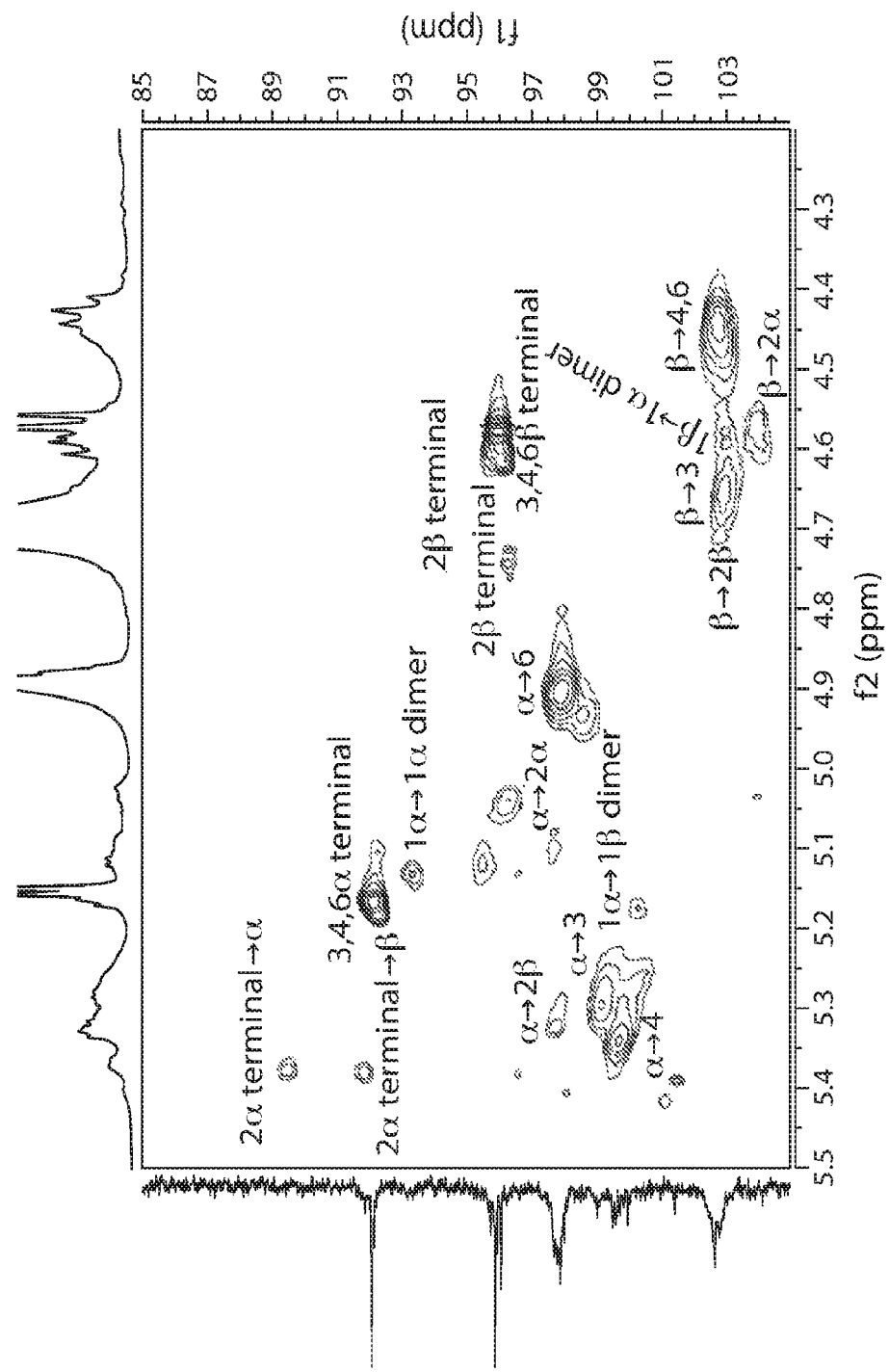
FIG. 5 depict representative partial assignments of the peaks in the anomeric region of a glu100 sample $^1$H-$^{13}$C HSQC spectrum showing the separation between alpha and beta isomers in the $^1$H axis, with alpha isomers downfield ($^1$H>4.8 ppm in this case) and beta isomers upfield ($^1$H<4.8 ppm in this case). In addition, terminal and internal sugars can be distinguished in the $^{13}$C axis with terminal sugars upfield ($^{13}$C<94 ppm for alpha and $^{13}$C<100 ppm for beta in this case) and internal sugars downfield ($^{13}$C>94 ppm for alpha and $^{13}$C>100 ppm for beta in this case).

This experiment was designed to identify the composition of a glycan polymer preparation by 2D-NMR identification of the constituent monomers. Approximately 150 mg of 65 Brix glycan polymer preparation was dried to stable mass in a vacuum oven at 45-95° C. under 400 mbar pressure. The sample was subjected to two cycles of dissolution in $D_2O$ and drying to remove residual $H_2O$. Once dried, the sample was dissolved in 750 µL $D_2O$ with 0.1% acetone, placed into a 3 mm NMR tube, and analyzed in a Bruker Avance-III operating at 500.13 MHz 1H (125.77 MHz 13C) equipped with a Bruker BBFO probe operating at 70° C. The sample was analyzed using a heteroatomic single quantum coherence pulse sequence (HSQC) using the standard Bruker pulse sequence. The anomeric region of each glycan polymer preparation spectrum derived from a single sugar monomer was then examined for peaks representing specific glycosidic bonds characteristic to that monomer. For any given glycan, the HSQC spectra allow the identification of peaks that are unique to specific regio- and stereochemical bond arrangement. For example, FIG. 5 shows a partial assignment of the spectra of a glu100 preparation demonstrating how these peaks may be used to identify specific glycosidic regio- and stereo-chemistries. Due to the spin-isolated nature of single carbohydrate rings within polysaccharides, the HSQC spectra of a glycan with more than one monomer is predicted to be represented by the sum of the HSQC peaks of each of its constituent sugars. Therefore, each constituent monomer has unique HSQC peaks that will appear in any glycan polymer that contains that monomer irrespective of other constituent monomers and furthermore, the monomers used to synthesize a glycan polymer preparation can be determined by identifying the fingerprint peaks unique to each constituent monomer. For example, FIG. 3B shows that the HSQC spectra of glu50gal50 is a hybrid of the spectra of glu100 (FIG. 3A) and gal100 (FIG. 3C). Table 2b lists the fingerprint peaks for selected glycan units.

TABLE 2b

Diagnostic HSQC peaks for each component sugar.

| Monomer | 1H shift | 13C shift |
|---|---|---|
| Glucose | 5.42 | 92.5 |
|  | 5.21 | 92.8 |
|  | 5.18 | 93.9 |
|  | 5.08 | 97.0 |
|  | 5.36 | 98.4 |
|  | 5.34 | 99.8 |
|  | 5.38 | 100.3 |
|  | 4.95 | 98.6 |
|  | 4.62 | 96.6 |
|  | 4.70 | 103.6 |
|  | 4.49 | 103.4 |
| Galactose | 5.37 | 92.9 |
|  | 5.24 | 93.1 |
|  | 5.14 | 96.0 |
|  | 4.96 | 99.3 |
|  | 5.31 | 98.7 |
|  | 5.39 | 101.4 |
|  | 5.00 | 101.8 |
|  | 4.80 | 101.3 |
|  | 4.63 | 97.0 |
|  | 4.56 | 97.2 |
|  | 4.53 | 103.1 |
|  | 4.43 | 104.1 |
| Fucose | 5.18 | 92.9 |
|  | 5.33 | 92.4 |
|  | 5.04 | 96.3 |
|  | 4.90 | 99.7 |
|  | 4.52 | 97.0 |
|  | 4.39 | 103.6 |
| Mannose | 5.37 | 93.0 |
|  | 5.16 | 94.6 |
|  | 4.88 | 94.2 |
|  | 5.39 | 101.7 |
|  | 5.24 | 101.9 |
|  | 5.13 | 102.8 |
|  | 5.03 | 102.7 |
|  | 5.24 | 105.6 |
|  | 5.09 | 108.0 |
|  | 4.88 | 94.2 |
|  | 4.89 | 100.0 |
|  | 4.70 | 101.1 |
| Xylose | 5.18 | 93.0 |
|  | 5.10 | 94.3 |
|  | 5.34 | 98.2 |
|  | 5.31 | 99.6 |
|  | 5.11 | 100.8 |
|  | 4.91 | 99.4 |
|  | 4.56 | 97.3 |
|  | 4.64 | 104.2 |
|  | 4.54 | 103.4 |
|  | 4.44 | 102.6 |
|  | 4.44 | 104.1 |
| Arabinose | 5.22 | 93.2 |
|  | 5.13 | 93.2 |
|  | 5.29 | 96.0 |
|  | 5.26 | 97.2 |
|  | 5.12 | 96.6 |
|  | 5.18 | 99.6 |
|  | 5.06 | 99.2 |
|  | 4.99 | 100.0 |
|  | 5.26 | 101.9 |
|  | 5.06 | 102.1 |
|  | 4.55 | 97.4 |
|  | 4.54 | 105.2 |
|  | 4.50 | 105.5 |
|  | 4.38 | 103.9 |

TABLE 2b-continued

Diagnostic HSQC peaks for each component sugar.

| Monomer | 1H shift | 13C shift |
|---|---|---|
| Rhamnose | 5.21 | 93.2 |
|  | 5.10 | 94.5 |
|  | 4.85 | 94.1 |
|  | 5.01 | 95.8 |
|  | 5.35 | 100.5 |
|  | 5.15 | 102.2 |
|  | 5.04 | 102.9 |
|  | 4.78 | 97.9 |
|  | 4.71 | 99.0 |
|  | 4.72 | 101.0 |

At least 5 peaks appeared for each glycan unit used as a starting material in the synthesis of glycan polymers containing 3 or fewer distinct glycan units. The HSQC spectra of glycans containing 4 or more distinct glycan units have at least 4 peaks for each constituent glycan unit.

Figure 6A:
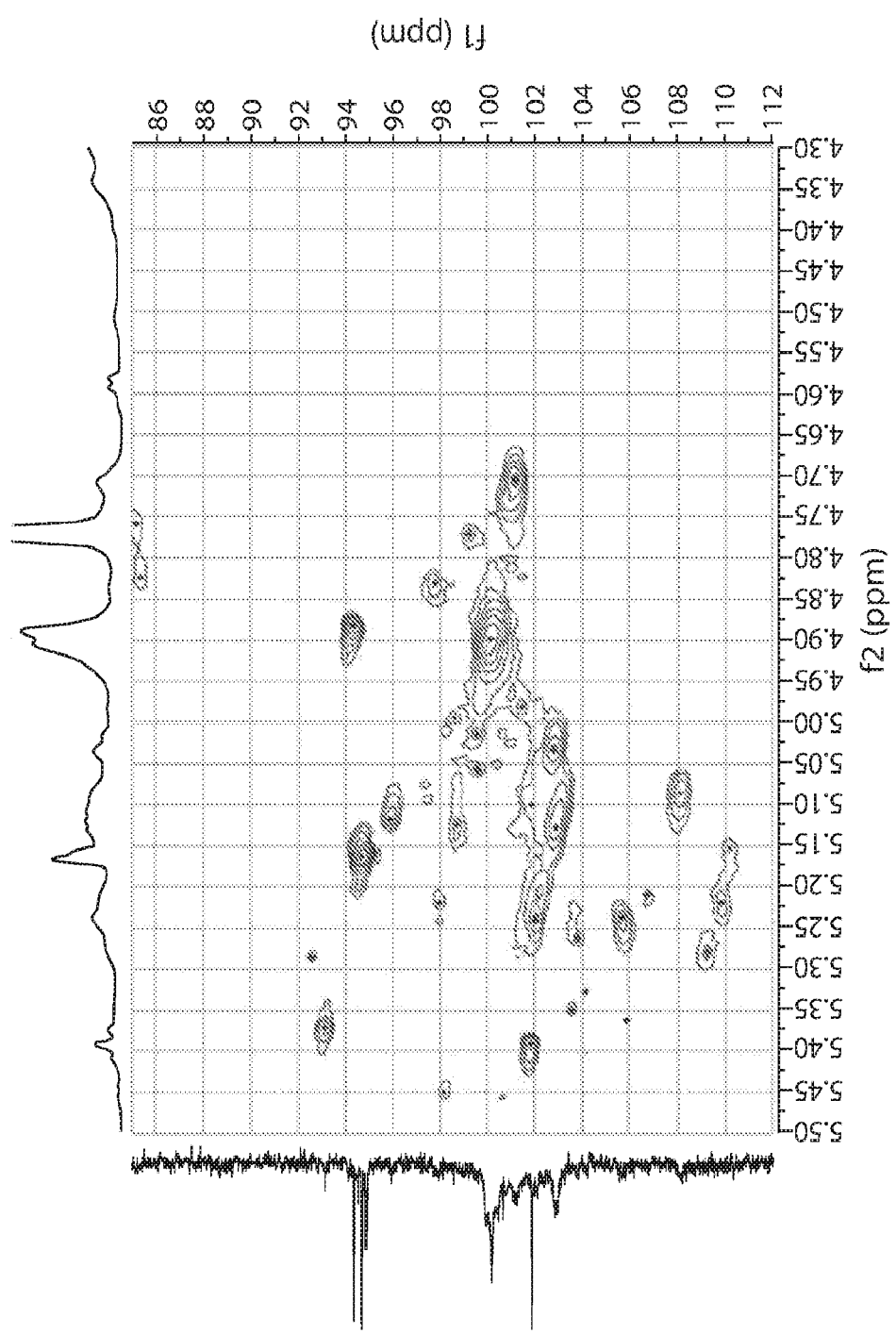
FIG. 6A depicts an Anomeric region of the 1H-13C HSQC spectrum of man100.
Figure 6B:
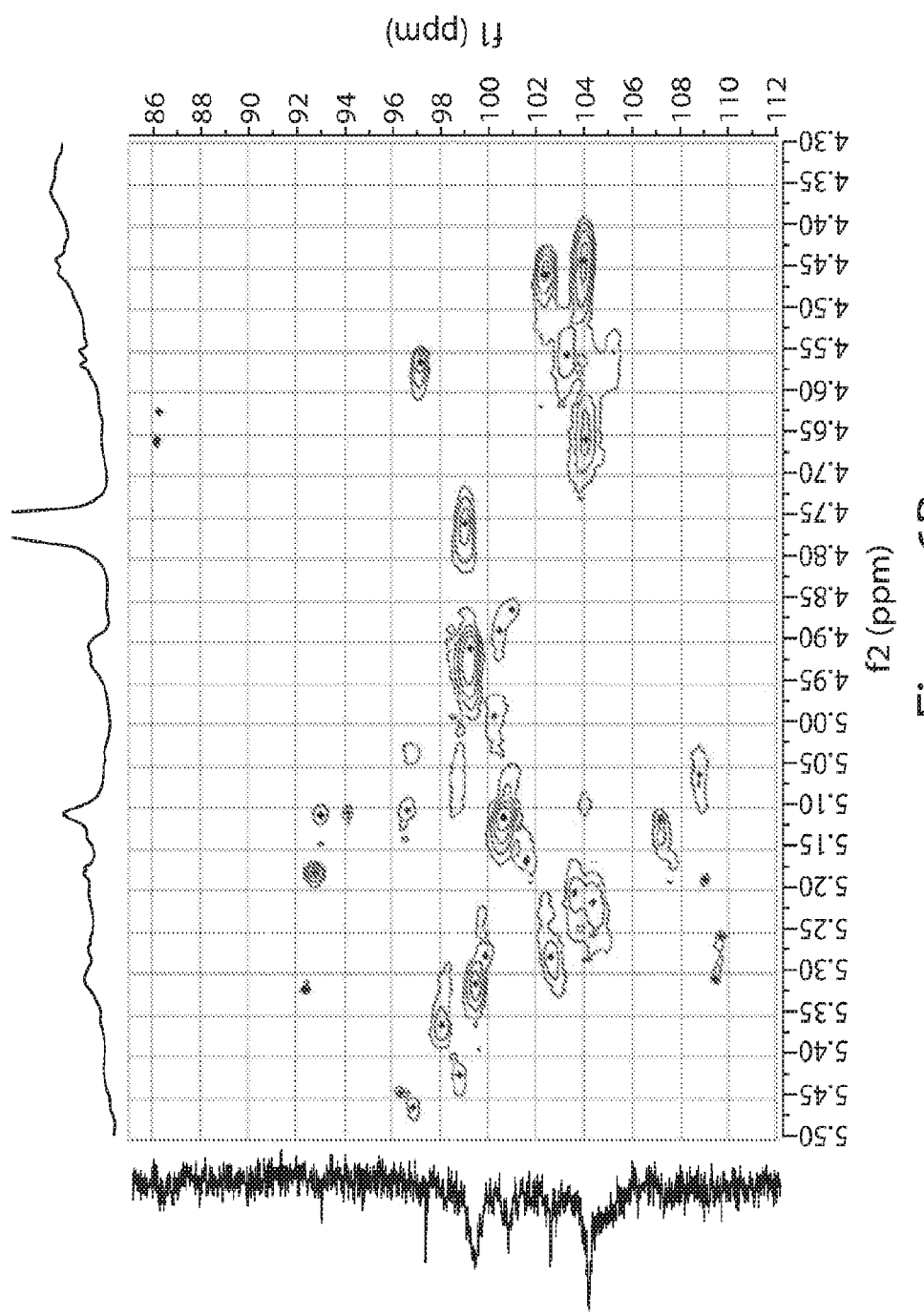
FIG. 6B depicts an anomeric region of the 1H-13C HSQC spectrum of xyl100.

FIGS. 6a and 6b show the HSQC spectra for man100 and xyl100, respectively.

Glycosidic Linkage Analysis

Figure 4A:
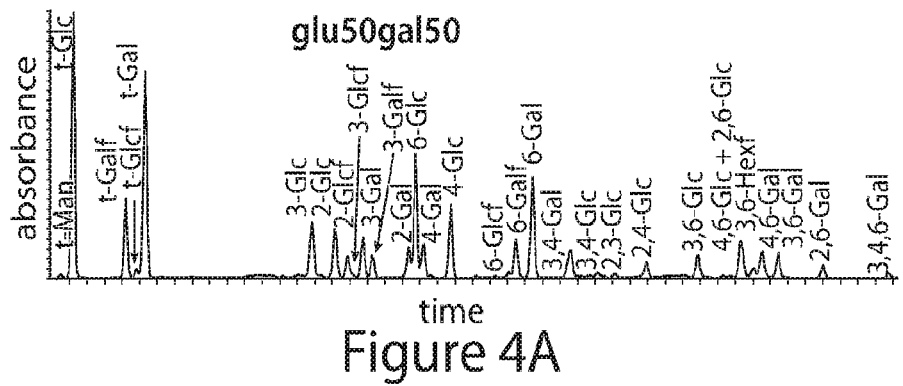
FIGS. 4A, 4B, and 4C depict representative GC chromatograms of three representative permethylated and hydrolyzed glycans, glu50gal50 (FIG. 4A), man52glu29gal19 (FIG. 4B), and glu100 (FIG. 4C), showing distribution of regiochemistry as assigned by comparison to known standards.
Figure 4B:
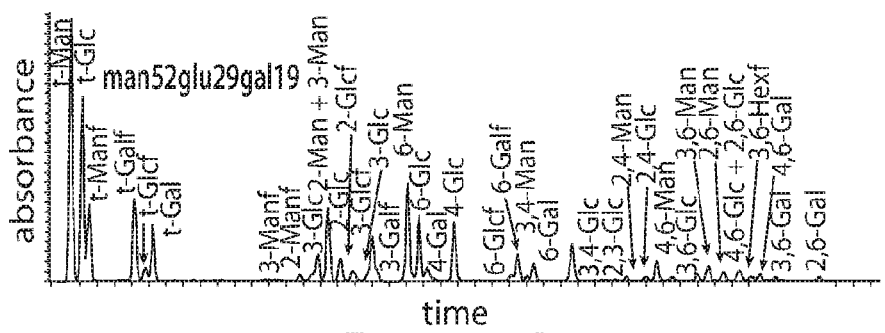
Figure 4C:
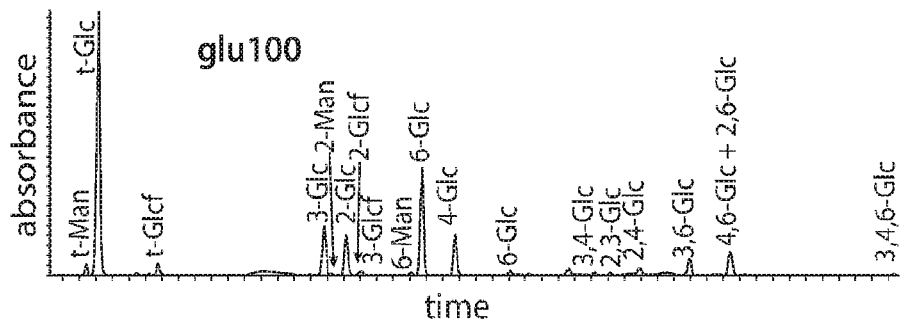

This experiment was designed to quantitate the distribution of glycosidic regioisomers (branching) within a given glycan polymer preparation. For glycosyl linkage analysis, the samples were permethylated, depolymerized, reduced, and acetylated; and the resultant partially methylated alditol acetates (PMAAs) analyzed by gas chromatography-mass spectrometry (GC-MS) as described by Heiss et al (2009) Carbohydr. Res. 344:915. The samples were suspended in 200 μl of dimethyl sulfoxide and left to stir for 1 day. Permethylation was affected by two rounds of treatment with sodium hydroxide (15 min) and methyl iodide (45 min). The aqueous solution was hydrolyzed by addition of 2M trifluoroacetic acid and heating to 121° C. for 2 hours. Solids were isolated in vacuo and acetylated in acetic acid/trifluoroacetic acid. The resulting PMAAs were analyzed on an Agilent 7890A GC interfaced to a 5975C MSD (mass selective detector, electron impact ionization mode); separation was performed on a 30 m Supelco SP-2331 bonded phase fused silica capillary column. FIGS. 4A-4C show three representative GC spectra from this analysis. These analyses show that the glycan polymer preparations comprise at least 0.1%, 0.2%, 0.5%, 1%, 2%, 5%, 10% or more of the 1,2-glycoside bond type, e.g. ara100=3.8%, gal100=7.2%; at least 0.1%, 0.2%, 0.5%, 1%, 2%, 5%, 10% or more of the 1,3-glycoside bond type, e.g. 3-bn-glu100=1.7%, glu50gal50=10.4%; at least 0.1%, 0.2%, 0.5%, 1%, 2%, 5%, 10% or more of the 1,4-glycoside bond type, e.g. glu50gal50=5.9%, gal33man33ara33=10.1%; and at least 0.1%, 0.2%, 0.5%, 1%, 2%, 5%, 10%, 15%, 20%, 25% or more of the 1,6-glycoside bond type, e.g. gal33man33ara33=13.4%, glu100=25.4%. The materials also contained at least 5%, 10%, 15%, 20%, 25%, 30%, 40%, 50%, or more of the branched bond types (including but not limited to 1,3,6-; 1,4,6-; or 1,2,4-glycosides, e.g. Table 3), a degree of branching (DB) of at least 0.05. Degree of branching of a glycan polymer preparation refers to the average number of branched monomers relative to total number of monomer units. For example, a glu100 glycan polymer in which 20% of the glucose monomer units contain glycosidic linkages to three or more other glucose monomers would have a DB of 0.20. The glycan polymers also have about 3-12% of the monomeric units in the furanose form. A glycan polymer preparation originating from a single monomer consisted of at least 12 distinct non-terminal substitution patterns. A glycan originating from two monomers consisted of at least 18 distinct non-terminal substitution patterns, e.g. glu-1,2-glu; glu-1,2-gal; gal-1,2-glu; gal-1,2-gal; glu-1,2(glu),6-glu; glu-1,3-glu; glu-1,3-gal; etc. A glycan polymer preparation originating from three or more monomers consisted of at least 24 distinct non-terminal substitution patterns.

TABLE 3

A sample of degree of branching (DB) measurements; sample selected from 54 different preparations characterized as described herein.

| composition | % branched monomers | |
|---|---|---|
| | highest measure | lowest measure |
| glu100 | 40.4 | 10.4 |
| glu80man20 | 16.1 | |
| glu60man40 | 16.4 | |

TABLE 3-continued

A sample of degree of branching (DB) measurements; sample selected from 54 different preparations characterized as described herein.

| composition | % branched monomers | |
|---|---|---|
| | highest measure | lowest measure |
| man80glu20 | 18.6 | |
| man60glu40 | 20.5 | |
| glu50gal50 | 22.4 | 12.6 |
| gal100 | 22.2 | |
| glu33gal33fuc33 | 41.8 | |
| ara100 | 16.6 | |
| xyl100 | 63.2 | |
| xyl75ara25 | 26.9 | |
| man52glu29gal19 | 22.7 | 9.8 |
| man100 | 40.0 | |

TABLE 4a

Exemplary glycan polymer preparations

| | total molar incidence of a bond (%) | | | | | Misc glycoside sums (%) | |
|---|---|---|---|---|---|---|---|
| Glycan | total 1,2 | total 1,3 | total 1,4 | total 1,6 | total branching | total furanose | total terminal sugars |
| Glu5Gal5Man90-2 | 19% | 15% | 22% | 43% | 25.9 | 12 | 34.9 |
| Glu10Gal10Man80-1 | 15% | 16% | 24% | 45% | 22.6 | 6.7 | 33.1 |
| Glu20Gal20Man20Xyl20Ara20-1 | 16% | 18% | 32% | 34% | 22.0 | 25.1 | 33.1 |
| Glu20Gal20Man20Xyl20Ara20-2 | 16% | 19% | 16% | 48% | 20.1 | 4.8 | 35.3 |
| Gal33Man33Ara33-8 | 17% | 26% | 23% | 34% | 25.5 | 27.5 | 32.7 |
| Gal57Glu43-1 | 4% | 7% | 73% | 16% | 2 | 2.7 | 50.9 |
| Glu100-87 | 1% | 3% | 93% | 4% | 0 | 0 | 34.7 |
| Gal57Glu43-2 | 2% | 2% | 1% | 94% | 1.3 | 1.5 | 46.6 |
| Glu50Gal50-11 | 15% | 20% | 20% | 45% | 14.8 | 12.2 | 38.3 |
| Glu50Gal50-32 | 15% | 16% | 26% | 43% | 13.1 | 17.9 | 45.2 |
| Glu50Gal50-14 | 13% | 17% | 25% | 44% | 13.5 | 22.4 | 43.3 |
| Glu50Gal50-27 | 15% | 20% | 22% | 43% | 19.5 | 9.6 | 29.5 |
| Glu50Gal50-23 | 17% | 20% | 20% | 44% | 19.2 | 17.2 | 35.5 |
| Glu50Gal50-2 | 16% | 21% | 18% | 45% | 19.4 | 15.6 | 35.5 |
| Glu100-129 | 20% | 19% | 16% | 46% | 19.1 | 5.3 | 36.3 |
| Glu100-136 | 19% | 20% | 16% | 46% | 19.6 | 4.7 | 34.8 |
| Glu100-17 | 19% | 20% | 15% | 47% | 19.7 | 3.1 | 31.6 |
| Glu100-64 | 19% | 21% | 15% | 46% | 19.6 | 3.3 | 34.6 |
| Glu100-76 | 18% | 19% | 15% | 47% | 18.5 | 3.8 | 33.4 |
| Glu100-131 | 18% | 18% | 17% | 46% | 16.4 | 7.4 | 39.2 |
| Glu100-83 | 19% | 20% | 18% | 44% | 22.2 | 8.7 | 34.5 |
| Glu100-139 | 19% | 20% | 15% | 46% | 19.4 | 4.5 | 34.5 |
| Glu100-84 | 19% | 20% | 15% | 46% | 19 | 3.5 | 32.6 |
| Glu100-74 | 19% | 19% | 17% | 45% | 22.2 | 6.7 | 27.9 |
| Glu100-98 | 19% | 19% | 18% | 45% | 18.5 | 6.9 | 36.4 |
| Glu100-141 | 18% | 24% | 16% | 41% | 40.4 | 3.7 | 16.3 |
| Glu100-29 | 19% | 18% | 16% | 46% | 19.5 | 3.8 | 30 |
| Glu100-18 | 20% | 21% | 15% | 45% | 27.5 | 3.4 | 18.9 |
| Glu100-99 | 18% | 20% | 16% | 45% | 20.1 | 6.5 | 35.4 |
| Glu100-72 | 19% | 20% | 17% | 44% | 22.2 | 6.3 | 32.2 |
| Glu100-82 | 18% | 21% | 17% | 44% | 22 | 6.4 | 30.6 |
| Glu100-130 | 18% | 21% | 17% | 44% | 21.9 | 5.2 | 32.9 |
| Glu100-78 | 18% | 20% | 17% | 44% | 21.6 | 4.5 | 32 |
| Glu100-66 | 19% | 20% | 17% | 44% | 22 | 6.6 | 31.1 |
| Glu100-89 | 18% | 19% | 16% | 48% | 18.6 | 6.7 | 35.9 |
| Glu100-133 | 17% | 18% | 18% | 46% | 20.1 | 11.1 | 35.8 |
| Glu100-68 | 18% | 19% | 17% | 46% | 18.7 | 7.4 | 36.3 |
| Glu100-90 | 19% | 20% | 16% | 45% | 16.8 | 4.2 | 38.8 |
| Glu100-94 | 19% | 19% | 14% | 47% | 17.7 | 3.1 | 35.1 |
| Glu100-5 | 19% | 19% | 14% | 48% | 16.3 | 3 | 36.6 |
| 3-Obn Glu100-1 | 14% | 5% | 31% | 50% | 34.4 | 5.5 | 22.0 |
| Gal100-30 | 16% | 19% | 24% | 41% | 17.2 | 32.6 | 30.4 |
| Glu33Gal33Fuc33-3 | 15% | 30% | 29% | 27% | 41.8 | 15.2 | 22.5 |
| Ara100-12 | 26% | 42% | 32% | NA | 16.6 | 36.7 | 23.1 |
| Xyl100-8 | 19% | 35% | 46% | NA | 63.2 | 3.8 | 0.3 |

TABLE 4a-continued

Exemplary glycan polymer preparations

| | total molar incidence of a bond (%) | | | | Misc glycoside sums (%) | | total |
|---|---|---|---|---|---|---|---|
| Glycan | total 1,2 | total 1,3 | total 1,4 | total 1,6 | total branching | total furanose | terminal sugars |
| Xyl75Ara25-3 | 25% | 32% | 43% | NA | 26.9 | 18.7 | 23.5 |
| Glu80Man20-2 | 15% | 19% | 21% | 45% | 16.1 | 4.6 | 34 |
| Glu60Man40-5 | 10% | 24% | 23% | 43% | 16.4 | 2.1 | 28.3 |
| Man80Glu20-2 | 8% | 25% | 17% | 50% | 18.6 | 1.8 | 30.9 |
| Man60Glu40-2 | 8% | 22% | 26% | 43% | 20.5 | 3.7 | 28.6 |
| Man52Glu29Gal19-2 | 12% | 19% | 27% | 42% | 51.1 | 19 | 8.4 |
| Man52Glu29Gal19-3 | 8% | 18% | 31% | 44% | 37.0 | 26.6 | 23.6 |
| Man100-17 | 12% | 27% | 25% | 36% | 19.4 | 9.5 | 40.0 |

TABLE 4b

Exemplary glycan polymer preparations

| | alpha/beta ratio by HSQC NMR | | SEC data | | | | |
|---|---|---|---|---|---|---|---|
| Glycan | % alpha | % beta | DP2+ % | Mw | Mn | PD | DPn |
| Glu5Gal5Man90-2 | 80% | 20% | 98% | 1842 | 946 | 1.95 | 11.26 |
| Glu10Gal10Man80-1 | 81% | 19% | 98.60% | 1978 | 1021 | 1.94 | 12.1 |
| Glu20Gal20Man20Xyl20Ara20-1 | 87% | 13% | 100% | 1278 | 935 | 1.37 | 7.78 |
| Glu20Gal20Man20Xyl20Ara20-2 | 63% | 37% | 100% | 1845 | 1000 | 1.85 | 11.28 |
| Gal33Man33Ara33-8 | 87% | 13% | 98% | 1527 | 834 | 1.83 | 9.31 |
| Gal57Glu43-1 | 33% | 67% | 94% | 374 | 349 | 1.07 | 2.20 |
| Glu100-87 | 69% | 31% | 100% | 416 | 399 | 1.04 | 2.46 |
| Gal57Glu43-2 | 65% | 35% | 98% | 390 | 374 | 1.04 | 2.3 |
| Glu50Gal50-11 | 64% | 36% | 91% | 1456 | 675 | 2.16 | 8.88 |
| Glu50Gal50-32 | 66% | 34% | 96% | 1114 | 790 | 1.41 | 6.77 |
| Glu50Gal50-14 | 70% | 30% | | | | | |
| Glu50Gal50-27 | 61% | 39% | 99% | 1776 | 945 | 1.88 | 10.85 |
| Glu50Gal50-23 | 71% | 29% | 99% | 1497 | 855 | 1.75 | 9.13 |
| Glu50Gal50-2 | 65% | 35% | | 1931 | 936 | 2.06 | 11.8 |
| Glu100-129 | 62% | 38% | 99% | 1712 | 1411 | 1.21 | 7.84 |
| Glu100-136 | 64% | 36% | 99% | 1834 | 1577 | 1.16 | 8.76 |
| Glu100-17 | 61% | 39% | 98% | 1797 | 1523 | 1.18 | 8.46 |
| Glu100-64 | 62% | 38% | 98% | 1871 | 1620 | 1.15 | 9.00 |
| Glu100-76 | 62% | 38% | 99% | 1702 | 1410 | 1.21 | 7.83 |
| Glu100-131 | 61% | 39% | 98% | 1520 | 1200 | 1.27 | 6.67 |
| Glu100-83 | 64% | 36% | 99% | 1849 | 1605 | 1.15 | 8.92 |
| Glu100-139 | 64% | 36% | 98% | 1819 | 1542 | 1.18 | 8.57 |
| Glu100-84 | 62% | 38% | 99% | 1726 | 1431 | 1.21 | 7.95 |
| Glu100-74 | 61% | 39% | 98% | 1697 | 1387 | 1.22 | 7.71 |
| Glu100-98 | 62% | 38% | 98% | 1690 | 1383 | 1.22 | 7.68 |
| Glu100-141 | 63% | 37% | 99% | 1898 | 1673 | 1.13 | 9.29 |
| Glu100-29 | 60% | 40% | 98% | 1624 | 1311 | 1.24 | 7.28 |
| Glu100-18 | 65% | 35% | 99% | 1946 | 1748 | 1.11 | 9.71 |
| Glu100-99 | 64% | 36% | 99% | 1876 | 1641 | 1.14 | 9.12 |
| Glu100-72 | 64% | 36% | 99% | 1929 | 1716 | 1.12 | 9.54 |
| Glu100-82 | 65% | 35% | 99% | 1927 | 1711 | 1.13 | 9.50 |
| Glu100-130 | 63% | 37% | 99% | 1967 | 1781 | 1.10 | 9.90 |
| Glu100-78 | 63% | 37% | 99% | 1926 | 1719 | 1.12 | 9.55 |
| Glu100-66 | 62% | 38% | 98% | 1763 | 1472 | 1.20 | 8.18 |
| Glu100-89 | 61% | 39% | 98% | 1638 | 1326 | 1.23 | 7.37 |
| Glu100-133 | 65% | 35% | 97% | 1567 | 1224 | 1.28 | 6.80 |
| Glu100-68 | 60% | 40% | 98% | 1701 | 1394 | 1.22 | 7.74 |
| Glu100-90 | 51% | 49% | 96% | 982 | 674 | 1.46 | 5.90 |
| Glu100-94 | 54% | 46% | 100% | 1369 | 978 | 1.40 | 8.30 |
| Glu100-5 | 57% | 43% | 100% | 1226 | 902 | 1.36 | 7.40 |
| 3-Obn Glu100-1 | 66% | 34% | 100% | 1014 | 486 | 2.09 | 6.15 |
| Gal100-30 | 74% | 26% | | | | | |
| Glu33Gal33Fuc33-3 | 65% | 35% | | | | | |
| Ara100-12 | 74% | 26% | | | | | |
| Xyl100-8 | 70% | 30% | | | | | |
| Xyl75Ara25-3 | 69% | 31% | | | | | |
| Glu80Man20-2 | 68% | 32% | | | | | |
| Glu60Man40-5 | 79% | 21% | | | | | |
| Man80Glu20-2 | 87% | 13% | | | | | |
| Man60Glu40-2 | 73% | 27% | | | | | |

TABLE 4b-continued

Exemplary glycan polymer preparations

| Glycan | alpha/beta ratio by HSQC NMR | | SEC data | | | |
|---|---|---|---|---|---|---|---|
| | % alpha | % beta | DP2+ % | Mw | Mn | PD | DPn |
| Man52Glu29Gal19-2 | 77% | 23% | | | | | |
| Man52Glu29Gal19-3 | 82% | 18% | | | | | |
| Man100-17 | 57% | 43% | | | | | |

Additional Characterizations

For the glycan polymer preparations described herein, the distribution over degree of polymerization (DP) was determined by high performance liquid chromatography (HPLC) on a Hewlett-Packard 1100 Series instrument equipped with a refractive index (RI) detector at 40° C. using a 30 cm×7.8 mm BioRad Aminex HPX-87A column at 80° C. with water at 0.4 mL/min as the mobile phase. The analytical column was protected by a silver-coordinated, sulfonated-polystyrene guard column and samples were micro-filtered using a 0.2 micron syringe filter prior to injection. The number average molecular weight (MWn) was determined as $MWn = \sum_{i=1}^{Nmax} MW_i X_i$, where MWi is the molecular weight of a carbohydrate with DP=i, Xi is the dry basis mass fraction of glycans corresponding to DP=i, and Nmax is the largest DP fraction observed in the glycan sample. The weight average molecular weight (MWw) was determined as $MWw = \sum_{i=1}^{Nmax} MW_i^2 X_i / \sum_{i=1}^{Nmax} MW_i X_i$, where MWi is the molecular weight of a carbohydrate with DP=i, Xi is the dry basis mass fraction of glycan polymers corresponding to DP=i, and Nmax is the largest DP fraction observed in the glycan polymer preparation. Polydispersity (PDI) was calculated as the ratio of MWw to MWn.

For the glycan polymer preparations described herein, the distribution over glycosidic linkages for the two batches was characterized by two-dimensional J-resolved nuclear magnetic resonance (2D-JRES NMR) spectroscopy. Spectra were obtained at room temperature at 400 MHz using deuterium oxide as the solvent with trimethylsilyl propanoic acid (TMSP-d4) as the internal reference. Prior to analysis, glycan polymer preparations were pre-exchanged by drying to constant mass under vacuum at 40 degrees Celsius and re-dissolving the resulting solid in deuterium oxide. At least two drying/re-dissolving cycles were performed for each sample. A finger-print for the glycosidic bond distribution was determined by set of peak integrals for the following peaks: (δ=5.42 ppm, J=3.55), (δ=5.05 ppm, J=3.8 Hz), (δ=4.96 ppm, J=3.73 Hz), (δ=4.68 ppm, J=8.05 Hz), (δ=4.65 ppm, J=7.99 Hz), (δ=4.52 ppm, J=7.97 Hz), (δ=4.50 ppm, J=7.92 Hz), (δ=4.37, J=8.00 Hz), (δ=4.23 ppm, J=11.48 Hz), (δ=4.14 ppm, J=11.44 Hz), (δ=3.89, J=8.96 Hz), (δ=3.76, J=0 Hz), (δ=3.61 ppm, J=9.73 Hz), (δ=3.54 ppm, J=9.89 Hz), (δ=3.50, J=9.11 Hz), (δ=3.46 ppm, J=5.75 Hz), (δ=3.41, J=9.90 Hz), (δ=3.29 ppm, J=9.47 Hz), normalized to a total of 1,000 au.

Example 6. Method for Determining the Optical Properties of Glycans

The optical rotation $[\alpha]_D$ is determined by diluting the glycan polymer preparation in optically pure water to a final concentration of 1-10 mg/mL. The optical rotation of the preparation is then measured with an automatic polarimeter to an accuracy of 0.1° and the temperature of the experiment recorded. The measurement is taken in triplicate and the values averaged across the three measurements. Given the influence of regio- and stereo-chemical distribution on the optical rotation noted in, e.g., Witczak, Z. J. Properties. In Glycoscience: Chemistry and Biology I-III; Fraser-Reid, B. O.; Tatsuta, K.; Thiem, J., Eds.; Springer-Verlag: Berlin, 2001; pp. 1445-1464, it is expected that substantially identical glycan polymer preparations have a near identical optical rotation as demonstrated, e.g., in Zahringer, U.; et al. Carbohydr. Res. 2013, 378, 63.

In a second example, the Raman Optical Activity (ROA) spectrum of a glycan polymer preparation is acquired by the techniques described, e.g., in Barron, L. D.; et al. Progress in Biophysics & Molecular Biology, 2000, 73, 1; and Barron, L. D.; Hecht, L.; Bell, A. F.; Wilson, G. Appl. Spectrosc. 1996, 50, 619 and the references contained therein. Backscattering ROA provides additional detail over standard Raman techniques as it is responsive to both the inherent chirality of a glycan polymer preparation as well as to the three-dimensional structure of the individual oligosaccharides. The glycan polymer preparation is diluted to a final concentration of 20-100 mg/mL in optically pure water and placed in the sample cell of a backscattering ROA spectrometer. The green 514.5 nm line of the argon ion laser or other suitable wavelength is used to take the measurement at ~600-700 mW power. The sample is collected over the course of a 1-24 hr experiment using a range of 0-60° C. temperature to collect dynamic aspects of the preparation. Characteristic signature peaks are extracted from the resulting data. It is expected that substantially identical glycan polymer preparations have substantially similar peak profiles from this experiment.

In a third example, the circular dichroism spectra of a glycan is acquired by the techniques described, e.g., in Gekko, K. Carbohydrate Circular Dichroism in Encyclopedia of Biophysics, Roberts, G. C. K. (Ed.), Springer-Verlag: Berlin, 2013 and Morris, E. R.; et al J. C. S. Perkin II 1975, 1418 and the references contained therein. The selected glycan polymer preparation may be diluted in optically pure deionized water to a final concentration of 1-10 mg/mL and the pH is adjusted to 7.0 using sodium hydroxide, calcium hydroxide, hydrochloric acid, sulfuric acid, or any other suitable acid or base cognizant to the fact that counter-ions can modulate the CD spectra. The CD spectra are collected using a CD spectropolarimeter maintained at a constant temperature of 25° C. The exact concentration, pH, and temperature are recorded as part of the experiment. It is expected that substantially identical glycan polymer preparations have substantially similar curve shapes from this experiment.

Example 7. Production of an Exemplary Glycan Polymer Preparation (40 kg Scale)

Figure 7:
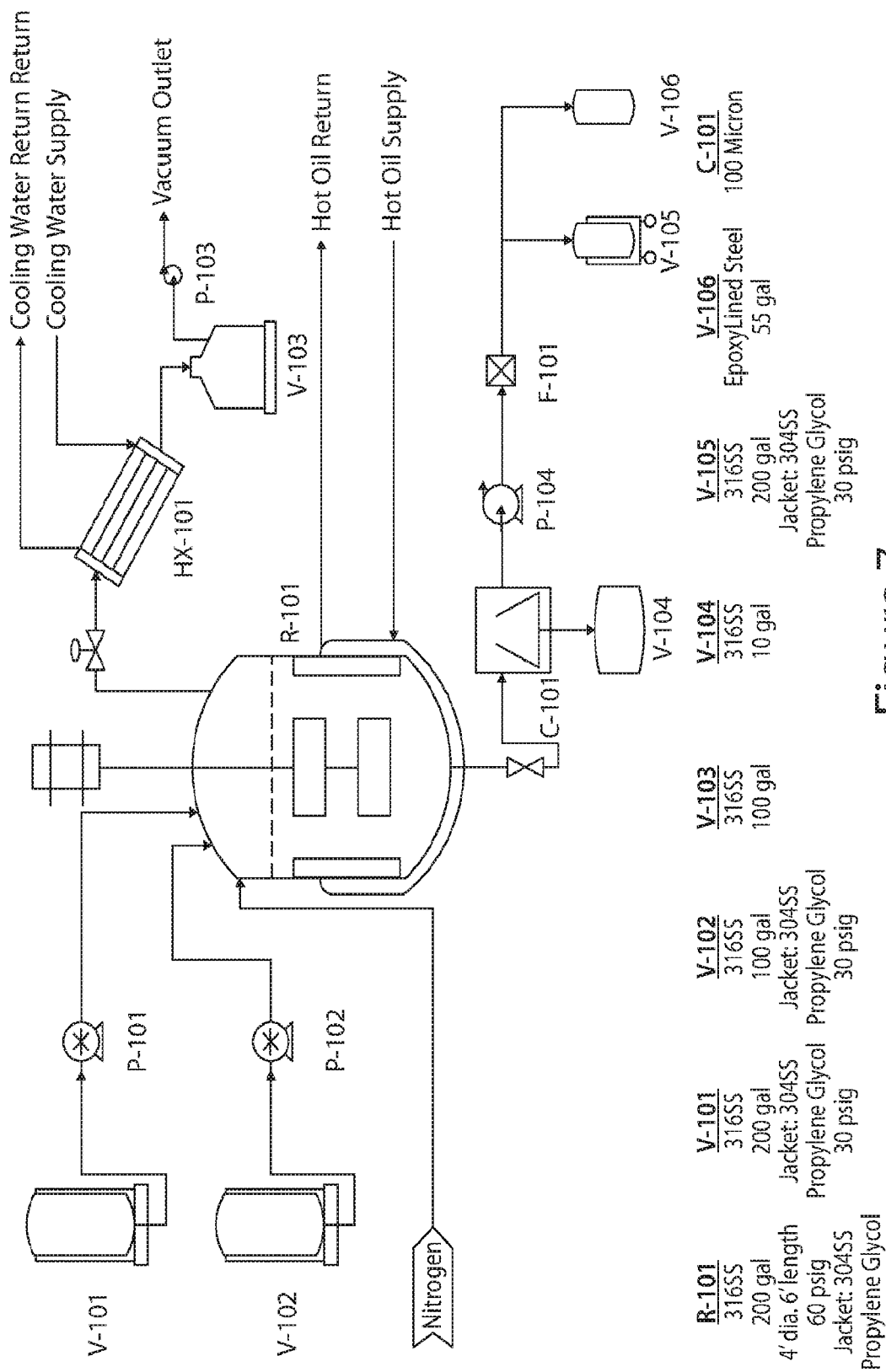
FIG. 7 depicts a schematic of an apparatus for production of a glycan polymer preparation at 500 kg/batch scale.
Figure 8:
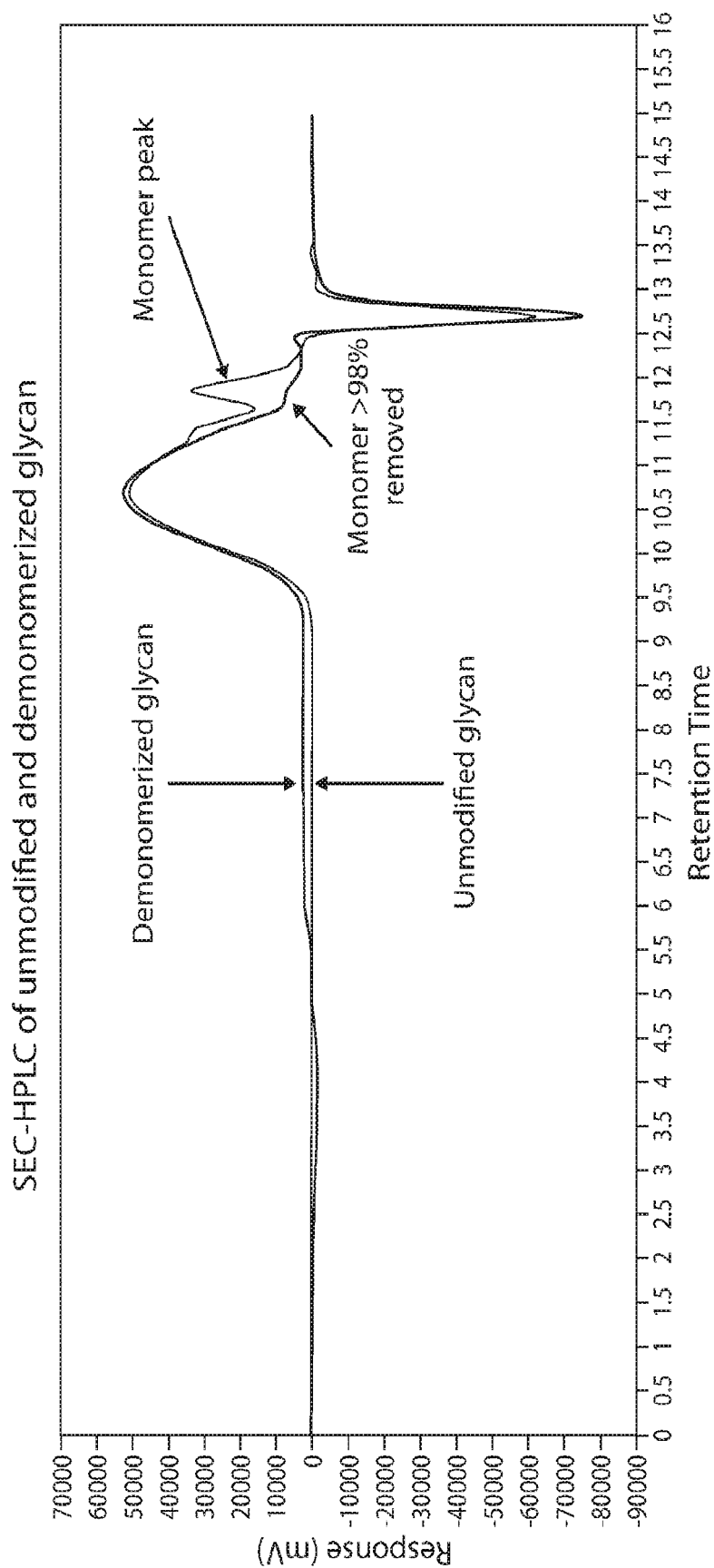
FIG. 8 depicts overlaid SEC-HPLC chromatograms of an unmodified glycan preparation and a glycan preparation that has been demonomerized by amine column flash chromatography, as described in Example 14.

The present example demonstrates the synthesis of a glycan polymer preparation comprising glucose sub-units at 40 kg scale (dry glycan polymer preparation) for two replicate batches in a 130 L horizontal-mixed reactor (see, e.g, schematic of FIG. 7). Following each batch reaction, the glycan polymer preparation was characterized to determine its corresponding DP distribution, the number average molecular weight (MWn), weight average molecular weight (MWw), polydispersity, and glycosidic linkage finger-print by 2D JRES NMR.

Preparation of the Glycan Polymer:

64.7 kg of 95DE, 70 DS (i.e., 70 wt %) corn dextrose syrup containing 1 wt % suspended solid acid catalyst (poly-styrene-co-divinylbenzene comprising >3.0 mmol/g sulfonic acid moieties and <1.0 mmol/gram cationic moieties) was charged into a steam-jacketed 130 L horizontal mixed reactor (B&P Littleford, Horizontal plough mixer, Saginaw Wis.) equipped with an overhead condenser. 155° C. steam was applied to the reactor jacket and the dextrose syrup was gradually heated to 145° C. with continuous mixing at a mixer speed of 80 RPM. During the heating period, approximately 15 kg of water condensate was collected from the overhead condenser. Additional 95DE corn dextrose syrup at 85-90° C. was then continuously added to the reactor at a rate of about 0.5 kg syrup per minute for approximately 140 minutes. Approximately 20 kg of additional condensate was obtained during the 140 minute period. The continuous corn dextrose syrup feed was then stopped, and the reaction temperature was increased to 149° C. over a 20-40 minute period and then maintained at 149° C. for between 10-70 minutes, during which time additional condensate was collected, corresponding to an evaporation rate of approximately 8 g evolved $H_2O$ per kg input glycan unit per hour. The mixer speed was maintained at 80 RPM throughout the reaction period.

Separation of the Glycan Polymer and Catalyst

The reactor jacket was then fed with 90° C. water to gradually cool the reaction mixture to 135° C. The reactor jacket was then fed with ambient temperature water and 30 kg of 85° C. DI water was gradually added to dilute the glycan polymer preparation and cool the reactor contents to about 65° C. The catalyst was removed from the glycan polymer by discharging the reactor contents through a stainless-steel screen followed by a 10 micron filter to a storage drum, resulting in about 40 kg of glycan polymer preparation on a dry solids basis.

Characterization of Glycan Polymer Preparation:

The distribution over degree of polymerization (DP) of the product glycan polymer for each of the two batch preparations is summarized in Table 6a:

TABLE 6a

| Degree of Polymerization | Batch 1 (Example 1.1) | Batch 2 (Example 1.2) |
| --- | --- | --- |
| DP9+ (g/g) | 26.2% | 30.7% |
| DP8 (g/g) | 5.6% | 5.7% |
| DP7 (g/g) | 5.2% | 5.5% |
| DP6 (g/g) | 6.5% | 6.1% |
| DP5 (g/g) | 8.0% | 7.6% |
| DP4 (g/g) | 9.6% | 9.0% |
| DP3 (g/g) | 11.6% | 10.6% |
| DP2 (g/g) | 13.1% | 11.8% |
| DP1 (g/g) | 14.2% | 13.0% | from which the number average molecular weight (MWn), weight average molecular weight (MWw) and polydispersity were determined to be:

TABLE 6b

| MW Statistics | Batch 1 (Example 1.1) | Batch 2 (Example 1.2) |
| --- | --- | --- |
| MWn (g/mol) | 1014 | 1090 |
| MWw (g/mol) | 1541 | 1610 |
| DPn | 5.63 | 6.05 |

The glycosidic linkage distributions for each batch were characterized by J-RES NMR to have the NMR peak integrals (normalized to a total of 1,000 au) of Table 7:

TABLE 7

| 1H δ (ppm) | Batch 1 (Example 1.1) | Batch 2 (Example 1.2) |
| --- | --- | --- |
| 5.423 | 13 | 11 |
| 5.046 | 10 | 8 |
| 4.960 | 23 | 23 |
| 4.680 | 3 | 3 |
| 4.649 | 121 | 109 |
| 4.520 | 3 | 2 |
| 4.503 | 29 | 33 |
| 4.370 | 6 | 6 |
| 4.227 | 21 | 21 |
| 4.140 | 27 | 29 |
| 3.890 | 98 | 87 |
| 3.760 | 165 | 187 |
| 3.610 | 36 | 31 |
| 3.540 | 56 | 57 |
| 3.502 | 90 | 85 |
| 3.460 | 108 | 109 |
| 3.410 | 108 | 112 |
| 3.290 | 82 | 87 |
| Total | 1000 | 1000 |

Example 8. Production of an Exemplary Glycan Polymer Preparation (300 kg Scale)

The present example demonstrates the synthesis of a glycan polymer preparation comprising glucose sub-units at 300 kg scale (dry glycan polymer preparation basis) for two replicate batches in a 750 L overhead vertical mixed-tank reactor. The molecular weight and glycosidic linkage distributions of the glycan polymer preparation were controlled to pre-determined values.

Preparation of the Glycan Polymer:

The glycan polymer preparation was prepared using the an apparatus according to FIG. 7. 95DE corn dextrose syrup with an input concentration of 70 DS (i.e., 70 wt % dissolved solids) was charged into holding tank V-101 (200 gallon, jacketed 304 stainless steel) and heated to 55 degrees Celsius. Distilled water was charged into holding vessel V-102 (200 gal, 304 stainless steel, jacketed). 500 kg of corn dextrose syrup (350 kg of input glycan) were pumped from V-101 via pump P-101 into reactor R-101 (200 gal. food-grade propylene glycol jacketed vessel, 4 foot diameter, 6 food depth, 316 stainless steel construction, with 4 internal baffles and equipped with a rectangular three-prop impeller mixer driven by a 10 horsepower overhead motor). 10.5 kg of solid-acid catalyst (poly-styrene-co-divinylbenzene comprising >3.0 mmol/g sulfonic acid moieties and <1.0 mmol/gram cationic moieties) were added to reactor R-101 through an overhead port to form a stirred suspension. The contents of R-101 were concentrated under vacuum by increasing the reactant temperature to 70 degrees Celsius and decreasing the reactor pressure to 2.5 psia via P-103. 124 kg of condensate were collected in vessel V-103 (100 gallon, 316 stainless steel). The reactants were then heated to 140 degrees Celsius, and then gradually ramped to 146 degrees Celsius over a five hour period while regulating the pressure to maintain 26 psia. During the reaction period, the temperature and pressure were controlled to collect an additional 28 kg of condensate (principally comprising water) in vessel V-103, corresponding to an evaporation rate of 16 g H2O/kg input glycan/hour.

Separation of the Glycan Polymer and Catalyst

The pressure in reactor R-101 was then increased to 60 psia using compressed nitrogen, and 150 kg of water was pumped from V-102 into reactor R-101 via pump P-102 to dilute the product glycan polymer to a concentration of about DS. The reactor contents were then discharged from R-101 to centrifuge C-101 equipped with a 100 micron screen to separate the catalyst from the product syrup. The catalyst was recovered in V-104 (10 gallon, 316 stainless steel) and the product syrup was collected in epoxy-lined steel 55 gallon drums for storage and further processing. A second replicate batch preparation was performed following the same procedure. Approximately 300 kg of product glycan polymer (measured on a dry solids basis) was obtained.

Characterization of Glycan Polymer Product:

The distribution over degree of polymerization (DP) of the product glycan polymer for each of the two batch preparations is summarized in Table 8a:

TABLE 8a

| Degree of Polymerization | Batch 1 (Example 8.1) | Batch 2 (Example 8.2) |
| --- | --- | --- |
| DP9+ (g/g) | 26.0% | 25.9% |
| DP8 (g/g) | 6.2% | 6.2% |
| DP7 (g/g) | 9.2% | 9.2% |
| DP6 (g/g) | 5.9% | 6.0% |
| DP5 (g/g) | 7.8% | 7.8% |
| DP4 (g/g) | 9.6% | 9.6% |
| DP3 (g/g) | 10.7% | 10.7% |
| DP2 (g/g) | 8.8% | 8.8% |
| DP1 (g/g) | 15.9% | 16.0% | from which the number average molecular weight (MWn), weight average molecular weight (MWw) and polydispersity were determined to be:

TABLE 8b

| MW Statistics | Batch 1 (Example 8.1) | Batch 2 (Example 8.2) |
| --- | --- | --- |
| MWn (g/mol) | 1038 | 1037 |
| MWw (g/mol) | 1541 | 1540 |
| DPn | 5.77 | 5.76 |

The glycosidic linkage distributions for each batch were characterized by J-RES NMR to have the following NMR peak integrals (normalized to a total of 1,000 au) of Table 9:

TABLE 9

| 1H δ (ppm) | Batch 1 (Example 8.1) | Batch 2 (Example 8.2) |
| --- | --- | --- |
| 5.42 | 11 | 9 |
| 5.05 | 4 | 4 |
| 4.96 | 23 | 28 |
| 4.68 | 7 | 8 |
| 4.65 | 131 | 135 |
| 4.52 | 2 | 2 |
| 4.50 | 20 | 22 |
| 4.37 | 3 | 4 |
| 4.23 | 6 | 9 |
| 4.14 | 14 | 15 |
| 3.89 | 105 | 99 |
| 3.76 | 198 | 196 |
| 3.61 | 25 | 23 |
| 3.54 | 52 | 44 |
| 3.50 | 91 | 91 |
| 3.46 | 116 | 101 |
| 3.41 | 110 | 119 |
| 3.29 | 81 | 91 |
| Total | 1000 | 1000 |

Batch repeatability was demonstrated from the small variation in the DP distributions and the similarity of the glycosidic linkage finger-print for each batch. Furthermore, the DP distributions and the glycosidic linkage finger-prints achieved the pre-determined values.

Example 9. Production of an Exemplary Glycan Polymer Preparation (10 kg Scale)

The present example demonstrates the synthesis of a glycan polymer preparation comprising glucose and galactose sub-units at 10 kg scale (dry glycan polymer preparation) for two replicate batches in a 22 L horizontal-mixed reactor. Following each batch reaction, the glycan polymer preparation was characterized using a panel of chemical and microbiological assays to demonstrate that quality release criteria corresponding to heavy metal, microbial, and impurity content were achieved.

Preparation of the Glycan Polymer Preparation:

About 5 kg of food grade dextrose monohydrate and 4.5 kg of food grade galactose were charged into a 22 L horizontal plough mixer (Littleford-Day, Lexington, Ky.) equipped with a hot-oil jacket. The dextrose and galactose mixture was melted by gradually heating to a temperature of about 120° C. with continuous mixing at 30 RPM. 0.892 kg (0.450 kg on a dry solid basis) solid acid catalyst (polystyrene-co-divinylbenzene comprising >3.0 mmol/g sulfonic acid moieties and <1.0 mmol/gram cationic moieties) was then added to the reaction mixture to form a mixed suspension. The reaction temperature was gradually increased to about 140° C. at atmospheric pressure over a two hour and fifteen minute period with continuous mixing, maintained at 30 RPM. Hot de-ionized water was then gradually added to the reaction mixture at a rate of 6 mL/min until the temperature of the reactor contents decreased to 120° C., then at 150 mL/min until the temperature of the reactor contents decreased to 110° C., then at 480 mL/min until a total of 6 kg of water was added and the temperature of the reactor contents decreased below 100° C. The reactor contents were further cooled to below 85° C., after which the reactor was emptied through a 100 mesh screen to remove the solid acid catalyst from the glycan polymer preparation. Approximately 12 kg of product material were recovered.

Purification of the Glycan Polymer Preparation:

The glycan polymer preparation was further diluted to a concentration of about 35 wt % in de-ionized water and then purified by flowing through a cationic exchange resin (Dowex® Monosphere 88H) column, an anionic exchange resin (Dowex® Monosphere 77WBA) column, and a decolorizing polymer resin (Dowex® OptiPore SD-2). The resulting purified material was then concentrated to a final concentration of about 75 wt % solids by vacuum rotary evaporation to yield the purified glycan polymer preparation.

Quality Release Criteria:

The purified glycan polymer preparation was then analyzed for the twenty (20) pre-determined quality acceptance criteria of Table 10:

The procedure utilizes D(+) glucose, either as: Dextrose monohydrate (100 grams, dry solids basis) or 95DE, 70DS Corn dextrose syrup (100 grams, dry solids basis). For production using dextrose monohydrate the condenser was configured initially in a re-flux reaction configuration. For production using 70DS corn dextrose syrup, the apparatus was configured initially for distillation.

TABLE 10

| Parameter | Batch 1 (Example 9.1) | Batch 2 (Example 9.2) | Units | Acceptance Criteria | Method |
|---|---|---|---|---|---|
| pH | 4.18 | 4.81 | pH units | 4-7 | AOAC (at 10 BRIX) |
| Residue on Ignition | 0.01% | 0.00% | % m/m, dry basis | NMT 1% | FCC Appendix II |
| Sulfites (SO2) | <10 | <10 | ppm | NMT 40 | AOAC 990.28 |
| Total Solids (100-moisture) | 75.9 | 75.5 | g/100 g | NLT 70 | AOAC 925.45A |
| Lead (Pb) | <0.08 | <0.06 | mg/kg | NMT 1 | AOAC 2013.06 |
| Aerobic Plate Count | <10 | <10 | cfu/g | NMT 1000 | CMMEF Chapter 8.72 |
| Coliforms | <3 | <3 | MPN/g | NMT 100 | FDA BAM Chapter 4 |
| *Salmonella* | ND | ND | per 25 g | ND | FDA BAM Chapter 5 |
| *Escherichia coli* | <3 | <3 | MPN/g | NMT 3 | FDA BAM Chapter 4 |
| Yeast & Moulds | <10 | <10 | cfu/g | NMT 100 | AACC Method 42-50 |
| *Staphylococcus aureus* | <10 | <10 | cfu/g | NMT 10 | FDA BAM Chapter 12 |
| Spore-forming Anaerobe Mesophilic Count | <10 | <10 | cfu/g | NMT 10 | CMMEF Chapter 23 |
| Arsenic (As) | <0.029 | <0.006 | mg/kg | NMT 0.01 | AOAC 2013.06 |
| Cadmium (Cd) | <0.025 | <0.007 | mg/kg | NMT 0.01 | AOAC 2013.06 |
| Mercury | <0.029 | 0.016 | mg/kg | NMT 0.1 | AOAC 2013.06 |
| Nickel (Ni) | <0.8 | <0.093 | mg/kg | NMT 1 | AOAC 2013.06 |
| Zinc (Zn) | <1.6 | 3.35 | mg/kg | NMT 10 | AOAC 2013.06 |
| Anaerobic Plate Count | <10 | <10 | cfu/g | NMT 10 | CMMEF Chapter 6.7 |
| Moulds | <10 | <10 | cfu/g | NMT 10 | AACC Method 42-50 |
| Yeast | <10 | <10 | cfu/g | NMT 10 | AACC Method 42-50 |

Legend: Abbreviations used in table: AACC: American Association of Cereal Chemists, AOAC: Association of Analytical Communities, BAM: Bacteriological Analytical Manual, cfu: colony-forming unit, CMMEF: Compendium of Methods for the Microbiological Examination of Foods, est: estimated count, FCC: Food Chemicals Codex, FDA: U.S. Food and Drug Administration, GRAS: Generally Recognized As Safe, m/m: mass/mass,
MPN: most probable number,
ND: Not Detected,
NLT: Not Less Than,
NMT: Not more than;
n/a: not applicable Example 10: Production of a Glu100 Glycan Polymer Preparation at 100 g Scale from Dextrose Monohydrate or 70DS Corn Dextrose Syrup A procedure was developed for the synthesis of glu100 glycan polymer preparations (described in Table 4a and 4b, e.g., Glu100-94 and Glu100-5, two batches of the same glu100 preparation) at a 100 gram scale. The procedure was developed to allow for synthesis starting from either dextrose monohydrate or corn dextrose syrup, as described below. The procedure utilized a multi-neck reaction vessel with the heating mantle configured with an overhead stirrer. A probe thermocouple was disposed in the vessel through a septum, such that the probe tip sat above the stir blade and not in contact with the walls of the reaction vessel.

The procedure also used an oligomerization catalyst (Dowex Marathon C) (7 grams, dry basis) and de-ionized water for quenching.

According to the procedure, the multi-neck reaction vessel was first charged with 109.9 g dextrose monohydrate powder (or 142.9 g of 70DS 95 DE corn syrup) to provide 100 g dry glucose to the reaction.

The temperature controller was set to 130° C., and stirring of the contents of the vessel was initiated to promote uniform heat transfer and melting of the sugar solids, as the temperature of the syrup was brought to approximately 130° C., under ambient (atmospheric) pressure.

When starting with dextrose monohydrate, once at approximately 130° C., the condenser reflux system was switched to a distillation configuration.

Next, the vessel was charged with 7 grams (dry solids basis) of catalyst to generate the reaction mixture. In some cases, the catalyst was handled in wet form, e.g., at a nominal moisture content of 45-50 wt % $H_2O$. The exact catalyst moisture content was generally determined on a per-experiment basis using, for example, using a moisture analyzing balance (e.g., Mettler-Toledo MJ-33).

Upon addition of the catalyst, the system was maintained at approximately 130° C. under continuous mixing for about 4 hours, determined by following the reaction by HPLC. Next, the heat was turned off while maintaining constant stirring.

The reaction was then quenched by slowly adding approximately 60 ml of hot (~80° C.) deionized (DI) water to dilute and cool the product mixture, to target a final concentration of 70 wt % dissolved solids. Generally, the water addition rate was performed to control the mixture viscosity as the glycan polymer preparation was cooled and diluted.

Following dilution, the glycan polymer preparation was cooled to approximately 60° C. The catalyst was then removed by vacuum filtration through a 100 micron mesh screen or fritted-glass filter, to obtain the final glycan polymer preparation.

Example 11: Production of Glycan Polymer Preparations at 10 kg Scale from Dextrose Monohydrate The present example demonstrates the synthesis of glu100 glycan polymer preparations (described in Table 4a and 4b, e.g., Glu100-94 and Glu100-5, two batches of the same glu100 preparation) at 10 kg scale in a 22 L horizontal-mixed reactor.

About 10 kg of food grade dextrose monohydrate was charged into a 22 L horizontal plough mixer (Littleford-Day, Lexington, Ky.) equipped with a hot-oil jacket. The dextrose was melted by gradually heating to a temperature of about 120° C. with continuous mixing at 30 RPM. 1.27 kg (0.70 kg on a dry solid basis) solid acid catalyst (poly-styrene-co-divinylbenzene comprising >3.0 mmol/g sulfonic acid moieties and <1.0 mmol/gram cationic moieties) was then added to the reaction mixture to form a mixed suspension. The reaction temperature was gradually increased to about 130° C. at atmospheric pressure over a three hour period with continuous mixing, maintained at 30 RPM. The reaction was maintained at temperature of 130° C. for seven hours. Hot de-ionized water was then gradually added to the reaction mixture at a rate of 6 mL/min until the temperature of the reactor contents decreased to 120° C., then at 150 mL/min until the temperature of the reactor contents decreased to 110° C., then at 480 mL/min until a total of 6 kg of water was added and the temperature of the reactor contents decreased below 100° C. The reactor contents were further cooled to below 85° C., after which the reactor was emptied through a 100 mesh screen to remove the solid acid catalyst from the glycan polymer preparation. Approximately 12 kg of product material were recovered.

The glycan polymer preparation was further diluted to a concentration of about 35 wt % in de-ionized water and then purified by flowing through a cationic exchange resin (Dowex® Monosphere 88H) column, an anionic exchange resin (Dowex® Monosphere 77WBA) column, and a decolorizing polymer resin (Dowex® OptiPore SD-2). The resulting purified material was then concentrated to a final concentration of about 75 wt % solids by vacuum rotary evaporation to yield the purified glycan polymer preparation.

Example 12: Production of Glycan Polymer Preparations at 10 kg Scale from Dextrose Monohydrate and Galactose To a reaction vessel (22 L Littleford-Day horizontal plow mixer) was added 5 kg of dextrose monohydrate, 4.5 kg of galactose and 0.892 kg (0.450 kg on a dry solid basis) solid acid catalyst (poly-styrene-co-divinylbenzene comprising >3.0 mmol/g sulfonic acid moieties and <1.0 mmol/gram cationic moieties). The contents were agitated at approximately 30 RPM and the vessel temperature was gradually increased over a two hour period to about 130° C. at atmospheric pressure. The mixture was maintained at temperature for one hour, after which the heating was stopped and pre-heated water was gradually added to the reaction mixture at a rate of 6 mL/min until the temperature of the reactor contents decreased to 120° C., then at 150 mL/min until the temperature of the reactor contents decreased to 110° C., then at 480 mL/min until a total of 6 kg of water was added and the temperature of the reactor contents decreased below 100° C. The reaction mixture was drained from the vessel and the solids were removed by filtration, resulting in 12 kg of product material as a syrup.

The glycan composition was further diluted to a concentration of about 35 wt % in de-ionized water and then purified by flowing through a cationic exchange resin (Dowex® Monosphere 88H) column, an anionic exchange resin (Dowex® Monosphere 77WBA) column, and a decolorizing polymer resin (Dowex® OptiPore SD-2). The resulting purified material was then concentrated to a final concentration of about 75 wt % solids by vacuum rotary evaporation to yield the purified glycan composition.

Example 13: Production of Glycan Polymer Preparations at 10 kg Scale from Dextrose Monohydrate and Galactose (e.g., Glycan Polymer Preparation glu50gal50) (10 kg Scale) with Serial Catalyst Addition The present example demonstrates the synthesis of a glycan polymer preparation comprising glucose and galactose sub-units at 10 kg scale (dry glycan polymer preparation) for two replicate batches in a 22 L horizontal-mixed reactor.

About 5 kg of food grade dextrose monohydrate and 4.5 kg of food grade galactose were charged into a 22 L horizontal plough mixer (Littleford-Day, Lexington, Ky.) equipped with a hot-oil jacket. The dextrose and galactose mixture was melted by gradually heating to a temperature of about 120° C. with continuous mixing at 30 RPM. 0.892 kg (0.450 kg on a dry solid basis) solid acid catalyst (poly-styrene-co-divinylbenzene comprising >3.0 mmol/g sulfonic acid moieties and <1.0 mmol/gram cationic moieties) was then added to the reaction mixture to form a mixed suspension. The reaction temperature was gradually increased to about 130° C. at atmospheric pressure over a two hour period with continuous mixing at 30 RPM. Preheated water was then gradually added to the reaction mixture at a rate of 6 mL/min until the temperature of the reactor contents decreased to 120° C., then at 150 mL/min until the temperature of the reactor contents decreased to 110° C., then at 480 mL/min until a total of 6 kg of water was added and the temperature of the reactor contents decreased below 100° C. The reactor contents were further cooled to below 85° C., and filtered to remove the solid acid catalyst from the glycan polymer preparation. Approximately 12 kg of product material were recovered.

The glycan polymer preparation was further diluted to a concentration of about 35 wt % in de-ionized water and then purified by flowing through a cationic exchange resin (Dowex® Monosphere 88H) column, an anionic exchange resin (Dowex® Monosphere 77WBA) column, and a decolorizing polymer resin (Dowex® OptiPore SD-2). The resulting purified material was then concentrated to a final concentration of about 75 wt % solids to yield the purified glycan polymer preparation.

Example 14: De-Monomerization Procedure

In one example, the glycan polymer preparation was concentrated on a rotatory evaporator to approximately 50 Brix as measured by a Brix refractometer. The resulting syrup (200 mg) was loaded onto a Teledyne ISCO RediSep Rf Gold Amine column (11 grams stationary phase) using a luer-tip syringe. Other similar columns such as the Biotage SNAP KP-NH Cartridges may also be used. The sample was purified on a Biotage Isolera equipped with an ELSD detector using a 20/80 to 50/50 (v/v) deionized water/ACN mobile phase gradient over 55 column volumes. Other flash chromatography systems such as the Teledyne ISCO Rf may also be used. The flow rate was set in accordance with the manufacturer's specifications for the column and system. After the monomer fraction completely eluted at ~20 column volumes, the mobile phase was set to 100% water until the remainder of the glycan eluted and was collected. The non-monomer containing fractions were concentrated by rotary evaporation to afford the de-monomerized product.

EQUIVALENTS AND SCOPE

This application refers to various issued patents, published patent applications, journal articles, and other publications, all of which are incorporated herein by reference. If there is a conflict between any of the incorporated references and the instant specification, the specification shall control. In addition, any particular embodiment of the present invention that falls within the prior art may be explicitly excluded from any one or more of the claims. Because such embodiments are deemed to be known to one of ordinary skill in the art, they may be excluded even if the exclusion is not set forth explicitly herein. Any particular embodiment of the invention can be excluded from any claim, for any reason, whether or not related to the existence of prior art.

Those skilled in the art will recognize or be able to ascertain using no more than routine experimentation many equivalents to the specific embodiments described herein. The scope of the present embodiments described herein is not intended to be limited to the above Description, Figures, or Examples but rather is as set forth in the appended claims. Those of ordinary skill in the art will appreciate that various changes and modifications to this description may be made without departing from the spirit or scope of the present invention, as defined in the following claims.

The invention claimed is:

1. A method of making a glycan polymer preparation having a mean degree of polymerization (DP) of at least 3 comprising:
    A) providing a reaction mixture comprising:
        i) one or more glycan units at an aqueous concentration of at least 0.30 kg/kg and
        ii) an effective amount of an acid catalyst to form a glycosidic bond between two glycan units;
    B) subjecting the reaction mixture of step A) to conditions that result in the evolution of $H_2O$ at a rate of at least 6 g of evolved $H_2O$/kg input glycan/hour, wherein said conditions are achieved by controlling (a) the temperature or (b) pressure of the reaction mixture or both (a) and (b),
    wherein the temperature is selected from between 100 and 160° C. at atmospheric pressure or equivalent temperature ranges at other pressures, and wherein the pressure is selected from between 0.01 and 30 psi, and quenching at least twice with water;
    C) acquiring a value for a property of the glycan polymer preparation and further processing the glycan polymer preparation if a predetermined value of the property is met, wherein the property comprises a glycan polymer preparation property chosen from: degree of branching (DB), degree of polymerization (DP), alpha- to beta glycosidic bond ratio, number of distinct glycosidic bonds, glycosidic bond distribution, or final solubility limit in water of the glycan polymer preparation, and
    D) responsive to the determination that the glycan polymer preparation meets the predetermined value for the property, formulating the glycan polymer preparation into a crystalline solid or powder and adding an excipient, anti-caking agent, or flowability agent to the glycan polymer preparation, thereby making a glycan polymer preparation with a mean DP of at least 3, wherein the mass of the glycan polymer preparation is at least 10 kg.

2. The method of claim 1, comprising separating the glycan polymer preparation from the acid catalyst.

3. The method of claim 1, further comprising:
    acquiring a value for a second property of the glycan polymer preparation and further processing the glycan polymer preparation if a predetermined value of the property is met, wherein the second property is selected from:
        the level of an impurity that alters the color or taste of the glycan polymer preparation, or
        a release or quality control criterion chosen from: pH; microbial load; or heavy metal content, and
    responsive to the determination that the glycan polymer preparation meets the predetermined value for the second property, performing one or more of:
        dividing the glycan polymer preparation into a plurality of aliquots,
        packaging the glycan polymer preparation, and
        shipping the glycan polymer preparation to a different location.

4. The method of claim 3, wherein the property comprises pH and-wherein pH of the glycan polymer preparation is from between about 2 to about 7.

5. The method of claim 3, wherein the property comprises microbial load and wherein the glycan polymer preparation comprises less than 100 cfu/g yeast and mold.

6. The method of claim 3, wherein the property comprises microbial load and wherein the glycan polymer preparation comprises an Aerobic Plate Count of less than 1000 cfu/g.

7. The method of claim 3, wherein the property comprises heavy metal content, and wherein the glycan polymer preparation comprises i)<0.1 ppm Hg, ii)<0.1 ppm or <0.01 ppm As, iii)<0.1 ppm or <0.01 ppm Cd, iv)<0.1 ppm Pb, or any combination of i), ii), iii), and iv).

8. The method of claim 1, wherein the glycan polymer preparation comprises at least two distinct glycan units.

9. The method of claim 1, wherein the glycan polymer preparation comprises at least three distinct glycan units.

10. The method of claim 1, wherein the glycan polymer preparation comprises 1, 2, 3, or all of:
   i) glycosidic linkage distribution with a reference value of: 0-30 mol %-of 1,2-glycosidic bonds, 0-30 mol % of 1,3-glycosidic bonds, 0-50 mol % of 1,4-glycosidic bonds, and 0-80 mol % of 1,6-glycosidic bonds;
   ii) average DP with a reference value of 5-20;
   iii) alpha:beta ratio with a reference value of: 0.8:1 to 5:1; or
   iv) degree of branching with a reference value of 0.05-0.5.

11. The method of claim 1, wherein the reaction mixture does not comprise an active form of a glycosidic linkage modifying enzyme, or wherein at least 50% of the glycans in the glycan polymer preparation are synthesized under conditions which inactivate a glycosidic linkage modifying enzyme.

12. The method of claim 1, wherein the one or more glycan units (i) consist of glucose, galactose, arabinose, xylose, mannose, fucose, fructose, or rhamnose; (ii) consist of two of glucose, galactose, mannose and arabinose; or (iii) consist of three of glucose, galactose, mannose and arabinose.

13. The method of claim 1, wherein the glycan polymer preparation comprises at least 100 kg of glycans.

14. The method of claim 1, wherein the glycan polymer preparation is suitable for pharmaceutical use, comprises a pharmaceutically acceptable excipient or solvent, or the glycan polymer preparation is pharmaceutical grade.

15. The method of claim 1, wherein the glycan polymer preparation is suitable for use as a food, comprises another food or food ingredient, or wherein the glycan polymer preparation is food grade.

16. The method of claim 1, wherein the glycan polymer preparation is suitable for consumption by animals or comprises another feed ingredient or carrier.

* * * * *